US012208361B2

(12) United States Patent
Grubert et al.

(10) Patent No.: US 12,208,361 B2
(45) Date of Patent: Jan. 28, 2025

(54) CATALYTIC SYSTEM FOR THE TREATMENT OF AN EXHAUST GAS OF A COMBUSTION ENGINE

(71) Applicant: BASF MOBILE EMISSIONS CATALYSTS LLC, Iselin, NJ (US)

(72) Inventors: Gerd Grubert, Hannover (DE); Alfred Punke, Schwuelper-Walle (DE); Arne Tobias Niggebaum, Hannover (DE); Sven Jare Lohmeier, Hannover (DE); Emre Emmez, Nienburg/Weser (DE); Torsten Neubauer, Hannover (DE); Jeffrey B. Hoke, Iselin, NJ (US); Shiang Sung, Iselin, NJ (US)

(73) Assignee: BASF Mobile Emissions Catalysts LLC, Iselin, NJ (US)

( * ) Notice: Subject to any disclaimer, the term of this patent is extended or adjusted under 35 U.S.C. 154(b) by 59 days.

(21) Appl. No.: 18/028,800

(22) PCT Filed: Sep. 29, 2021

(86) PCT No.: PCT/EP2021/076786
§ 371 (c)(1),
(2) Date: Mar. 28, 2023

(87) PCT Pub. No.: WO2022/069541
PCT Pub. Date: Apr. 7, 2022

(65) Prior Publication Data
US 2023/0330598 A1    Oct. 19, 2023

(30) Foreign Application Priority Data
Sep. 30, 2020    (EP) .................................... 20199211

(51) Int. Cl.
*B01D 53/94*    (2006.01)
*B01J 23/34*    (2006.01)
(Continued)

(52) U.S. Cl.
CPC ..... *B01D 53/9422* (2013.01); *B01D 53/9418* (2013.01); *B01D 53/944* (2013.01);
(Continued)

(58) Field of Classification Search
CPC combination set(s) only.
See application file for complete search history.

(56) References Cited

U.S. PATENT DOCUMENTS

| 10,480,369 B1 | 11/2019 | Dahodwala et al. |
| 2015/0037233 A1* | 2/2015 | Fedeyko ................ F01N 3/10 |
| | | 422/171 |

(Continued)

FOREIGN PATENT DOCUMENTS

| DE | 102018101929 | 8/2019 |
| EP | 3418518 A1 | 12/2018 |
| WO | 2017/180114 A1 | 10/2017 |

OTHER PUBLICATIONS

International Preliminary Report on Patentability from corresponding PCT International Application No. PCT/EP2021/076786 dated Apr. 13, 2023.
(Continued)

*Primary Examiner* — Binh Q Tran
(74) *Attorney, Agent, or Firm* — DLA Piper LLP (US)

(57) ABSTRACT

The present invention relates a system for the treatment of an exhaust gas of a diesel combustion engine, said system comprising a specific NOx adsorber component, a diesel oxidation catalyst (DOC) component, a selective catalytic reduction (SCR) component, a gas heating component, and a reductant injector, wherein in said system, the specific NOx adsorber component is arranged upstream of the gas heating component, the reductant injector is arranged upstream of the SCR component, the gas heating component is arranged upstream of the reductant injector, the DOC component is arranged upstream of the reductant injector, and
(Continued)

the DOC component and the gas heating component are directly consecutive components. Further, the present invention relates a process for preparing such a system and use thereof.

14 Claims, 8 Drawing Sheets

(51) Int. Cl.
| | |
|---|---|
| B01J 27/185 | (2006.01) |
| B01J 29/67 | (2006.01) |
| B01J 29/74 | (2006.01) |
| B01J 35/00 | (2024.01) |
| F01N 3/08 | (2006.01) |
| F01N 3/10 | (2006.01) |
| F01N 3/20 | (2006.01) |
| F01N 3/28 | (2006.01) |
| F01N 13/00 | (2010.01) |

(52) U.S. Cl.
CPC ......... *B01D 53/9477* (2013.01); *B01J 23/34* (2013.01); *B01J 29/67* (2013.01); *B01J 29/7415* (2013.01); *B01J 35/19* (2024.01); *F01N 3/106* (2013.01); *F01N 3/2026* (2013.01); *F01N 3/2066* (2013.01); *F01N 3/2803* (2013.01); *F01N 13/009* (2014.06); *B01D 2255/1021* (2013.01); *B01D 2255/1023* (2013.01); *B01D 2255/2073* (2013.01); *B01D 2255/2092* (2013.01); *B01D 2255/50* (2013.01); *B01D 2255/9022* (2013.01); *B01D 2255/91* (2013.01); *B01D 2257/404* (2013.01); *B01D 2258/012* (2013.01); *B01J 27/1853* (2013.01); *B01J 29/74* (2013.01); *F01N 3/0807* (2013.01); *F01N 3/0885* (2013.01); *F01N 2240/18* (2013.01); *F01N 2250/12* (2013.01); *F01N 2330/30* (2013.01); *F01N 2370/04* (2013.01); *F01N 2570/14* (2013.01); *F01N 2610/1453* (2013.01)

(56) References Cited

U.S. PATENT DOCUMENTS

| | | | |
|---|---|---|---|
| 2017/0284250 A1* | 10/2017 | Bergeal | F01N 3/2006 |
| 2017/0298796 A1* | 10/2017 | Naseri | F01N 13/0093 |
| 2018/0171850 A1* | 6/2018 | Aydin | F01N 13/0097 |
| 2019/0242282 A1* | 8/2019 | Li | F01N 13/009 |
| 2020/0230582 A1* | 7/2020 | Patchett | B01J 35/40 |
| 2020/0263585 A1 | 8/2020 | Clark et al. | |
| 2021/0131326 A1* | 5/2021 | Sung | F01N 3/2828 |
| 2021/0213434 A1* | 7/2021 | Liu | B01J 29/67 |

OTHER PUBLICATIONS

International Search Report and Written Opinion from corresponding PCT International Application No. PCT/EP2021/076786 dated Jan. 7, 2022.

* cited by examiner

CATALYTIC SYSTEM FOR THE TREATMENT OF AN EXHAUST GAS OF A COMBUSTION ENGINE

The present invention relates to a system for the treatment of an exhaust gas of a diesel combustion engine, a process for preparing such a system, a method for the treatment of an exhaust gas of a diesel combustion engine using said system and a use of said system.

In the automotive industry, there is an ongoing need to reduce engine NOx emissions as these emissions can be harmful. Thus, there is an interest for avoiding NOx emissions and to cope with present regulations. In particular, it is challenging to remove the NOx emissions directly after the cold-start period as the temperature for the NOx conversion over the catalytic system is usually comparatively low.

DE 10 2018 101929 discloses a system to reduce cold start emissions comprising a first selective catalytic reduction (SCR) catalytic converter which may comprise a NOx adsorber, a heating element positioned downstream of the first SCR catalytic converter and a second SCR catalytic converter positioned downstream of the heating element. US 2017/0284250 A1 discloses a system comprising a NOx storage catalyst positioned upstream of a heating element and a SCR catalyst positioned downstream of the heating element. Furthermore, U.S. Pat. No. 10,480,369 B1 discloses a system comprising an electrical heating element downstream of the engine, a diesel oxidation catalyst (DOC) which can be combined with a NOx adsorber or a diesel particulate filter positioned downstream of the electrical heating element and a selective catalytic reduction catalyst on a filter (SCRoF) positioned downstream of the DOC. WO 2019/077111 A1 relates to an exhaust gas cleaning system which comprises a catalyst comprising a carrier substrate of the length L, a passive nitrogen oxide adsorber and means to control the temperature of the carrier substrate, and a first SCR catalyst, wherein said carrier substrate can carry an oxidation catalyst besides the passive nitrogen oxide adsorber.

It is an object of the present invention to provide a system which can significantly reduce the overall NOx emissions. In particular, it is an object to improve NOx adsorption and/or conversion of a system especially during the cold-start period, i. e. in particular at temperatures below 300° C., to significantly reduce the overall NOx emissions. Further, it is an object of the present invention to ensure NOx adsorption for a subsequent cold start. Thus, the present invention in particular aims at providing a system exhibiting a low desorption temperature of NOx, especially for situations after cold start when the downstream SCR conversion is high. Also, it is an object to provide a system which adsorb NOx during cold start when the downstream SCR conversion is low.

Thus, it was surprisingly found that a system for the treatment of an exhaust gas of a diesel combustion engine can solve the above mentioned problems, in particular with respect to an improved performance with respect to the adsorption and/or conversion of one or more of NOx, CO, and total hydrocarbons (THC), wherein the system particularly comprises a specific NOx adsorber component, a diesel oxidation catalyst (DOC) component, a selective catalytic reduction (SCR) component and a gas heating component, and wherein said components are particularly arranged in a specific order relative to the direction of the exhaust gas stream.

Surprisingly, the system of the present invention thus permits for an improved catalytic activity. Also, the system of the present invention shows an excellent behavior as concerns NOx release and NOx adsorption, in particular during the cold start period, and more particularly when tested in a Worldwide Harmonized Light Vehicle Test Cycle (WLTC). Thus, a system in accordance with the present invention shows comparatively lower NOx emissions when compared with a system of the prior art, in particular after a short period of driving. Further, it has been surprisingly found that in particular a system which uses an electrical heating element between a NA catalyst and a DOC permits to obtain comparatively low NOx, CO and THC emissions. In particular when tested in a WLTC, it has surprisingly been found that a system of the present invention achieves comparatively low emissions for both the full WLTC and during the urban part of WLTC.

System for Treatment of an Exhaust Gas

The invention therefore relates a system for the treatment of an exhaust gas of a diesel combustion engine, said system comprising an NOx adsorber component, a diesel oxidation catalyst (DOC) component, a selective catalytic reduction (SCR) component, a gas heating component, and a reductant injector, wherein in said system, the NOx adsorber component is arranged upstream of the gas heating component, the reductant injector is arranged upstream of the SCR component, the gas heating component is arranged upstream of the reductant injector, the DOC component is arranged upstream of the reductant injector, and the DOC component and the gas heating component are directly consecutive components, wherein the NOx adsorber component is comprised in
(i) a catalyst which comprises
  (i.1) a first substrate comprising an inlet end, an outlet end, a substrate axial length extending from the inlet end to the outlet end of the first substrate, and a plurality of passages defined by internal walls of the first substrate extending therethrough;
  (i.2) an NOx adsorber coating being said NOx adsorber component, said coating being disposed on the surface of the internal walls of the first substrate over at least 50% of the substrate axial length of the first substrate, the NOx adsorber coating comprising a platinum group metal component and a 10-membered ring pore zeolitic material having a framework type selected from the group consisting of FER, TON, MTT, SZR, MWW, AEL, HEU, AFO, a mixture of two or more thereof and a mixed type of two or more thereof.

Preferably, no other component for the treatment of the exhaust gas is arranged between the DOC component and the gas heating component.

Preferably, said components are arranged in a conduit for the exhaust gas, preferably in sequential order, the upstream end of said conduit preferably designed to be arranged downstream of a diesel combustion engine, wherein more preferably, the upstream end of said conduit is arranged downstream of a diesel combustion engine.

Preferably, the reductant injector comprises, preferably consists of, one or more of a hydrocarbon injector, a hydrocarbon in-cylinder post injector, and a urea injector, preferably a urea injector, wherein the reductant injector is preferably arranged downstream of the DOC component.

First Alternative Arrangement

Preferably, the DOC component is arranged upstream of the gas heating component, wherein the DOC component and the NOx adsorber component are preferably arranged upstream of the gas heating component.

Preferably, (i.3) the catalyst according to (i) comprises a diesel oxidation catalyst (DOC) coating being said DOC component, said DOC coating being at least partially disposed on the NOx adsorber coating over at least 70% of the substrate axial length of the first substrate, the DOC coating comprising a platinum group metal component and a non-zeolitic oxidic material comprising one or more of alumina, silica, zirconia and titania, wherein the DOC coating is preferably disposed from the outlet end to the inlet end of the first substrate.

Preferably, the NOx adsorber coating according to (i.2) is disposed on the surface of the internal walls of the first substrate over 70 to 100%, preferably 80 to 100%, more preferably 90 to 100%, more preferably 95 to 100%, more preferably 98 to 100%, more preferably 99 to 100%, of the substrate axial length of the first substrate, wherein the first NOx adsorber coating according to (i.2) preferably is disposed on the surface of the internal walls of the first substrate from the inlet end to the outlet end of the first substrate.

Preferably, the platinum group metal component of the NOx adsorber coating according to (i.2) comprises one or more of palladium, platinum, rhodium, iridium, osmium and ruthenium, preferably one or more of palladium, platinum and rhodium, more preferably one or more of palladium and platinum, wherein the platinum group metal component more preferably comprises, more preferably is, palladium, wherein the first NOx adsorber coating according to (i.2) comprises the platinum group metal component, preferably palladium, at a loading, calculated as elemental platinum group metal, preferably as elemental Pd, preferably in the range of from 30 to 300 g/ft$^3$, more preferably in the range of from 45 to 200 g/ft$^3$, more preferably in the range of from 60 to 150 g/ft$^3$, more preferably in the range of from 60 to 100 g/ft$^3$ or in the range of from 100 to 150 g/ft$^3$, more preferably in the range of from 60 to 80 g/ft$^3$ or in the range of from of from 100 to 140 g/ft$^3$.

Preferably, the platinum group metal component of the NOx adsorber coating according to (i.2) is comprised in the 10-membered ring pore zeolitic material of the NOx adsorber coating according to (i.2), wherein the platinum group metal component preferably is present in said zeolitic material in an amount in the range of from 0.5 to 10 weight-%, more preferably in the range of from 1 to 6 weight-%, more preferably in the range of from 1.25 to 4 weight-%, more preferably in the range of from 1.5 to 3 weight-%, based on the total weight of the 10-membered ring pore zeolitic material of the NOx adsorber coating according to (i.2).

Preferably, the 10-membered ring pore zeolitic material of the NOx adsorber coating according to (i.2) has a framework type selected from the group consisting of FER, TON, a mixture thereof and a mixed type thereof, wherein more preferably the 10-membered ring pore zeolitic material of the NOx adsorber coating according to (i.2) has a framework type FER, wherein the framework structure of the 10-membered ring pore zeolitic material of the NOx adsorber coating according to (i.2) preferably comprises, more preferably consists of, a tetravalent element Y, a trivalent element X and oxygen, wherein Y is preferably one or more of Si, Sn, Ti, Zr and Ge, more preferably Si, and X is preferably one or more of Al, B, In and Ga, more preferably Al, wherein the molar ratio of Y:X, calculated as YO$_2$:X$_2$O$_3$, is preferably in the range of from 2:1 to 100:1, more preferably in the range of from 10:1 to 55:1, more preferably in the range of from 12:1 to 40:1, more preferably in the range of from 15:1 to 28:1, more preferably in the range of from 18:1 to 25:1.

Preferably, the NOx adsorber coating according to (i.2) comprises the 10-membered ring pore zeolitic material in an amount in the range of from 80 to 99.75 weight-%, preferably in the range of from 85 to 99.5 weight-%, more preferably in the range of from 90 to 99.25 weight-%, more preferably in the range of from 95 to 99 weight-%, based on the weight of the NOx adsorber coating.

Preferably, the catalyst according to (i) comprises the NOx adsorber coating according to (i.2) at a loading in the range of from 0.5 to 8 g/in$^3$, preferably in the range of from 1 to 5 g/in$^3$, more preferably in the range of from 1.5 to 4.5 g/in$^3$, more preferably in the range of from 2 to 4 g/in$^3$.

Preferably, from 95 to 100 weight-%, preferably from 98 to 100 weight-%, more preferably from 99 to 100 weight-%, more preferably from 99.5 to 100 weight-%, of the NOx adsorber coating according to (i.2) consist of the platinum group metal component and the 10-membered ring pore zeolitic material.

Preferably, the DOC coating according to (i.3) is at least partially disposed on the NOx adsorber coating according to (i.2) and extends over 80 to 100%, preferably 95 to 100%, more preferably 98 to 100%, more preferably 99 to 100%, of the substrate axial length of the first substrate, wherein the DOC according to (i.3) preferably is at least partially disposed on the NOx adsorber coating according to (i.2) from the inlet end to the outlet end of the first substrate.

Preferably, the platinum group metal component of the DOC coating according to (i.3) comprises one or more of palladium, platinum, rhodium, iridium, osmium and ruthenium, preferably one or more of palladium, platinum and rhodium, more preferably one or more of palladium and platinum, more preferably comprises, more preferably is, platinum, wherein the DOC coating according to (i.3) comprises the platinum group metal component, preferably platinum, at a loading, calculated as elemental platinum group metal, preferably as elemental Pt, preferably in the range of from 15 to 200 g/ft$^3$, more preferably in the range of from 20 to 150 g/ft$^3$, more preferably in the range of from 30 to 100 g/ft$^3$, more preferably in the range of from 40 to 90 g/ft$^3$, more preferably in the range of from 50 to 80 g/ft$^3$, wherein the platinum group metal component of the DOC coating according to (i.3) more preferably comprises platinum and palladium, wherein the weight ratio of platinum to palladium, Pt:Pd, calculated as element respectively, more preferably is in the range of from 1:1 to 11:1, more preferably in the range of from 2:1 to 10:1, more preferably in the range of from 3:1 to 5:1, wherein the weight ratio more preferably is about 4:1;

wherein the platinum group metal component of the DOC coating according to (i.3) is more preferably supported on the non-zeolitic oxidic material according to (i.3), more preferably at a loading in the range of from 1 to 5 weight-%, more preferably in the range of from 2 to 4 weight-%, calculated as element or elements, respectively, and based on the total weight of the non-zeolitic oxidic material according to (i.3).

Preferably, the non-zeolitic oxidic material of the DOC coating according to (i.3) comprises one or more of alumina, silica and zirconia, preferably one or more of alumina and silica, more preferably alumina, more preferably gamma-alumina, wherein the non-zeolitic oxidic material preferably further comprises one or more of manganese, silicon and zirconium, wherein the non-zeolitic oxidic material more preferably comprises alumina and manganese, wherein the non-zeolitic oxidic material of the DOC coating according to (i.3) more preferably comprises the alumina in an amount in the range of from 80 to 99 weight-%, more preferably in the range of from 85 to 98 weight-%, more preferably in the range of from 90 to 97 weight-%, based on the weight of the non-zeolitic oxidic material, wherein the non-zeolitic oxidic material of the DOC coating according to (i.3) more preferably exhibits a BET specific surface area greater than 75 m$^2$/g, more preferably greater than 100 m$^2$/g, wherein the non-zeolitic oxidic material of the DOC coating according to (i.3) more preferably exhibits a pore volume of greater than 0.04 cm$^3$/g, more preferably greater than 0.06 cm$^3$/g.

Preferably, the DOC coating according to (i.3) further comprises a zeolitic material, preferably a 12-membered ring pore zeolitic material, wherein the 12-membered ring pore zeolitic material preferably has a framework type selected from the group consisting of BEA, FAU, USY, GME, MOR, OFF, a mixture of two or more thereof and a mixed type of two or more thereof, more preferably selected from the group consisting of BEA, USY, FAU, a mixture of two or more thereof and a mixed type of two or more thereof, wherein more preferably the 12-membered ring pore zeolitic material has a framework type BEA, wherein the framework structure of the zeolitic material preferably comprises, more preferably consists of, Si, Al and O, wherein the molar ratio of Si:Al, calculated as SiO$_2$:Al$_2$O$_3$, is preferably in the range of from 2:1 to 1200:1, more preferably in the range of from 10:1 to 400:1, more preferably in the range of from 15:1 to 100:1, more preferably in the range of from 18:1 to 30:1, more preferably in the range of from 20:1 to 26:1,
  said zeolitic material preferably comprising at most 0.001 weight-%, more preferably from 0 to 0.0001 weight-%, more preferably from 0 to 0.00001 weight-%, of copper, calculated as CuO.

Preferably, the zeolitic material comprises at most 0.001 weight-%, more preferably from 0 to 0.0001 weight-%, more preferably from 0 to 0.00001 weight-%, of iron, calculated as Fe$_2$O$_3$; or wherein the zeolitic material comprises iron, preferably in an amount in the range of from 0.5 to 8 weight-%, more preferably in the range of from 1 to 5 weight-%, calculated as Fe$_2$O$_3$.

Preferably, the weight ratio of the non-zeolitic oxidic material of the DOC coating according to (i.3) relative to the zeolitic material of the DOC coating according to (i.3) is in the range of from 1:1 to 10:1, preferably in the range of from 1.5:1 to 8:1, more preferably in the range of from 2:1 to 4.5:1.

Preferably, the catalyst according to (i) comprises the DOC coating according to (i.3) at a loading in the range of from 0.5 to 5 g/in$^3$, preferably in the range of from 0.75 to 4 g/in$^3$, more preferably in the range of from 1 to 3 g/in$^3$, more preferably in the range of from 1.25 to 2.5 g/in$^3$.

Preferably, from 95 to 100 weight-%, preferably from 98 to 100 weight-%, more preferably from 99 to 100 weight-%, more preferably from 99.5 to 100 weight-%, of the DOC coating according to (i.3) consist of the platinum group metal component, wherein the non-zeolitic oxidic material of the DOC coating according to (i.3) preferably comprises one or more of alumina, silica and zirconia, preferably one or more of alumina and silica, more preferably alumina, more preferably gamma-alumina, wherein the non-zeolitic oxidic material preferably further comprises one or more of manganese, silicon and zirconium, wherein the non-zeolitic oxidic material more preferably comprises alumina and manganese, wherein the non-zeolitic oxidic material of the DOC coating according to (i.3) more preferably comprises the alumina in an amount in the range of from 80 to 99 weight-%, more preferably in the range of from 85 to 98 weight-%, more preferably in the range of from 90 to 97 weight-%, based on the weight of the non-zeolitic oxidic material, wherein the non-zeolitic oxidic material of the DOC coating according to (i.3) more preferably exhibits a BET specific surface area greater than 75 m$^2$/g, more preferably greater than 100 m$^2$/g, wherein the non-zeolitic oxidic material of the DOC coating according to (i.3) more preferably exhibits a pore volume of greater than 0.04 cm$^3$/g, more preferably greater than 0.06 cm$^3$/g, and wherein the zeolitic material preferably is a 12-membered ring pore zeolitic material, wherein the 12-membered ring pore zeolitic material preferably has a framework type selected from the group consisting of BEA, FAU, USY, GME, MOR, OFF, a mixture of two or more thereof and a mixed type of two or more thereof, more preferably selected from the group consisting of BEA, USY, FAU, a mixture of two or more thereof and a mixed type of two or more thereof, wherein more preferably the 12-membered ring pore zeolitic material has a framework type BEA, wherein the framework structure of the zeolitic material preferably comprises, more preferably consists of, Si, Al and O, wherein the molar ratio of Si:Al, calculated as SiO$_2$:Al$_2$O$_3$, is preferably in the range of from 2:1 to 1200:1, more preferably in the range of from 10:1 to 400:1, more preferably in the range of from 15:1 to 100:1, more preferably in the range of from 18:1 to 30:1, more preferably in the range of from 20:1 to 26:1, said zeolitic material preferably comprising at most 0.001 weight-%, more preferably from 0 to 0.0001 weight-%, more preferably from 0 to 0.00001 weight-%, of copper, calculated as CuO, and wherein the zeolitic material more preferably comprises at most 0.001 weight-%, more preferably from 0 to 0.0001 weight-%, more preferably from 0 to 0.00001 weight-%, of iron, calculated as Fe$_2$O$_3$; or wherein the zeolitic material comprises iron, preferably in an amount in the range of from 0.5 to 8 weight-%, more preferably in the range of from 1 to 5 weight-%, calculated as Fe$_2$O$_3$.

Preferably, the first substrate according to (i.1) is a flow-through substrate or a wall flow filter substrate, preferably a flow-through substrate, wherein the flow-through substrate is preferably one or more of a cordierite flow-through substrate and a metallic flow-through substrate, more preferably a metallic flow-through substrate, said first substrate preferably having a cylindrical shape, the diameter of the first substrate preferably being in the range of from 3 to 10 inches, more preferably in the range of from 3.5 to 8 inches, more preferably in the range of from 4 to 6 inches, the first substrate preferably having an axial length in the range of from 3 to 10 inches, more preferably in the range of from 3.5 to 8 inches, more preferably in the range of from 4 to 6 inches.

Preferably, the catalyst according to (i) consists of (i.1), (i.2) and (i.3).

Gas Heating Component

Preferably, (ii) the gas heating component comprises
  (ii.1) a second substrate comprising an inlet end, an outlet end, a substrate axial length extending from the inlet end to the outlet end of the second substrate, and a plurality of passages defined by internal walls of the second substrate extending therethrough;
  wherein the inlet end of the second substrate according to (ii.1) and the outlet end of the first substrate according to (i.1) are coupled to allow exhaust gas exiting from the passages of the first substrate to enter the passages of the second substrate;
  wherein the internal walls of the second substrate are thermally conductive to allow heating thereof for heating of exhaust gas flowing through the passages of the second substrate.

Preferably, the second substrate according to (ii.1) is a flow-through substrate, preferably a metallic flow-through substrate, more preferably a metallic electrically and/or thermally conductive flow-through substrate.

Preferably, the second substrate according to (ii.1) has a cylindrical shape, the diameter of the second substrate preferably being in the range of from 3 to 10 inches, more preferably in the range of from 3.5 to 8 inches, more preferably in the range of from 4 to 6 inches, wherein more preferably, the diameter of the second substrate is in the range of from 90 to 110%, preferably in the range of from 95 to 105%, more preferably in the range of from 98 to 102% of the diameter of the first substrate, the diameter of the first substrate preferably being in the range of from 3 to 10 inches, more preferably in the range of from 3.5 to 8 inches, more preferably in the range of from 4 to 6 inches, the first substrate preferably having an axial length in the range of from 3 to 10 inches, more preferably in the range of from 3.5 to 8 inches, more preferably in the range of from 4 to 6 inches, said second substrate according to (ii.1) preferably having an axial length in the range of from 0.15 to 2 inches, more preferably in the range of from 0.20 to 1.5 inches, more preferably in the range of from 0.30 to 1 inch.

Preferably, the gas heating component according to (ii) consists of the second substrate according to (ii.1), said substrate being an uncoated substrate.

Preferably, the gas heating component according to (ii) further comprises
(ii.2) optionally an NOx adsorber coating disposed on the surface of the internal walls of the second substrate over at least 50% of the substrate axial length of the second substrate, the NOx adsorber coating comprising a platinum group metal component and a 10-membered ring pore zeolitic material having a framework type selected from the group consisting of FER, TON, MTT, SZR, MWW, AEL, HEU, AFO, a mixture of two or more thereof and a mixed type of two or more thereof;
(ii.3) a diesel oxidation catalyst (DOC) coating at least partially disposed on the surface of the internal walls of the second substrate and/or at least partially disposed on the optional NOx adsorber coating according to (ii.2) and extending over at least 70% of the substrate axial length of the second substrate, the DOC coating comprising a platinum group metal component and a non-zeolitic oxidic material comprising one or more of alumina, silica, zirconia and titania.

Preferably, the NOx adsorber coating according to (ii.2) is disposed on the surface of the internal walls of the second substrate over 70 to 100%, preferably 80 to 100%, more preferably 90 to 100%, more preferably 95 to 100%, more preferably 98 to 100%, more preferably 99 to 100%, of the substrate axial length of the second substrate,
wherein the NOx adsorber coating according to (ii.2) preferably is disposed on the surface of the internal walls of the second substrate from the outlet end to the inlet of the second substrate.

Preferably, the platinum group metal component of the NOx adsorber coating according to (ii.2) comprises one or more of palladium, platinum, rhodium, iridium, osmium and ruthenium, preferably one or more of palladium, platinum and rhodium, more preferably one or more of palladium and platinum, wherein the platinum group metal component more preferably comprises, more preferably is, palladium, wherein the NOx adsorber coating according to (ii.2) comprises the platinum group metal component, preferably palladium, at a loading, calculated as elemental platinum group metal, preferably as elemental Pd, preferably in the range of from 30 to 300 g/ft$^3$, more preferably in the range of from 45 to 200 g/ft$^3$, more preferably in the range of from 60 to 150 g/ft$^3$, more preferably in the range of from 60 to 100 g/ft$^3$ or in the range of from 100 to 150 g/ft$^3$, more preferably in the range of from 60 to 80 g/ft$^3$ or in the range of from of from 100 to 140 g/ft$^3$.

Preferably, the platinum group metal component of the NOx adsorber coating according to (ii.2) is comprised in the 10-membered ring pore zeolitic material of the NOx adsorber coating according to (ii.2), wherein the platinum group metal component preferably is present in said zeolitic material in an amount in the range of from 0.5 to 10 weight-%, more preferably in the range of from 1 to 6 weight-%, more preferably in the range of from 1.25 to 4 weight-%, more preferably in the range of from 1.5 to 3 weight-%, based on the total weight of the 10-membered ring pore zeolitic material of the NOx adsorber coating according to (ii.2).

Preferably, the 10-membered ring pore zeolitic material of the NOx adsorber coating according to (ii.2) has a framework type selected from the group consisting of FER, TON, a mixture thereof and a mixed type thereof, wherein more preferably the 10-membered ring pore zeolitic material of the NOx adsorber coating according to (ii.2) has a framework type FER, wherein the framework structure of the 10-membered ring pore zeolitic material of the NOx adsorber coating according to (ii.2) preferably comprises, more preferably consists of, a tetravalent element Y, a trivalent element X and oxygen, wherein Y is preferably one or more of Si, Sn, Ti, Zr and Ge, more preferably Si, and X is preferably one or more of Al, B, In and Ga, more preferably Al, wherein the molar ratio of Y:X, calculated as $YO_2:X_2O_3$, is preferably in the range of from 2:1 to 100:1, more preferably in the range of from 10:1 to 55:1, more preferably in the range of from 12:1 to 40:1, more preferably in the range of from 15:1 to 28:1, more preferably in the range of from 18:1 to 25:1.

Preferably, the NOx adsorber coating according to (ii.2) comprises the 10-membered ring pore zeolitic material preferably in an amount in the range of from 80 to 99.75 weight-%, more preferably in the range of from 85 to 99.5 weight-%, more preferably in the range of from 90 to 99.25 weight-%, more preferably in the range of from 95 to 99 weight-%, based on the weight of the NOx adsorber coating according to (ii.2).

Preferably, the gas heating component according to (ii) comprises the NOx adsorber coating according to (ii.2) at a loading preferably in the range of from 0.5 to 8 g/in$^3$, more preferably in the range of from 1 to 5 g/in$^3$, more preferably in the range of from 1.5 to 4.5 g/in$^3$, more preferably in the range of from 2 to 4 g/in$^3$.

Preferably, from 95 to 100 weight-%, more preferably from 98 to 100 weight-%, more preferably from 99 to 100 weight-%, more preferably from 99.5 to 100 weight-%, of the NOx adsorber coating according to (ii.2) consist of the platinum group metal component and the 10-membered ring pore zeolitic material.

Preferably, the DOC coating according to (ii.3) is at least partially disposed on the surface of the internal walls of the second substrate and/or at least partially disposed on the optional NOx adsorber coating according to (ii.2) and extends over 80 to 100%, preferably 95 to 100%, more preferably 98 to 100%, more preferably 99 to 100%, of the substrate axial length of the first substrate, wherein the DOC according to (ii.3) preferably is at least partially disposed on the surface of the internal walls of the second substrate and/or at least partially disposed on the optional NOx adsorber coating according to (ii.2) from the inlet end to the outlet end of the first substrate.

Preferably, the platinum group metal component of the DOC coating according to (ii.3) comprises one or more of palladium, platinum, rhodium, iridium, osmium and ruthenium, preferably one or more of palladium, platinum and rhodium, more preferably one or more of palladium and platinum, more preferably comprises, more preferably is, platinum, wherein the DOC coating according to (ii.3) comprises the platinum group metal component, preferably platinum, at a loading, calculated as elemental platinum group metal, preferably as elemental Pt, preferably in the range of from 15 to 200 g/ft$^3$, more preferably in the range of from 20 to 150 g/ft$^3$, more preferably in the range of from 30 to 100 g/ft$^3$, more preferably in the range of from 40 to 90 g/ft$^3$, more preferably in the range of from 50 to 80 g/ft$^3$ wherein the platinum group metal component of the DOC coating according to (ii.3) is more preferably supported on the non-zeolitic oxidic material according to (ii.3), more preferably at a loading in the range of from 1 to 5 weight-%, more preferably in the range of from 2 to 4 weight-%, calculated as element or elements, respectively, and based on the total weight of the non-zeolitic oxidic material according to (ii.3);

Preferably, the platinum group metal component of the DOC coating according to (ii.3) comprises platinum and palladium, wherein the weight ratio of platinum to palladium, Pt:Pd, calculated as element respectively, more preferably is in the range of from 1:1 to 11:1, more preferably in the range of from 2:1 to 10:1, more preferably in the range of from 3:1 to 5:1, wherein the weight ratio more preferably is about 4:1.

Preferably, the non-zeolitic oxidic material of the DOC coating according to (ii.3) preferably comprises one or more of alumina, silica and zirconia, more preferably one or more of alumina and silica, more preferably alumina, more preferably gamma-alumina, wherein the non-zeolitic oxidic material preferably further comprises one or more of manganese, silicon and zirconium, wherein the non-zeolitic oxidic material more preferably comprises alumina and manganese, wherein the non-zeolitic oxidic material of the DOC coating according to (ii.3) more preferably comprises the alumina in an amount in the range of from 80 to 99 weight-%, more preferably in the range of from 85 to 98 weight-%, more preferably in the range of from 90 to 97 weight-%, based on the weight of the non-zeolitic oxidic material.

Preferably, the non-zeolitic oxidic material of the DOC coating according to (ii.3) exhibits a BET specific surface area greater than 75 m$^2$/g, more preferably greater than 100 m$^2$/g, wherein the non-zeolitic oxidic material of the DOC coating according to (ii.3) more preferably exhibits a pore volume of greater than 0.04 cm$^3$/g, more preferably greater than 0.06 cm$^3$/g.

Preferably, the DOC coating according to (ii.3) further comprises a zeolitic material, more preferably a 12-membered ring pore zeolitic material, wherein the 12-membered ring pore zeolitic material preferably has a framework type selected from the group consisting of BEA, FAU, USY, GME, MOR, OFF, a mixture of two or more thereof and a mixed type of two or more thereof, more preferably selected from the group consisting of BEA, USY, FAU, a mixture of two or more thereof and a mixed type of two or more thereof, wherein more preferably the 12-membered ring pore zeolitic material has a framework type BEA, wherein the framework structure of the zeolitic material preferably comprises, more preferably consists of, Si, Al and O, wherein the molar ratio of Si:Al, calculated as SiO$_2$:Al$_2$O$_3$, is preferably in the range of from 2:1 to 1200:1, more preferably in the range of from 10:1 to 400:1, more preferably in the range of from 15:1 to 100:1, more preferably in the range of from 18:1 to 30:1, more preferably in the range of from 20:1 to 26:1, said zeolitic material preferably comprising at most 0.001 weight-%, more preferably from 0 to 0.0001 weight-%, more preferably from 0 to 0.00001 weight-%, of copper, calculated as CuO; wherein said zeolitic material preferably comprises at most 0.001 weight-%, more preferably from 0 to 0.0001 weight-%, more preferably from 0 to 0.00001 weight-%, of iron, calculated as Fe$_2$O$_3$; or wherein the zeolitic material preferably comprises iron, preferably in an amount in the range of from 0.5 to 8 weight-%, more preferably in the range of from 1 to 5 weight-%, calculated as Fe$_2$O$_3$.

Preferably, the weight ratio of the non-zeolitic oxidic material of the DOC coating according to (ii.3) relative to the zeolitic material of the DOC coating according to (ii.3) is preferably in the range of from 1:1 to 10:1, more preferably in the range of from 1.5:1 to 8:1, more preferably in the range of from 2:1 to 4.5:1.

Preferably, the gas heating component according to (ii) comprises the DOC coating according to (ii.3) preferably at a loading in the range of from 0.5 to 5 g/in$^3$, more preferably in the range of from 0.75 to 4 g/in$^3$, more preferably in the range of from 1 to 3 g/in$^3$, more preferably in the range of from 1.25 to 2.5 g/in$^3$.

Preferably, from 95 to 100 weight-%, more preferably from 98 to 100 weight-%, more preferably from 99 to 100 weight-%, more preferably from 99.5 to 100 weight-%, of the DOC coating according to (ii.3) consist of the platinum group metal component, the non-zeolitic oxidic material preferably comprising one or more of alumina, silica and zirconia, preferably one or more of alumina and silica, more preferably alumina, more preferably gamma-alumina, wherein the non-zeolitic oxidic material preferably further comprises one or more of manganese, silicon and zirconium, wherein the non-zeolitic oxidic material more preferably comprises alumina and manganese, wherein the non-zeolitic oxidic more preferably comprises the alumina in an amount in the range of from 80 to 99 weight-%, more preferably in the range of from 85 to 98 weight-%, more preferably in the range of from 90 to 97 weight-%, based on the weight of the non-zeolitic oxidic material, wherein the non-zeolitic oxidic material more preferably exhibits a BET specific surface area greater than 75 m$^2$/g, more preferably greater than 100 m$^2$/g, wherein the non-zeolitic oxidic material more preferably exhibits a pore volume of greater than 0.04 cm$^3$/g, more preferably greater than 0.06 cm$^3$/g, and the zeolitic material preferably being a 12-membered ring pore zeolitic material, wherein the 12-membered ring pore zeolitic material preferably has a framework type selected from the group consisting of BEA, FAU, USY, GME, MOR, OFF, a mixture of two or more thereof and a mixed type of two or more thereof, more preferably selected from the group consisting of BEA, USY, FAU, a mixture of two or more thereof and a mixed type of two or more thereof, wherein more preferably the 12-membered ring pore zeolitic material has a framework type BEA, wherein the framework structure of the zeolitic material preferably comprises, more preferably consists of, Si, Al and O, wherein the molar ratio of Si:Al, calculated as SiO$_2$:Al$_2$O$_3$, is preferably in the range of from 2:1 to 1200:1, more preferably in the range of from 10:1 to 400:1, more preferably in the range of from 15:1 to 100:1, more preferably in the range of from 18:1 to 30:1, more preferably in the range of from 20:1 to 26:1, said zeolitic material preferably comprising at most 0.001 weight-%, more preferably from 0 to 0.0001 weight-%, more preferably from 0 to 0.00001 weight-%, of copper, calculated as CuO.

Preferably, the non-zeolitic oxidic material of the DOC coating according to (ii.3) comprises one or more of alumina, silica and zirconia, preferably one or more of alumina and silica, more preferably alumina, more preferably gamma-alumina, wherein the non-zeolitic oxidic material preferably further comprises one or more of manganese, silicon and zirconium, wherein the non-zeolitic oxidic material more preferably comprises alumina and manganese, wherein the non-zeolitic oxidic material of the DOC coating according to (ii.3) more preferably comprises the alumina in an amount in the range of from 80 to 99 weight-%, more preferably in the range of from 85 to 98 weight-%, more preferably in the range of from 90 to 97 weight-%, based on the weight of the non-zeolitic oxidic material, wherein the non-zeolitic oxidic material of the DOC coating according to (ii.3) more preferably exhibits a BET specific surface area greater than 75 $m^2/g$, more preferably greater than 100 $m^2/g$, wherein the non-zeolitic oxidic material of the DOC coating according to (ii.3) more preferably exhibits a pore volume of greater than 0.04 $cm^3/g$, more preferably greater than 0.06 $cm^3/g$, and wherein the zeolitic material preferably is a 12-membered ring pore zeolitic material, wherein the 12-membered ring pore zeolitic material preferably has a framework type selected from the group consisting of BEA, FAU, USY, GME, MOR, OFF, a mixture of two or more thereof and a mixed type of two or more thereof, more preferably selected from the group consisting of BEA, USY, FAU, a mixture of two or more thereof and a mixed type of two or more thereof, wherein more preferably the 12-membered ring pore zeolitic material has a framework type BEA, wherein the framework structure of the zeolitic material preferably comprises, more preferably consists of, Si, Al and O, wherein the molar ratio of Si:Al, calculated as $SiO_2:Al_2O_3$, is preferably in the range of from 2:1 to 1200:1, more preferably in the range of from 10:1 to 400:1, more preferably in the range of from 15:1 to 100:1, more preferably in the range of from 18:1 to 30:1, more preferably in the range of from 20:1 to 26:1, said zeolitic material preferably comprising at most 0.001 weight-%, more preferably from 0 to 0.0001 weight-%, more preferably from 0 to 0.00001 weight-%, of copper, calculated as CuO, wherein the zeolitic material comprises at most 0.001 weight-%, more preferably from 0 to 0.0001 weight-%, more preferably from 0 to 0.00001 weight-%, of iron, calculated as $Fe_2O_3$; or wherein the zeolitic material comprises iron, preferably in an amount in the range of from 0.5 to 8 weight-%, more preferably in the range of from 1 to 5 weight-%, calculated as $Fe_2O_3$.

Preferably, the gas heating component according to (ii) consists of (ii.1), (ii.2), and (ii.3).

Preferably, the gas heating component according to (ii) consists of (ii.1), and (ii.3), wherein the gas heating component according to (ii) preferably consists of (ii.1), (ii.2), and (ii.3).

Preferably, the DOC coating according to (ii.3) exhibits essentially the same, preferably the same chemical and physical characteristics as the DOC coating according to (i.3), wherein preferably the coatings of the gas heating component according to (ii) exhibit essentially the same, preferably the same chemical and physical characteristics as the coatings of the catalyst according to (i).

Preferably, the outlet end of the first substrate and the inlet end of the second substrate are arranged opposite to each other, wherein the angle between the surface normal of the surface defined by the outlet end of the first substrate and the surface normal of the surface defined by the inlet end of the second substrate is preferably in the range of from 0 to 5°, more preferably in the range of from 0 to 3°, more preferably in the range of from 0 to 1°.

Preferably, the outlet end of the first substrate and the inlet end of the second substrate are spaced from one another, preferably at a distance in the range of from 2 to 20 mm, preferably in the range of from 5 to 15 mm, more preferably in the range of from 8 to 12 mm, wherein the outlet end of the first substrate and the inlet end of the second substrate are preferably spaced from one another by one or more spacer means, preferably one or more spacer rods, wherein a given spacer rod is preferably fixed at either the outlet end of the first substrate, or at the inlet end of the second substrate, or at the outlet end of the first substrate as well as at the inlet end of the second substrate, wherein the one or more spacer means, preferably the one or more spacer rods, are preferably electrically insulating.

Preferably, the first substrate and the second substrate together form one single substrate which comprises an inlet end, an outlet end, a substrate axial length extending from the inlet end to the outlet end of the single substrate, and a plurality of passages defined by internal walls of the single substrate extending therethrough, wherein the DOC coating according to (i.3) and the DOC coating according to (ii.3) together form one single DOC coating, wherein the single DOC coating preferably is at least partially disposed on the NOx adsorber coating according to (i.2) and wherein the single DOC coating preferably extends over at least 90%, more preferably over 95 to 100%, more preferably over 98 to 100%, more preferably over 99 to 100%, of the substrate axial length of the single substrate;

wherein preferably the first substrate and the second substrate together form one single substrate which comprises an inlet end, an outlet end, a substrate axial length extending from the inlet end to the outlet end of the single substrate, and a plurality of passages defined by internal walls of the single substrate extending therethrough, wherein the NOx adsorber coating according to (i.2) and the NOx adsorber coating according to (ii.2) together form one single NOx adsorber coating, and wherein the DOC coating according to (i.3) and the DOC coating according to (ii.3) together form one single DOC coating;

wherein the single NOx adsorber coating preferably extends over at least 50%, more preferably over 70 to 100%, more preferably over 80 to 100%, more preferably over 95 to 100%, more preferably over 98 to 100%, more preferably over 99 to 100%, of the substrate axial length of the single substrate, and/or wherein the single DOC coating preferably is at least partially disposed on the single NOx adsorber coating and preferably extends over at least 90%, more preferably over 95 to 100%, more preferably over 98 to 100%, more preferably over 99 to 100%, of the substrate axial length of the single substrate.

Preferably, the system further comprises a jacket surrounding the first substrate according to (i) and the second substrate according to (ii), wherein preferably from 95 to 100%, more preferably from 98 to 100%, more preferably from 99 to 100% of the inlet end face of the first substrate and preferably from 95 to 100%, more preferably from 98 to 100%, more preferably from 99 to 100% of the outlet end face of the second substrate are not covered by the jacket, wherein the jacket preferably comprises one or more means for connecting the second substrate to an electrical power supply.

Second Alternative Arrangement

Preferably, the DOC component is arranged downstream of the gas heating component.

Preferably, the NOx adsorber component is comprised in
(i) a catalyst comprising
  (i.1) a first substrate which comprises an inlet end, an outlet end, a substrate axial length extending from the inlet end to the outlet end of the first substrate, and a plurality of passages defined by internal walls of the first substrate extending therethrough;
  (i.2) an NOx adsorber coating disposed on the surface of the internal walls of the first substrate over at least 50% of the substrate axial length of the first substrate, the NOx adsorber coating comprising a platinum group metal component and a 10-membered ring pore zeolitic material having a framework type selected from the group consisting of FER, TON, MTT, SZR, MWW, AEL, HEU, AFO, a mixture of two or more thereof and a mixed type of two or more thereof.

Preferably, the NOx adsorber coating according to (i.2) is disposed on the surface of the internal walls of the first substrate over 70 to 100%, preferably 80 to 100%, more preferably 90 to 100%, more preferably 95 to 100%, more preferably 98 to 100%, more preferably 99 to 100%, of the substrate axial length of the first substrate, wherein the first NOx adsorber coating according to (i.2) preferably is disposed on the surface of the internal walls of the first substrate from the inlet end to the outlet end of the first substrate.

Preferably, the platinum group metal component of the NOx adsorber coating according to (i.2) comprises one or more of palladium, platinum, rhodium, iridium, osmium and ruthenium, preferably one or more of palladium, platinum and rhodium, more preferably one or more of palladium and platinum, wherein the platinum group metal component more preferably comprises, more preferably is, palladium, wherein the first NOx adsorber coating according to (i.2) comprises the platinum group metal component, preferably palladium, at a loading, calculated as elemental platinum group metal, preferably as elemental Pd, preferably in the range of from 30 to 300 g/ft$^3$, more preferably in the range of from 45 to 200 g/ft$^3$, more preferably in the range of from 60 to 150 g/ft$^3$, more preferably in the range of from 60 to 100 g/ft$^3$ or in the range of from 100 to 150 g/ft$^3$, more preferably in the range of from 60 to 80 g/ft$^3$ or in the range of from of from 100 to 140 g/ft$^3$.

Preferably, the platinum group metal component of the NOx adsorber coating according to (i.2) is comprised in the 10-membered ring pore zeolitic material of the NOx adsorber coating according to (i.2), wherein the platinum group metal component preferably is present in said zeolitic material in an amount in the range of from 0.5 to 10 weight-%, more preferably in the range of from 1 to 6 weight-%, more preferably in the range of from 1.25 to 4 weight-%, more preferably in the range of from 1.5 to 3 weight-%, based on the total weight of the 10-membered ring pore zeolitic material of the NOx adsorber coating according to (i.2).

Preferably, the 10-membered ring pore zeolitic material of the NOx adsorber coating according to (i.2) has a framework type selected from the group consisting of FER, TON, a mixture thereof and a mixed type thereof, wherein more preferably the 10-membered ring pore zeolitic material of the NOx adsorber coating according to (i.2) has a framework type FER, wherein the framework structure of the 10-membered ring pore zeolitic material of the NOx adsorber coating according to (i.2) preferably comprises, more preferably consists of, a tetravalent element Y, a trivalent element X and oxygen, wherein Y is preferably one or more of Si, Sn, Ti, Zr and Ge, more preferably Si, and X is preferably one or more of Al, B, In and Ga, more preferably Al, wherein the molar ratio of Y:X, calculated as $YO_2:X_2O_3$, is preferably in the range of from 2:1 to 100:1, more preferably in the range of from 10:1 to 55:1, more preferably in the range of from 12:1 to 40:1, more preferably in the range of from 15:1 to 28:1, more preferably in the range of from 18:1 to 25:1.

Preferably, the NOx adsorber coating according to (i.2) comprises the 10-membered ring pore zeolitic material in an amount in the range of from 80 to 99.75 weight-%, preferably in the range of from 85 to 99.5 weight-%, more preferably in the range of from 90 to 99.25 weight-%, more preferably in the range of from 95 to 99 weight-%, based on the weight of the NOx adsorber coating.

Preferably, the catalyst according to (i) comprises the NOx adsorber coating according to (i.2) at a loading in the range of from 0.5 to 8 g/in$^3$, preferably in the range of from 1 to 5 g/in$^3$, more preferably in the range of from 1.5 to 4.5 g/in$^3$, more preferably in the range of from 2 to 4 g/in$^3$.

Preferably, from 95 to 100 weight-%, preferably from 98 to 100 weight-%, more preferably from 99 to 100 weight-%, more preferably from 99.5 to 100 weight-%, of the NOx adsorber coating according to (i.2) consist of the platinum group metal component and the 10-membered ring pore zeolitic material.

Preferably, the first substrate according to (i.1) is a flow-through substrate or a wall flow filter substrate, preferably a flow-through substrate, wherein the flow-through substrate is preferably one or more of a cordierite flow-through substrate and a metallic flow-through substrate, wherein the first substrate according to (i.1) preferably has a cylindrical shape, the diameter of the first substrate preferably being in the range of from 3 to 10 inches, more preferably in the range of from 3.5 to 8 inches, more preferably in the range of from 4 to 6 inches, wherein the first substrate according to (i.1) preferably having an axial length in the range of from 0.5 to 8 inches, more preferably in the range of from 1 to 5 inches, more preferably in the range of from 1.25 to 3 inches.

Preferably, the catalyst according to (i) consists of the first substrate according to (i.1) and the NOx adsorber coating according to (i.2).

Preferably, the DOC component is comprised in
(iii) a catalyst comprising
  (iii.1) a third substrate which comprises an inlet end, an outlet end, a substrate axial length extending from the inlet end to the outlet end of the third substrate, and a plurality of passages defined by internal walls of the third substrate extending therethrough;
  (iii.2) a first DOC coating disposed on the surface of the internal walls of the third substrate over at least 70% of the substrate axial length of the third substrate, the first DOC coating comprising a platinum group metal component and a non-zeolitic oxidic material comprising one or more of alumina, silica, zirconia and titania; and
  (iii.3) optionally a second DOC coating at least partially disposed on the first DOC coating and extending over at least 20% of the substrate axial length of the third substrate, the second DOC coating comprising a platinum group metal component and a non-zeolitic oxidic material comprising one or more of alumina, silica, zirconia and titania, wherein the second DOC coating is preferably disposed from the outlet end to the inlet end of the third substrate.

Preferably, the platinum group metal component of the first DOC coating according to (iii.2) comprises one or more of palladium, platinum, rhodium, iridium, osmium and ruthenium, preferably one or more of palladium, platinum and rhodium, more preferably one or more of palladium and platinum, wherein the second platinum group metal component more preferably comprises, more preferably is, platinum and palladium, wherein the weight ratio of Pt to Pd, Pt:Pd, calculated as elemental Pt and Pd, is preferably in the range of from 0.5:1 to 5:1, more preferably in the range of from 0.75:1 to 4.5:1, more preferably in the range of from 1:1 to 4:1, more preferably in the range of from 1.5:1 to 3:1.

Preferably, the non-zeolitic oxidic material according to (iii.2) comprises one or more of alumina, silica, zirconia, silica-alumina, alumina-zirconia, silica-zirconia, preferably one or more of alumina, silica, and silica-alumina, more preferably silica-alumina, more preferably gamma-alumina doped with silica, wherein the non-zeolitic oxidic material more preferably comprises alumina in an amount in the range of from 80 to 99 weight-%, more preferably in the range of from 85 to 95 weight-%, more preferably in the range of from 88 to 90 weight-%, based on the weight of the non-zeolitic oxidic material, wherein the non-zeolitic oxidic material more preferably exhibits a BET specific surface area greater than 75 m$^2$/g, more preferably greater than 100 m$^2$/g, wherein the non-zeolitic oxidic material more preferably exhibits a pore volume of greater than 0.04 cm$^3$/g, more preferably greater than 0.06 cm$^3$/g.

Preferably, the first DOC coating according to (iii.2) further comprises a zeolitic material, preferably a 12-membered ring pore zeolitic material, wherein the 12-membered ring pore zeolitic material has a framework type preferably selected from the group consisting of BEA, FAU, USY, GME, MOR, OFF, a mixture of two or more thereof and a mixed type of two or more thereof, more preferably selected from the group consisting of BEA, USY, FAU, a mixture of two or more thereof and a mixed type of two or more thereof, wherein more preferably the 12-membered ring pore zeolitic material has a framework type BEA, wherein the framework structure of the zeolitic material preferably comprises, more preferably consists of, Si, Al and oxygen, wherein the molar ratio of Si:Al, calculated as SiO$_2$:Al$_2$O$_3$, is preferably in the range of from 2:1 to 1200:1, more preferably in the range of from 10:1 to 400:1, more preferably in the range of from 15:1 to 100:1, more preferably in the range of from 18:1 to 30:1, more preferably in the range of from 20:1 to 26:1, said zeolitic material preferably comprising at most 0.001 weight-%, more preferably from 0 to 0.0001 weight-%, more preferably from 0 to 0.00001 weight-%, of copper, calculated as CuO.

Preferably, the zeolitic material comprises at most 0.001 weight-%, more preferably from 0 to 0.0001 weight-%, more preferably from 0 to 0.00001 weight-%, of iron, calculated as Fe$_2$O$_3$; or wherein the zeolitic material comprises iron, preferably in an amount in the range of from 0.5 to 8 weight-%, more preferably in the range of from 1 to 5 weight-%, calculated as Fe$_2$O$_3$.

Preferably, the weight ratio of the non-zeolitic oxidic material of the first DOC coating according to (iii.2) to the zeolitic material of the first DOC coating according to (iii.2) is in the range of from 1:1 to 10:1, preferably in the range of from 1.5:1 to 8:1, more preferably in the range of from 2:1 to 4.5:1.

Preferably, the catalyst according to (iii) comprises the first DOC coating according to (iii.2) at a loading in the range of from 0.5 to 5 g/in$^3$, preferably in the range of from 0.75 to 4 g/in$^3$, more preferably in the range of from 1 to 3 g/in$^3$, more preferably in the range of from 1.25 to 2.5 g/in$^3$.

Preferably, from 98 to 100 weight-%, preferably from 99 to 100 weight-%, more preferably from 99.5 to 100 weight-%, of the first DOC coating according to (iii.2) consist of the platinum group metal component, preferably Pt and Pd, wherein the non-zeolitic oxidic material preferably comprises one or more of alumina, silica, zirconia, silica-alumina, alumina-zirconia, silica-zirconia, preferably one or more of alumina, silica, and silica-alumina, more preferably silica-alumina, more preferably gamma-alumina doped with silica, wherein the non-zeolitic oxidic material more preferably comprises alumina in an amount in the range of from 80 to 99 weight-%, more preferably in the range of from 85 to 95 weight-%, more preferably in the range of from 88 to 90 weight-%, based on the weight of the non-zeolitic oxidic material, wherein the non-zeolitic oxidic material more preferably exhibits a BET specific surface area greater than 75 m$^2$/g, more preferably greater than 100 m$^2$/g, wherein the non-zeolitic oxidic material more preferably exhibits a pore volume of greater than 0.04 cm$^3$/g, more preferably greater than 0.06 cm$^3$/g, and wherein the zeolitic material preferably being a 12-membered ring pore zeolitic material, wherein the 12-membered ring pore zeolitic material has a framework type preferably selected from the group consisting of BEA, FAU, USY, GME, MOR, OFF, a mixture of two or more thereof and a mixed type of two or more thereof, more preferably selected from the group consisting of BEA, USY, FAU, a mixture of two or more thereof and a mixed type of two or more thereof, wherein more preferably the 12-membered ring pore zeolitic material has a framework type BEA, wherein the framework structure of the zeolitic material preferably comprises, more preferably consists of, Si, Al and oxygen, wherein the molar ratio of Si:Al, calculated as SiO$_2$:Al$_2$O$_3$, is preferably in the range of from 2:1 to 1200:1, more preferably in the range of from 10:1 to 400:1, more preferably in the range of from 15:1 to 100:1, more preferably in the range of from 18:1 to 30:1, more preferably in the range of from 20:1 to 26:1, said zeolitic material preferably comprising at most 0.001 weight-%, more preferably from 0 to 0.0001 weight-%, more preferably from 0 to 0.00001 weight-%, of copper, calculated as CuO, wherein the zeolitic material more preferably comprises at most 0.001 weight-%, more preferably from 0 to 0.0001 weight-%, more preferably from 0 to 0.00001 weight-%, of iron, calculated as Fe$_2$O$_3$; or wherein the zeolitic material comprises iron, preferably in an amount in the range of from 0.5 to 8 weight-%, more preferably in the range of from 1 to 5 weight-%, calculated as Fe$_2$O$_3$.

Preferably, the first DOC coating according to (iii.2) extends over 80 to 100%, preferably over 90 to 100%, more preferably over 95 to 100%, more preferably over 98 to 100%, more preferably over 99 to 100%, of the substrate axial length of the third substrate according to (iii.1).

Preferably, the catalyst according to (iii) comprises a second DOC coating according to (iii.3).

Preferably, the platinum group metal component of the second DOC coating according to (iii.3) comprises one or more of palladium, platinum, rhodium, iridium, osmium and ruthenium, preferably one or more of palladium, platinum and rhodium, more preferably one or more of palladium and platinum, wherein the second platinum group metal component more preferably comprises, more preferably is, platinum and palladium, wherein the weight ratio of Pt to Pd, Pt:Pd, calculated as elemental Pt and Pd, is preferably in the range of from 2:1 to 20:1, more preferably in the range of from 3:1 to 8:1, more preferably in the range of from 4:1 to 7.5:1, more preferably in the range of from 5:1 to 7:1;

wherein the platinum group metal component of the second DOC coating according to (iii.3) more preferably comprises platinum, wherein the second DOC coating according to (iii.3) comprises the platinum at a loading, calculated as elemental Pt, preferably in the range of from 15 to 200 g/ft$^3$, more preferably in the range of from 20 to 150 g/ft$^3$, more preferably in the range of from 30 to 100 g/ft$^3$, more preferably in the range of from 40 to 90 g/ft$^3$, more preferably in the range of from 50 to 80 g/ft$^3$, wherein the platinum group metal component of the second DOC coating according to (iii.3) is more preferably supported on the non-zeolitic oxidic material according to (iii.3), more preferably at a loading in the range of from 1 to 5 weight-%, more preferably in the range of from 2 to 4 weight-%, calculated as element or elements, respectively, and based on the total weight of the non-zeolitic oxidic material according to (ii.3).

Preferably, the non-zeolitic oxidic material of the second DOC coating according to (iii.3) comprises one or more of alumina, silica, zirconia, silica-alumina, alumina-zirconia, and silica-zirconia, preferably one or more of alumina, silica, and silica-alumina, more preferably silica-alumina, more preferably gamma-alumina doped with silica, wherein the non-zeolitic oxidic material of the second DOC coating according to (iii.3) preferably comprises alumina in an amount in the range of from 80 to 99 weight-%, more preferably in the range of from 85 to 95 weight-%, more preferably in the range of from 88 to 90 weight-%, based on the weight of the non-zeolitic oxidic material, wherein the non-zeolitic oxidic material of the second DOC coating according to (iii.3) more preferably exhibits a BET specific surface area greater than 75 m$^2$/g, more preferably greater than 100 m$^2$/g, wherein the non-zeolitic oxidic material of the second DOC coating according to (iii.3) more preferably exhibits a pore volume of greater than 0.04 cm$^3$/g, more preferably greater than 0.06 cm$^3$/g.

Preferably, the catalyst according to (iii) comprises the second DOC coating according to (iii.3) at a loading in the range of from 0.5 to 5 g/in$^3$, preferably in the range of from 0.75 to 4 g/in$^3$, more preferably in the range of from 0.75 to 3 g/in$^3$, more preferably in the range of from 1 to 2.5 g/in$^3$.

Preferably, from 98 to 100 weight-%, preferably from 99 to 100 weight-%, more preferably from 99.5 to 100 weight-%, of the second DOC coating according to (iii.3) consist of the platinum group metal component, preferably Pt and Pd, and the non-zeolitic oxidic material.

Preferably, the second DOC coating according to (iii.3) extends over 30 to 100%, preferably over 35 to 80%, more preferably over 40 to 60%, more preferably over 45 to 55%, of the substrate axial length of the third substrate according to (iii.1).

Preferably, the third substrate according to (iii.1) is a flow-through substrate, preferably one or more of a cordierite flow-through substrate and a metallic flow-through substrate, wherein the third substrate according to (iii.1) preferably has a cylindrical shape, the diameter of the third substrate preferably being in the range of from 3 to 10 inches, more preferably in the range of from 3.5 to 8 inches, more preferably in the range of from 4 to 6 inches, the third substrate according to (iii.1) preferably having an axial length in the range of from 1 to 10 inches, more preferably in the range of from 1.5 to 7 inches, more preferably in the range of from 2 to 5 inches.

Preferably, the catalyst according to (iii) consists of the third substrate according to (iii.1), the first DOC coating according to (iii.2) and preferably the second DOC coating according to (iii.3).

Gas Heating Component

Preferably, (ii) the gas heating component comprises
(ii.1) a second substrate comprising an inlet end, an outlet end, a substrate axial length extending from the inlet end to the outlet end of the second substrate, and a plurality of passages defined by internal walls of the second substrate extending therethrough;

wherein the inlet end of the second substrate according to (ii.1) and the outlet end of the first substrate according to (i.1) are coupled to allow gas exiting from the passages of the first substrate according to (i.1) to enter the passages of the second substrate according to (ii.1);

wherein the inlet end of the third substrate according to (iii.1) and the outlet end of the second substrate according to (ii.1) are coupled to allow gas exiting from the passages of the second substrate to enter the passages of the third substrate according to (iii.1);

wherein the internal walls of the second substrate according to (ii.1) are thermally conductive to allow heating thereof for heating of exhaust gas flowing through the passages of the second substrate.

Preferably, the second substrate according to (ii.1) is a flow-through substrate, preferably a metallic flow-through substrate, more preferably a metallic electrically and/or thermally conductive flow-through substrate.

Preferably, the second substrate according to (ii.1) has a cylindrical shape, the diameter of the second substrate preferably being in the range of from 3 to 10 inches, more preferably in the range of from 3.5 to 8 inches, more preferably in the range of from 4 to 6 inches, wherein more preferably, the diameter of the second substrate is in the range of from 90 to 110%, preferably in the range of from 95 to 105%, more preferably in the range of from 98 to 102% of the diameter of the first substrate, wherein the first substrate according to (i.1) is a flow-through substrate or a wall flow filter substrate, preferably a flow-through substrate, wherein the flow-through substrate is preferably one or more of a cordierite flow-through substrate and a metallic flow-through substrate, wherein the first substrate according to (i.1) preferably has a cylindrical shape, the diameter of the first substrate preferably being in the range of from 3 to 10 inches, more preferably in the range of from 3.5 to 8 inches, more preferably in the range of from 4 to 6 inches, wherein the first substrate according to (i.1) preferably having an axial length in the range of from 0.5 to 8 inches, more preferably in the range of from 1 to 5 inches, more preferably in the range of from 1.25 to 3 inches, said second substrate according to (ii.1) preferably having an axial length in the range of from 0.15 to 2 inches, more preferably in the range of from 0.20 to 1.5 inches, more preferably in the range of from 0.30 to 1 inch.

Preferably, the gas heating component according to (ii) consists of the second substrate according to (ii.1), said substrate being an uncoated substrate.

Preferably, the gas heating component according to (ii) further comprises
(ii.2) a first DOC coating disposed on the surface of the internal walls of the second substrate according to (ii.1) over at least 50% of the substrate axial length of the second substrate according to (ii.1), the first DOC coating comprising a platinum group metal component and a non-zeolitic oxidic material comprising one or more of alumina, silica, zirconia and titania;

(ii.3) optionally a second DOC coating at least partially disposed on the first DOC coating according to (ii.2) and extending over at least 50% of the substrate axial length of the second substrate according to (ii.1), the second DOC coating comprising a platinum group metal component and a non-zeolitic oxidic material comprising one or more of alumina, silica, zirconia and titania.

Preferably, the platinum group metal component of the first DOC coating according to (ii.2) comprises one or more of palladium, platinum, rhodium, iridium, osmium and ruthenium, preferably one or more of palladium, platinum and rhodium, more preferably one or more of palladium and platinum, wherein the second platinum group metal component more preferably comprises, more preferably is, platinum and palladium, wherein the weight ratio of Pt to Pd, Pt:Pd, calculated as elemental Pt and Pd, is preferably in the range of from 0.5:1 to 5:1, more preferably in the range of from 0.75:1 to 4.5:1, more preferably in the range of from 1:1 to 4:1, more preferably in the range of from 1.5:1 to 3:1.

Preferably, the platinum group metal component of the first DOC coating according to (ii.2) comprises platinum, wherein the first DOC coating according to (ii.2) comprises the platinum at a loading, calculated as elemental Pt, preferably in the range of from 15 to 200 g/ft$^3$, more preferably in the range of from 20 to 150 g/ft$^3$, more preferably in the range of from 30 to 100 g/ft$^3$, more preferably in the range of from 40 to 90 g/ft$^3$, more preferably in the range of from 50 to 80 g/ft$^3$, wherein the platinum group metal component of the first DOC coating according to (ii.2) is more preferably supported on the non-zeolitic oxidic material according to (ii.2), more preferably at a loading in the range of from 1 to 5 weight-%, more preferably in the range of from 2 to 4 weight-%, calculated as element or elements, respectively, and based on the total weight of the non-zeolitic oxidic material according to (ii.2).

Preferably, the non-zeolitic oxidic material according to (ii.2) comprises one or more of alumina, silica, zirconia, silica-alumina, alumina-zirconia, and silica-zirconia more preferably one or more of alumina, silica, and silica-alumina, more preferably silica-alumina, more preferably gamma-alumina doped with silica, wherein the non-zeolitic oxidic material more preferably comprises the alumina in an amount in the range of from 80 to 99 weight-%, more preferably in the range of from 85 to 95 weight-%, more preferably in the range of from 88 to 90 weight-%, based on the weight of the non-zeolitic oxidic material.

Preferably, the non-zeolitic oxidic material exhibits a BET specific surface area greater than 75 m$^2$/g, more preferably greater than 100 m$^2$/g;

Preferably, the non-zeolitic oxidic material more exhibits a pore volume of greater than 0.04 cm$^3$/g, more preferably greater than 0.06 cm$^3$/g.

Preferably, the first DOC coating according to (ii.2) preferably further comprises a zeolitic material, more preferably a 12-membered ring pore zeolitic material, wherein the 12-membered ring pore zeolitic material has a framework type preferably selected from the group consisting of BEA, FAU, USY, GME, MOR, OFF, a mixture of two or more thereof and a mixed type of two or more thereof, more preferably selected from the group consisting of BEA, USY, FAU, a mixture of two or more thereof and a mixed type of two or more thereof, wherein more preferably the 12-membered ring pore zeolitic material has a framework type BEA, wherein the framework structure of the zeolitic material preferably comprises, more preferably consists of, Si, Al and oxygen, wherein the molar ratio of Si:Al, calculated as SiO$_2$:Al$_2$O$_3$, is preferably in the range of from 2:1 to 1200:1, more preferably in the range of from 10:1 to 400:1, more preferably in the range of from 15:1 to 100:1, more preferably in the range of from 18:1 to 30:1, more preferably in the range of from 20:1 to 26:1, said zeolitic material preferably comprising at most 0.001 weight-%, more preferably from 0 to 0.0001 weight-%, more preferably from 0 to 0.00001 weight-%, of copper, calculated as CuO;

wherein the zeolitic material preferably comprises at most 0.001 weight-%, more preferably from 0 to 0.0001 weight-%, more preferably from 0 to 0.00001 weight-%, of iron, calculated as Fe$_2$O$_3$; or wherein the zeolitic material comprises iron, preferably in an amount in the range of from 0.5 to 8 weight-%, more preferably in the range of from 1 to 5 weight-%, calculated as Fe$_2$O$_3$;

wherein the weight ratio of the non-zeolitic oxidic material of the first DOC coating according to (ii.2) to the zeolitic material of the first DOC coating according to (ii.2) is preferably in the range of from 1:1 to 10:1, more preferably in the range of from 1.5:1 to 8:1, more preferably in the range of from 2:1 to 4.5:1.

Preferably, the gas heating component according to (ii) comprises the first DOC coating according to (ii.2) at a loading in the range of from 0.5 to 5 g/in$^3$, more preferably in the range of from 0.75 to 4 g/in$^3$, more preferably in the range of from 1 to 3 g/in$^3$, more preferably in the range of from 1.25 to 2.5 g/in$^3$.

Preferably, from 98 to 100 weight-%, more preferably from 99 to 100 weight-%, more preferably from 99.5 to 100 weight-%, of the first DOC coating according to (ii.2) consist of the platinum group metal component, preferably Pt and Pd, the non-zeolitic oxidic material and preferably the zeolitic material.

Preferably, the first DOC coating according to (ii.2) extends over 80 to 100%, more preferably over 90 to 100%, more preferably over 95 to 100%, more preferably over 98 to 100%, more preferably over 99 to 100%, of the substrate axial length of the second substrate according to (ii.1).

Optionally, the gas heating component according to (ii) comprises a second DOC coating according to (ii.3).

Preferably, the platinum group metal component of the second DOC coating according to (ii.3) comprises one or more of palladium, platinum, rhodium, iridium, osmium and ruthenium, preferably one or more of palladium, platinum and rhodium, more preferably one or more of palladium and platinum, wherein the second platinum group metal component more preferably comprises, more preferably is, platinum and palladium, wherein the weight ratio of Pt to Pd, Pt:Pd, calculated as elemental Pt and Pd, is preferably in the range of from 2:1 to 20:1, more preferably in the range of from 3:1 to 8:1, more preferably in the range of from 4:1 to 7.5:1, more preferably in the range of from 5:1 to 7:1.

Preferably, the non-zeolitic oxidic material of the second DOC coating according to (ii.3) comprises one or more of alumina, silica, zirconia, silica-alumina, alumina-zirconia, and silica-zirconia, more preferably one or more of alumina, silica, and silica-alumina, more preferably silica-alumina, more preferably gamma-alumina doped with silica, wherein the non-zeolitic oxidic material of the second DOC coating according to (iii.3) preferably comprises alumina in an amount in the range of from 80 to 99 weight-%, more preferably in the range of from 85 to 95 weight-%, more preferably in the range of from 88 to 90 weight-%, based on the weight of the non-zeolitic oxidic material.

Preferably, the non-zeolitic oxidic material exhibits a BET specific surface area greater than 75 m$^2$/g, more preferably greater than 100 m$^2$/g;

Preferably, the non-zeolitic oxidic material more exhibits a pore volume of greater than 0.04 cm$^3$/g, more preferably greater than 0.06 cm$^3$/g.

Preferably, the gas heating component according to (ii) comprises the second DOC coating according to (ii.3) at a loading in the range of from 0.5 to 5 g/in$^3$, more preferably in the range of from 0.75 to 4 g/in$^3$, more preferably in the range of from 0.75 to 3 g/in$^3$, more preferably in the range of from 1 to 2.5 g/in$^3$.

Preferably, from 98 to 100 weight-%, more preferably from 99 to 100 weight-%, more preferably from 99.5 to 100 weight-%, of the second DOC coating according to (ii.3) consist of the platinum group metal component, preferably Pt and Pd, and the non-zeolitic oxidic material;

Preferably, the second DOC coating according to (ii.3) extends over 30 to 100%, preferably over 35 to 80%, more preferably over 40 to 60%, more preferably over 45 to 55%, of the substrate axial length of the second substrate according to (ii.1).

Preferably, the gas heating component according to (ii) consists of the second substrate according to (ii.1), the first DOC coating according to (ii.2) and preferably the second DOC coating according to (ii.3).

Preferably, the coatings of the gas heating component according to (ii) exhibit essentially the same, preferably the same chemical and physical characteristics as the coatings of the catalyst according to (iii).

Preferably, the second substrate according to (ii.1) and the third substrate according to (iii.1) together form one single substrate which comprises an inlet end, an outlet end, a substrate axial length extending from the inlet end to the outlet end of the single substrate, and a plurality of passages defined by internal walls of the single substrate extending therethrough, wherein the first DOC coating according to (ii.2) and the first DOC coating according to (iii.2) together form one single first DOC coating, and wherein preferably the second DOC coating according to (ii.3) and the second DOC coating according to (iii.3) together form one single second DOC coating; wherein the single first DOC coating preferably extends over at least 90%, more preferably over 95 to 100%, more preferably over 98 to 100%, more preferably over 99 to 100%, of the substrate axial length of the single substrate, and wherein preferably the single second DOC coating extends over preferably at least 40%, more preferably over 45 to 100%, more preferably over 50 to 80%, of the substrate axial length of the single substrate.

Preferably, the outlet end of the second substrate and the inlet end of the third substrate are arranged opposite to each other, wherein the angle between the surface normal of the surface defined by the outlet end of the second substrate and the surface normal of the surface defined by the inlet end of the third substrate is preferably in the range of from 0 to 5°, more preferably in the range of from 0 to 3°, more preferably in the range of from 0 to 1°.

Preferably, the outlet end of the second substrate and the inlet end of the third substrate are spaced from one another, preferably at a distance in the range of from 2 to 20 mm, preferably in the range of from 5 to 15 mm, more preferably in the range of from 8 to 12 mm, wherein the outlet end of the second substrate and the inlet end of the third substrate are preferably spaced from one another by one or more spacer means, preferably one or more spacer rods, wherein a given spacer rod is preferably fixed at either the outlet end of the second substrate, or at the inlet end of the third substrate, or at the outlet end of the second substrate as well as at the inlet end of the third substrate, wherein the one or more spacer means, preferably the one or more spacer rods, are preferably electrically insulating.

SCR Component

Preferably, the SCR component is comprised in
(iv) a selective catalytic reduction (SCR) catalyst comprising
(iv.1) a fourth substrate, preferably a wall-flow filter substrate, comprising an inlet end, an outlet end, and a substrate axial length extending from the inlet end to the outlet end of the fourth substrate;
(iv.2) a selective catalytic reduction (SCR) coating disposed on the surface of the internal walls of the fourth substrate according to (iv.1);
wherein the inlet end of the fourth substrate according to (iv.1) and either the outlet end of the second substrate according to (ii.1) as defined in any one of the embodiments disclosed herein or the outlet end of the third substrate according to (iii.1) as defined in any one of the embodiments disclosed herein are coupled to allow exhaust gas exiting from the passages of the second substrate or exiting from the passages of the third substrate to enter the fourth substrate.

Preferably, the SCR coating according to (iv.2) comprises an 8-membered ring pore zeolitic material comprising one or more of copper and iron, preferably copper, wherein the amount of the one or more of copper and iron, calculated as CuO and Fe$_2$O$_3$, respectively, more preferably of copper, calculated as CuO, is in the range of from 1 to 10 weight-%, preferably in the range of from 2 to 8 weight-%, more preferably in the range of from 3 to 6 weight-%, based on the weight of the 8-membered ring pore zeolitic material comprising one or more of copper and iron.

Preferably, the 8-membered ring pore zeolitic material of the selective catalytic reduction coating has a framework type selected from the group consisting of CHA, AEI, RTH, LEV, DDR, KFI, ERI, AFX, a mixture of two or more thereof and a mixed type of two or more thereof, preferably selected from the group consisting of CHA, AEI, RTH, a mixture of two or more thereof and a mixed type of two or more thereof, more preferably selected from the group consisting of CHA and AEI, wherein more preferably the 8-membered ring pore zeolitic material of the selective catalytic reduction coating has a framework type CHA.

Preferably, the framework structure of the 8-membered ring pore zeolitic material comprises, preferably consists of, a tetravalent element Y, a trivalent element X and O, wherein Y is one or more of Si, Sn, Ti, Zr and Ge and X is one or more of Al, B, In and Ga, wherein the molar ratio of Y:X, calculated as YO$_2$:X$_2$O$_3$, is in the range of from 2:1 to 45:1, preferably in the range of from 10:1 to 40:1, more preferably in the range of from 15:1 to 30:1, wherein Y preferably comprises, more preferably is, Si, and wherein X preferably comprises, more preferably is, one or more of Al and B, preferably Al.

Preferably, the system according to any one of the embodiments disclosed hereinabove consists of the NOx adsorber component, the DOC component, the SCR component and the gas heating component.

Thus, it is particularly preferred according to the first alternative arrangement of the present invention that a NOx adsorber coating being said NOx adsorber component is disposed on a first substrate and a diesel oxidation catalyst (DOC) coating being said DOC component is at least partially disposed on the NOx adsorber coating as defined herein. Further in accordance with the first alternative arrangement, the gas heating component comprises a second substrate as defined herein.

Further, it is particularly preferred according to the second alternative arrangement of the present invention that a NOx adsorber coating being said NOx adsorber component is disposed on a first substrate, that the gas heating component comprises a second substrate and that a DOC coating being the DOC component is disposed on the third substrate. More preferably, the gas heating component comprises a first and optionally a second DOC coating.

As defined herein above, the DOC component is arranged downstream of the gas heating component according to the second alternative arrangement of the present invention. Alternatively, it is also conceivable to arrange the DOC component being a DOC coating disposed on a third substrate upstream of the gas heating component comprising a second substrate.

Process for Preparing a System

Further, the present invention relates a process for preparing a system for the treatment of an exhaust gas of a diesel combustion engine, preferably for preparing a system for the treatment of an exhaust gas of a diesel combustion engine according to any one of the embodiments disclosed herein, said process comprising
- (1) providing an NOx adsorber component, a diesel oxidation catalyst (DOC) component, a selective catalytic reduction (SCR) component, a gas heating component, and a reductant injector,
    wherein the NOx adsorber component is comprised in
    - (i) a catalyst which comprises
        - (i.1) a first substrate comprising an inlet end, an outlet end, a substrate axial length extending from the inlet end to the outlet end of the first substrate, and a plurality of passages defined by internal walls of the first substrate extending therethrough;
        - (i.2) an NOx adsorber coating being said NOx adsorber component, said coating being disposed on the surface of the internal walls of the first substrate over at least 50% of the substrate axial length of the first substrate, the NOx adsorber coating comprising a platinum group metal component and a 10-membered ring pore zeolitic material having a framework type selected from the group consisting of FER, TON, MTT, SZR, MWW, AEL, HEU, AFO, a mixture of two or more thereof and a mixed type of two or more thereof;
- (2) arranging the NOx adsorber component upstream of the gas heating component;
- (3) arranging the reductant injector upstream of the SCR component;
- (4) arranging the gas heating component upstream of the reductant injector;
- (5) arranging the DOC component upstream of the reductant injector;
- (6) arranging the DOC component and the gas heating component in directly consecutive order.

Preferably, no other component for the treatment of the exhaust gas is arranged between the DOC component according to (1) and the gas heating component according to (1).

Preferably, said components are arranged in a conduit for the exhaust gas, more preferably in sequential order, the upstream end of said conduit preferably designed to be arranged downstream of a diesel combustion engine, wherein more preferably, the upstream end of said conduit is arranged downstream of a diesel combustion engine.

Preferably, the DOC component is arranged upstream of the gas heating component, wherein the DOC component and the NOx adsorber component are preferably arranged upstream of the gas heating component.

Preferably, the reductant injector comprises, more preferably consists of, one or more of a hydrocarbon injector, a hydrocarbon in-cylinder post injector, and a urea injector.

Preferably, in the case where the DOC component and the NOx adsorber component are comprised in a catalyst, the catalyst is prepared by and/or the process further comprises
- (a) providing a first substrate, and a NOx adsorber mixture comprising water, a source of a platinum group metal component and a 10-membered ring pore zeolitic material;
- (b) disposing the NOx adsorber mixture obtained in (a) on the surface of the internal walls of the first substrate comprising an inlet end, an outlet end, a substrate axial length extending from the inlet end to the outlet end of the first substrate, and a plurality of passages defined by internal walls of the first substrate extending therethrough, over at least 50% of the substrate axial length of the first substrate;
- (c) optionally calcining of the coated substrate obtained in (b) in a gas atmosphere, preferably having a temperature in the range of from 400 to 800° C., preferably in the range of from 450 to 700° C., more preferably in the range of from 550 to 650° C., the gas atmosphere preferably being air,
    wherein, prior to calcining in (c), drying of the first NOx adsorber mixture disposed on the first substrate is performed in a gas atmosphere having a temperature in the range of from 90 to 150° C., preferably in the range of from 100 to 120° C., the gas atmosphere preferably being air, preferably for a duration in the range of from 0.5 to 4 hours, more preferably in the range of from 0.75 to 2 hours; wherein prior to calcining in (c), the coated substrate obtained in (b) is preferably dried in a gas atmosphere having a temperature in the range of from 90 to 150° C., more preferably in the range of from 100 to 120° C., the gas atmosphere more preferably being air,
- (d) providing a diesel oxidation catalyst (DOC) mixture comprising water, a source of a platinum group metal component, a non-zeolitic oxidic material comprising one or more of alumina, silica, zirconia and titania, and preferably a zeolitic material;
- (e) disposing the diesel oxidation mixture obtained in (d) on the first substrate comprising a NOx adsorber coating disposed thereon obtained according to (b) or (c), over at least 70% of the substrate axial length of the first substrate, wherein the coated substrate is preferably dried in a gas atmosphere having a temperature in the range of from 90 to 150° C., more preferably in the range of from 100 to 120° C., the gas atmosphere preferably being air, wherein the dried substrate is preferably calcined in a gas atmosphere having a temperature in the range of from 400 to 800° C., preferably in the range of from 450 to 700° C., more preferably in the range of from 550 to 650° C., preferably for a duration in the range of from 0.25 to 5 hours; obtaining a first substrate comprising a NOx adsorber coating and a diesel oxidation coating disposed thereon.

Preferably, the NOx adsorber mixture is disposed in (b) on the surface of the internal walls of the first substrate over 70 to 100%, preferably 80 to 100%, more preferably 90 to 100%, more preferably 95 to 100%, more preferably 98 to 100%, more preferably 99 to 100%, of the substrate axial length of the first substrate, wherein the first NOx adsorber mixture is preferably disposed in (b) on the surface of the internal walls of the first substrate from the inlet end to the outlet end of the first substrate.

Preferably, the platinum group metal component of the NOx adsorber mixture according to (a) comprises one or more of palladium, platinum, rhodium, iridium, osmium and ruthenium, preferably one or more of palladium, platinum and rhodium, more preferably one or more of palladium and platinum, wherein the platinum group metal component more preferably comprises, more preferably is, palladium.

Preferably, the 10-membered ring pore zeolitic material of the NOx adsorber mixture according to (a) is impregnated with the source of a platinum group metal component of the NOx adsorber mixture according to (a), wherein impregnating is preferably performed by mixing the 10-membered ring pore zeolitic material with the source of a platinum group metal component, preferably a source of palladium, more preferably a palladium nitrate solution, and wherein the impregnated 10-membered ring pore zeolitic material is preferably dispersed in water.

Preferably, the 10-membered ring pore zeolitic material of the NOx adsorber mixture according to (a) has a framework type selected from the group consisting of FER, TON, a mixture thereof and a mixed type thereof, wherein more preferably the 10-membered ring pore zeolitic material of the NOx adsorber mixture according to (a) has a framework type FER, wherein the framework structure of the 10-membered ring pore zeolitic material of the NOx adsorber mixture according to (a) preferably comprises, more preferably consists of, a tetravalent element Y, a trivalent element X and oxygen, wherein Y is preferably one or more of Si, Sn, Ti, Zr and Ge, more preferably Si, and X is preferably one or more of Al, B, In and Ga, more preferably Al, wherein the molar ratio of Y:X, calculated as $YO_2:X_2O_3$, is preferably in the range of from 2:1 to 100:1, more preferably in the range of from 10:1 to 55:1, more preferably in the range of from 12:1 to 40:1, more preferably in the range of from 15:1 to 28:1, more preferably in the range of from 18:1 to 25:1.

Preferably, the DOC mixture according to (d) is disposed on the first substrate comprising a NOx adsorber coating disposed thereon obtained according to (b) or (c), over 80 to 100%, preferably 90 to 100%, more preferably 95 to 100%, more preferably 98 to 100%, more preferably 99 to 100%, of the substrate axial length of the first substrate, wherein the DOC according to (d) preferably is disposed on the first substrate comprising a NOx adsorber coating disposed thereon obtained according to (b) or (c) from the inlet end to the outlet end of the first substrate.

Preferably, the platinum group metal component of the DOC mixture according to (d) comprises one or more of palladium, platinum, rhodium, iridium, osmium and ruthenium, preferably one or more of palladium, platinum and rhodium, more preferably one or more of palladium and platinum, more preferably comprises, more preferably is, platinum, wherein the non-zeolitic oxidic material according to (d) is more preferably impregnated with the platinum group metal component of the DOC mixture according to (d).

Preferably, the non-zeolitic oxidic material of the DOC mixture according to (d) comprises one or more of alumina, silica and zirconia, preferably one or more of alumina and silica, more preferably alumina, more preferably gamma-alumina, wherein the non-zeolitic oxidic material preferably further comprises one or more of manganese, silicon and zirconium, wherein the non-zeolitic oxidic material more preferably comprises alumina and manganese, wherein the non-zeolitic oxidic material of the DOC mixture according to (d) more preferably comprises the alumina in an amount in the range of from 80 to 99 weight-%, more preferably in the range of from 85 to 98 weight-%, more preferably in the range of from 90 to 97 weight-%, based on the weight of the non-zeolitic oxidic material.

Preferably, the DOC mixture according to (d) further comprises a zeolitic material, preferably a 12-membered ring pore zeolitic material, wherein the 12-membered ring pore zeolitic material preferably has a framework type selected from the group consisting of BEA, FAU, USY, GME, MOR, OFF, a mixture of two or more thereof and a mixed type of two or more thereof, more preferably selected from the group consisting of BEA, USY, FAU, a mixture of two or more thereof and a mixed type of two or more thereof, wherein more preferably the 12-membered ring pore zeolitic material has a framework type BEA, wherein the framework structure of the zeolitic material preferably comprises, more preferably consists of, Si, Al and O, wherein the molar ratio of Si:Al, calculated as $SiO_2:Al_2O_3$, is preferably in the range of from 2:1 to 1200:1, more preferably in the range of from 10:1 to 400:1, more preferably in the range of from 15:1 to 100:1, more preferably in the range of from 18:1 to 30:1, more preferably in the range of from 20:1 to 26:1, said zeolitic material preferably comprising at most 0.001 weight-%, more preferably from 0 to 0.0001 weight-%, more preferably from 0 to 0.00001 weight-%, of copper, calculated as CuO.

Preferably, the first substrate according to (a) is a flow-through substrate or a wall flow filter substrate, preferably a flow-through substrate, wherein the flow-through substrate is preferably one or more of a cordierite flow-through substrate and a metallic flow-through substrate, more preferably a metallic flow-through substrate, said first substrate preferably having a cylindrical shape, the diameter of the first substrate preferably being in the range of from 3 to 10 inches, more preferably in the range of from 3.5 to 8 inches, more preferably in the range of from 4 to 6 inches, the first substrate preferably having an axial length in the range of from 3 to 10 inches, more preferably in the range of from 3.5 to 8 inches, more preferably in the range of from 4 to 6 inches.

Preferably, the gas heating component according to (1) comprises a second substrate comprising an inlet end, an outlet end, a substrate axial length extending from the inlet end to the outlet end of the second substrate, and a plurality of passages defined by internal walls of the second substrate extending therethrough, and wherein the inlet end of the second substrate and the outlet end of the first substrate according to (a) are coupled to allow exhaust gas exiting from the passages of the first substrate to enter the passages of the second substrate;

wherein the internal walls of the second substrate are thermally conductive to allow heating thereof for heating of exhaust gas flowing through the passages of the second substrate.

Preferably, the second substrate is a flow-through substrate, preferably a metallic flow-through substrate, more preferably a metallic electrically and/or thermally conductive flow-through substrate.

Preferably, the second substrate has a cylindrical shape, the diameter of the second substrate preferably being in the range of from 3 to 10 inches, more preferably in the range of from 3.5 to 8 inches, more preferably in the range of from 4 to 6 inches, wherein more preferably, the diameter of the second substrate is in the range of from 90 to 110%, preferably in the range of from 95 to 105%, more preferably in the range of from 98 to 102% of the diameter of the first substrate, wherein the first substrate preferably has a diameter in the range of from 3 to 10 inches, more preferably in the range of from 3.5 to 8 inches, more preferably in the range of from 4 to 6 inches, the first substrate preferably having an axial length in the range of from 3 to 10 inches, more preferably in the range of from 3.5 to 8 inches, more preferably in the range of from 4 to 6 inches, said second substrate preferably having an axial length in the range of from 0.15 to 2 inches, more preferably in the range of from 0.20 to 1.5 inches, more preferably in the range of from 0.30 to 1 inch.

Preferably, the gas heating component according to (1) is prepared by and/or the process further comprises
- (g.1) optionally disposing an NOx adsorber mixture on the surface of the internal walls of the second substrate over at least 50% of the substrate axial length of the second substrate, the NOx adsorber mixture comprising a source of a platinum group metal component and a 10-membered ring pore zeolitic material having a framework type selected from the group consisting of FER, TON, MTT, SZR, MWW, AEL, HEU, AFO, a mixture of two or more thereof and a mixed type of two or more thereof;
- (g.2) disposing a diesel oxidation catalyst (DOC) mixture on the surface of the internal walls of the second substrate and/or on the NOx adsorber coating of the substrate obtained from (g.1) over at least 70% of the substrate axial length of the second substrate, the DOC mixture comprising a source of a platinum group metal component and a source of a non-zeolitic oxidic material comprising one or more of alumina, silica, zirconia and titania.

Preferably, the NOx adsorber mixture according to (g.1) is disposed on the surface of the internal walls of the second substrate over 70 to 100%, preferably 80 to 100%, more preferably 90 to 100%, more preferably 95 to 100%, more preferably 98 to 100%, more preferably 99 to 100%, of the substrate axial length of the second substrate,
wherein the NOx adsorber mixture according to (g.1) preferably is disposed on the surface of the internal walls of the second substrate from the outlet end to the inlet of the second substrate.

Preferably, the platinum group metal component of the NOx adsorber mixture according to (g.1) comprises one or more of palladium, platinum, rhodium, iridium, osmium and ruthenium, preferably one or more of palladium, platinum and rhodium, more preferably one or more of palladium and platinum, wherein the platinum group metal component more preferably comprises, more preferably is, palladium.

Preferably, the 10-membered ring pore zeolitic material of the NOx adsorber mixture according to (g.1) is impregnated with the source of a platinum group metal component of the NOx adsorber mixture according to (g.1).

Preferably, the 10-membered ring pore zeolitic material of the NOx adsorber mixture according to (g.1) has a framework type selected from the group consisting of FER, TON, a mixture thereof and a mixed type thereof, wherein more preferably the 10-membered ring pore zeolitic material of the NOx adsorber mixture according to (g.1) has a framework type FER, wherein the framework structure of the 10-membered ring pore zeolitic material of the NOx adsorber mixture according to (g.1) preferably comprises, more preferably consists of, a tetravalent element Y, a trivalent element X and oxygen, wherein Y is preferably one or more of Si, Sn, Ti, Zr and Ge, more preferably Si, and X is preferably one or more of Al, B, In and Ga, more preferably Al, wherein the molar ratio of Y:X, calculated as $YO_2:X_2O_3$, is preferably in the range of from 2:1 to 100:1, more preferably in the range of from 10:1 to 55:1, more preferably in the range of from 12:1 to 40:1, more preferably in the range of from 15:1 to 28:1, more preferably in the range of from 18:1 to 25:1.

Preferably, the DOC mixture according to (g.2) is disposed on the surface of the internal walls of the second substrate and/or on the NOx adsorber coating of the substrate obtained according to (g.1) over 80 to 100%, preferably 90 to 100%, more preferably 95 to 100%, more preferably 98 to 100%, more preferably 99 to 100%, of the substrate axial length of the first substrate, wherein the DOC mixture according to (g.2) preferably is disposed on the surface of the internal walls of the second substrate and/or on the NOx adsorber coating of the substrate obtained according to (g.1) from the inlet end to the outlet end of the first substrate.

Preferably, the DOC mixture according to (g.2) is disposed on the surface of the internal walls of the second substrate and/or on the NOx adsorber coating of the substrate obtained according to (g.1) over 80 to 100%, more preferably 90 to 100%, more preferably 95 to 100%, more preferably 98 to 100%, more preferably 99 to 100%, of the substrate axial length of the first substrate, wherein the DOC mixture according to (g.2) preferably is disposed on the surface of the internal walls of the second substrate and/or on the NOx adsorber coating of the substrate obtained according to (g.1) from the inlet end to the outlet end of the first substrate.

Preferably, the platinum group metal component of the DOC mixture according to (g.2) comprises one or more of palladium, platinum, rhodium, iridium, osmium and ruthenium, preferably one or more of palladium, platinum and rhodium, more preferably one or more of palladium and platinum, more preferably comprises, more preferably is, platinum.

Preferably, the non-zeolitic oxidic material according to (g.2) is impregnated with the source of a platinum group metal component of the DOC mixture according to (g.2);
wherein the source of a non-zeolitic oxidic material of the DOC coating according to (g.2) preferably comprises one or more of alumina, silica and zirconia, more preferably one or more of alumina and silica, more preferably alumina, more preferably gamma-alumina, wherein the source of a non-zeolitic oxidic material preferably further comprises one or more of manganese, silicon and zirconium, wherein the source of a non-zeolitic oxidic material more preferably comprises alumina and manganese, wherein the source of a non-zeolitic oxidic material of the DOC mixture according to (g.2) more preferably comprises alumina in an amount in the range of from 80 to 99 weight-%, more preferably in the range of from 85 to 98 weight-%, more preferably in the range of from 90 to 97 weight-%, based on the weight of the non-zeolitic oxidic material;
wherein the DOC mixture according to (g.2) preferably further comprises a zeolitic material, more preferably a 12-membered ring pore zeolitic material, wherein the 12-membered ring pore zeolitic material preferably has a framework type selected from the group consisting of BEA, FAU, USY, GME, MOR, OFF, a mixture of two or more thereof and a mixed type of two or more thereof, more preferably selected from the group consisting of BEA, USY, FAU, a mixture of two or more thereof and a mixed type of two or more thereof, wherein more preferably the 12-membered ring pore zeolitic material has a framework type BEA, wherein the framework structure of the zeolitic material preferably comprises, more preferably consists of, Si, Al and O, wherein the molar ratio of Si:Al, calculated as $SiO_2:Al_2O_3$, is preferably in the range of from 2:1 to 1200:1, more preferably in the range of from 10:1 to 400:1, more preferably in the range of from 15:1 to 100:1, more preferably in the range of from 18:1 to 30:1, more preferably in the range of from 20:1 to 26:1, said zeolitic material preferably comprising at most 0.001 weight-%, more preferably from 0 to 0.0001 weight-%, more preferably from 0 to 0.00001 weight-%, of copper, calculated as CuO; wherein said zeolitic material preferably comprises at most 0.001 weight-%, more preferably from 0 to 0.0001 weight-%, more preferably from 0 to 0.00001 weight-%, of iron, calculated as $Fe_2O_3$; or wherein the zeolitic material preferably comprises iron, preferably in an amount in the range of from 0.5 to 8 weight-%, more preferably in the range of from 1 to 5 weight-%, calculated as $Fe_2O_3$.

Preferably, the outlet end of the first substrate and the inlet end of the second substrate are arranged opposite to each other, wherein the angle between the surface normal of the surface defined by the outlet end of the first substrate and the surface normal of the surface defined by the inlet end of the second substrate is preferably in the range of from 0 to 5°, more preferably in the range of from 0 to 3°, more preferably in the range of from 0 to 1°.

Preferably, the outlet end of the first substrate and the inlet end of the second substrate are spaced from one another, preferably at a distance in the range of from 2 to 20 mm, preferably in the range of from 5 to 15 mm, more preferably in the range of from 8 to 12 mm, wherein the outlet end of the first substrate and the inlet end of the second substrate are preferably spaced from one another by one or more spacer means, preferably one or more spacer rods, wherein a given spacer rod is preferably fixed at either the outlet end of the first substrate, or at the inlet end of the second substrate, or at the outlet end of the first substrate as well as at the inlet end of the second substrate, wherein the one or more spacer means, preferably the one or more spacer rods, are preferably electrically insulating.

Preferably, one single substrate is used as the first substrate and the second substrate together which comprises an inlet end, an outlet end, a substrate axial length extending from the inlet end to the outlet end of the single substrate, and a plurality of passages defined by internal walls of the single substrate extending therethrough, wherein the NOx adsorber mixture according to (b) is disposed on the surface of the internal walls of the single substrate, wherein the coated substrate is preferably dried in a gas atmosphere having a temperature in the range of from 90 to 150° C., more preferably in the range of from 100 to 120° C., preferably for a duration in the range of from 0.5 to 4 hours, preferably in the range of from 0.75 to 2 hours, the gas atmosphere preferably being air, wherein the dried substrate is preferably calcined in a gas atmosphere having a temperature in the range of from 400 to 800° C., preferably in the range of from 450 to 700° C., more preferably in the range of from 550 to 650° C., preferably for a duration in the range of from 0.25 to 5 hours, preferably in the range of from 0.5 to 2 hours, the gas atmosphere preferably being air, wherein the DOC mixture according to (d) and the DOC mixture according to (g.2) are at least partially disposed on the single substrate coated with the single NOx adsorber coating to form one single DOC coating;

wherein the NOx adsorber coating is preferably disposed over at least 50%, more preferably over 70 to 100%, more preferably over 80 to 100%, more preferably over 95 to 100%, more preferably over 98 to 100%, more preferably over 99 to 100%, of the substrate axial length of the single substrate, and/or wherein the single DOC coating preferably is at least partially disposed on the surface of the internal walls of the single substrate and/or on the NOx adsorber coating over at least 90%, more preferably over 95 to 100%, more preferably over 98 to 100%, more preferably over 99 to 100%, of the substrate axial length of the single substrate, wherein the coated substrate is preferably dried in a gas atmosphere having a temperature in the range of from 90 to 150° C., more preferably in the range of from 100 to 120° C., preferably for a duration in the range of from 0.5 to 4 hours, preferably in the range of from 0.75 to 2 hours, the gas atmosphere preferably being air, wherein the dried substrate is preferably calcined in a gas atmosphere having a temperature in the range of from 400 to 800° C., preferably in the range of from 450 to 700° C., more preferably in the range of from 550 to 650° C., preferably for a duration in the range of from 0.25 to 5 hours, preferably in the range of from 0.5 to 2 hours, the gas atmosphere preferably being air;

wherein more preferably one single substrate is used as the first substrate and the second substrate together which comprises an inlet end, an outlet end, a substrate axial length extending from the inlet end to the outlet end of the single substrate, and a plurality of passages defined by internal walls of the single substrate extending therethrough, wherein the NOx adsorber mixture according to (b) and the NOx adsorber mixture according to (g.1) are disposed on the internal walls of the single substrate to form one single NOx adsorber coating, wherein the coated substrate is preferably dried in a gas atmosphere having a temperature in the range of from 90 to 150° C., more preferably in the range of from 100 to 120° C., preferably for a duration in the range of from 0.5 to 4 hours, preferably in the range of from 0.75 to 2 hours, the gas atmosphere preferably being air, wherein the dried substrate is preferably calcined in a gas atmosphere having a temperature in the range of from 400 to 800° C., preferably in the range of from 450 to 700° C., more preferably in the range of from 550 to 650° C., preferably for a duration in the range of from 0.25 to 5 hours, preferably in the range of from 0.5 to 2 hours, the gas atmosphere preferably being air, wherein the DOC mixture according to (d) and the DOC mixture according to (g.2) are at least partially disposed on the single substrate coated with the single NOx adsorber coating to form one single DOC coating;

wherein the single NOx adsorber coating is preferably disposed over at least 50%, more preferably over 70 to 100%, more preferably over 80 to 100%, more preferably over 95 to 100%, more preferably over 98 to 100%, more preferably over 99 to 100%, of the substrate axial length of the single substrate, and/or wherein the single DOC coating preferably is at least partially disposed on the surface of the internal walls of the single substrate and/or on the single NOx adsorber coating over at least 90%, more preferably over 95 to 100%, more preferably over 98 to 100%, more preferably over 99 to 100%, of the substrate axial length of the single substrate, wherein the coated substrate is preferably dried in a gas atmosphere having a temperature in the range of from 90 to 150° C., more preferably in the range of from 100 to 120° C., preferably for a duration in the range of from 0.5 to 4 hours, preferably in the range of from 0.75 to 2 hours, the gas atmosphere preferably being air, wherein the dried substrate is preferably calcined in a gas atmosphere having a temperature in the range of from 400 to 800° C., preferably in the range of from 450 to 700° C., more preferably in the range of from 550 to 650° C., preferably for a duration in the range of from 0.25 to 5 hours, preferably in the range of from 0.5 to 2 hours, the gas atmosphere preferably being air.

Preferably, the first substrate according to (a) and the second substrate are surrounded by a jacket, wherein preferably from 95 to 100%, more preferably from 98 to 100%, more preferably from 99 to 100% of the inlet end face of the first substrate and preferably from 95 to 100%, more preferably from 98 to 100%, more preferably from 99 to 100% of the outlet end face of the second substrate are not covered by the jacket, wherein the jacket preferably comprises one or more means for connecting the second substrate to an electrical power supply.

Preferably, the DOC component is arranged downstream of the gas heating component.

Preferably, in the case where the NOx adsorber component is comprised in a catalyst, the catalyst is prepared by and/or the process further comprises
  (n.1) providing a first substrate which comprises an inlet end, an outlet end, a substrate axial length extending from the inlet end to the outlet end of the first substrate, and a plurality of passages defined by internal walls of the first substrate extending therethrough;
  (n.2) disposing an NOx adsorber mixture on the surface of the internal walls of the first substrate over at least 50% of the substrate axial length of the first substrate, the NOx adsorber mixture comprising a source of a platinum group metal component and a 10-membered ring pore zeolitic material, wherein the coated substrate is preferably dried in a gas atmosphere having a temperature in the range of from 90 to 150° C., more preferably in the range of from 100 to 120° C., preferably for a duration in the range of from 0.5 to 4 hours, preferably in the range of from 0.75 to 2 hours, the gas atmosphere preferably being air, wherein the dried substrate is preferably calcined in a gas atmosphere having a temperature in the range of from 400 to 800° C., preferably in the range of from 450 to 700° C., more preferably in the range of from 550 to 650° C., preferably for a duration in the range of from 0.25 to 5 hours, preferably in the range of from 0.5 to 2 hours, the gas atmosphere preferably being air.

Preferably, the NOx adsorber mixture according to (n.2) is disposed on the surface of the internal walls of the first substrate over 70 to 100%, preferably 80 to 100%, preferably 90 to 100%, more preferably 95 to 100%, more preferably 98 to 100%, more preferably 99 to 100%, of the substrate axial length of the first substrate, wherein the first NOx adsorber mixture according to (n.2) preferably is disposed on the surface of the internal walls of the first substrate from the inlet end to the outlet end of the first substrate.

Preferably, the platinum group metal component of the NOx adsorber coating according to (n.2) comprises one or more of palladium, platinum, rhodium, iridium, osmium and ruthenium, preferably one or more of palladium, platinum and rhodium, more preferably one or more of palladium and platinum, wherein the platinum group metal component more preferably comprises, more preferably is, palladium, wherein the platinum group metal component of the NOx adsorber coating according to (n.2) is preferably impregnated on the 10-membered ring pore zeolitic material.

Preferably, the 10-membered ring pore zeolitic material of the NOx adsorber coating according to (n.2) has a framework type selected from the group consisting of FER, TON, a mixture thereof and a mixed type thereof, wherein more preferably the 10-membered ring pore zeolitic material of the NOx adsorber coating according to (n.2) has a framework type FER, wherein the framework structure of the 10-membered ring pore zeolitic material of the NOx adsorber coating according to (n.2) preferably comprises, more preferably consists of, a tetravalent element Y, a trivalent element X and oxygen, wherein Y is preferably one or more of Si, Sn, Ti, Zr and Ge, more preferably Si, and X is preferably one or more of Al, B, In and Ga, more preferably Al, wherein the molar ratio of Y:X, calculated as $YO_2:X_2O_3$, is preferably in the range of from 2:1 to 100:1, more preferably in the range of from 10:1 to 55:1, more preferably in the range of from 12:1 to 40:1, more preferably in the range of from 15:1 to 28:1, more preferably in the range of from 18:1 to 25:1.

Preferably, the first substrate according to (n.1) is a flow-through substrate or a wall flow filter substrate, preferably a flow-through substrate, wherein the flow-through substrate is preferably one or more of a cordierite flow-through substrate and a metallic flow-through substrate, wherein the first substrate according to (n.1) preferably has a cylindrical shape, the diameter of the first substrate preferably being in the range of from 3 to 10 inches, more preferably in the range of from 3.5 to 8 inches, more preferably in the range of from 4 to 6 inches, wherein the first substrate according to (n.1) preferably having an axial length in the range of from 0.5 to 8 inches, more preferably in the range of from 1 to 5 inches, more preferably in the range of from 1.25 to 3 inches.

Preferably, in the case where the DOC component is comprised in a catalyst, the catalyst is prepared by and/or the process further comprises
  (d.1) providing a third substrate which comprises an inlet end, an outlet end, a substrate axial length extending from the inlet end to the outlet end of the third substrate, and a plurality of passages defined by internal walls of the third substrate extending therethrough;
  (d.2) disposing a first DOC mixture on the surface of the internal walls of the third substrate over at least 70% of the substrate axial length of the third substrate, the first DOC mixture comprising a source of a platinum group metal component and a source of a non-zeolitic oxidic material comprising one or more of alumina, silica, zirconia and titania;
  (d.3) optionally disposing a second DOC mixture on the third substrate coated with the first DOC mixture over at least 20% of the substrate axial length of the third substrate, the second DOC mixture comprising a source of a platinum group metal component and a source of a non-zeolitic oxidic material comprising one or more of alumina, silica, zirconia and titania, wherein the second DOC coating is preferably disposed from the outlet end to the inlet end of the third substrate.

Preferably, the platinum group metal component of the first DOC mixture according to (d.2) comprises one or more of palladium, platinum, rhodium, iridium, osmium and ruthenium, preferably one or more of palladium, platinum and rhodium, more preferably one or more of palladium and platinum, wherein the second platinum group metal component more preferably comprises, more preferably is, platinum and palladium.

Preferably, the source of a non-zeolitic oxidic material according to (d.2) comprises one or more of alumina, silica, zirconia, silica-alumina, alumina-zirconia, silica-zirconia, preferably one or more of alumina, silica, and silica-alumina, more preferably silica-alumina, more preferably gamma-alumina doped with silica, wherein the non-zeolitic oxidic material more preferably comprises alumina in an amount in the range of from 80 to 99 weight-%, more preferably in the range of from 85 to 95 weight-%, more preferably in the range of from 88 to 90 weight-%, based on the weight of the non-zeolitic oxidic material, wherein the non-zeolitic oxidic material more preferably exhibits a BET specific surface area greater than 75 m$^2$/g, more preferably greater than 100 m$^2$/g, wherein the non-zeolitic oxidic material more preferably exhibits a pore volume of greater than 0.04 cm$^3$/g, more preferably greater than 0.06 cm$^3$/g Preferably, the first DOC coating according to (d.2) further comprises a zeolitic material, preferably a 12-membered ring pore zeolitic material, wherein the 12-membered ring pore zeolitic material has a framework type preferably selected from the group consisting of BEA, FAU, USY, GME, MOR, OFF, a mixture of two or more thereof and a mixed type of two or more thereof, more preferably selected from the group consisting of BEA, USY, FAU, a mixture of two or more thereof and a mixed type of two or more thereof, wherein more preferably the 12-membered ring pore zeolitic material has a framework type BEA, wherein the framework structure of the zeolitic material preferably comprises, more preferably consists of, Si, Al and oxygen, wherein the molar ratio of Si:Al, calculated as SiO$_2$:Al$_2$O$_3$, is preferably in the range of from 2:1 to 1200:1, more preferably in the range of from 10:1 to 400:1, more preferably in the range of from 15:1 to 100:1, more preferably in the range of from 18:1 to 30:1, more preferably in the range of from 20:1 to 26:1, said zeolitic material preferably comprising at most 0.001 weight-%, more preferably from 0 to 0.0001 weight-%, more preferably from 0 to 0.00001 weight-%, of copper, calculated as CuO.

Preferably, the first DOC mixture according to (d.2) is disposed over 80 to 100%, preferably over 90 to 100%, more preferably over 95 to 100%, more preferably over 98 to 100%, more preferably over 99 to 100%, of the substrate axial length of the third substrate according to (d.1).

Preferably, a second DOC mixture is disposed on the third substrate coated with the first DOC mixture according to (d.3).

Preferably, the source of a platinum group metal component of the second DOC mixture according to (d.3) comprises one or more of palladium, platinum, rhodium, iridium, osmium and ruthenium, preferably one or more of palladium, platinum and rhodium, more preferably one or more of palladium and platinum, wherein the source of a second platinum group metal component more preferably comprises, more preferably is, platinum and palladium.

Preferably, the non-zeolitic oxidic material of the second DOC mixture according to (d.3) comprises one or more of alumina, silica, zirconia, silica-alumina, alumina-zirconia, and silica-zirconia, preferably one or more of alumina, silica, and silica-alumina, more preferably silica-alumina, more preferably gamma-alumina doped with silica, wherein the non-zeolitic oxidic material of the second DOC mixture according to (d.3) preferably comprises alumina in an amount in the range of from 80 to 99 weight-%, more preferably in the range of from 85 to 95 weight-%, more preferably in the range of from 88 to 90 weight-%, based on the weight of the non-zeolitic oxidic material, wherein the non-zeolitic oxidic material more preferably exhibits a BET specific surface area greater than 75 m$^2$/g, more preferably greater than 100 m$^2$/g.

Preferably, the second DOC mixture according to (d.3) is disposed over 30 to 100%, preferably over 35 to 80%, more preferably over 40 to 60%, more preferably over 45 to 55%, of the substrate axial length of the third substrate according to (d.1).

Preferably, the third substrate according to (d.1) is a flow-through substrate, preferably one or more of a cordierite flow-through substrate and a metallic flow-through substrate, wherein the third substrate according to (d.1) preferably has a cylindrical shape, the diameter of the third substrate preferably being in the range of from 3 to 10 inches, more preferably in the range of from 3.5 to 8 inches, more preferably in the range of from 4 to 6 inches, the third substrate according to (d.1) preferably having an axial length in the range of from 1 to 10 inches, more preferably in the range of from 1.5 to 7 inches, more preferably in the range of from 2 to 5 inches.

Preferably, the gas heating component comprises
(g.1') a second substrate comprising an inlet end, an outlet end, a substrate axial length extending from the inlet end to the outlet end of the second substrate, and a plurality of passages defined by internal walls of the second substrate extending therethrough;
wherein the inlet end of the second substrate according to (g.1') and the outlet end of the first substrate according to (n.1) are coupled to allow gas exiting from the passages of the first substrate according to (n.1) to enter the passages of the second substrate according to (g.1');
wherein the inlet end of the third substrate according to (d.1) and the outlet end of the second substrate according to (g.1') are coupled to allow gas exiting from the passages of the second substrate to enter the passages of the third substrate according to (d.1);
wherein the internal walls of the second substrate according to (g.1') are thermally conductive to allow heating thereof for heating of exhaust gas flowing through the passages of the second.

Preferably, the second substrate according to (g.1') is a flow-through substrate, preferably a metallic flow-through substrate, more preferably a metallic electrically and/or thermally conductive flow-through substrate.

Preferably, the second substrate according to (g.1') has a cylindrical shape, the diameter of the second substrate preferably being in the range of from 3 to 10 inches, more preferably in the range of from 3.5 to 8 inches, more preferably in the range of from 4 to 6 inches, wherein more preferably, the diameter of the second substrate is in the range of from 90 to 110%, preferably in the range of from 95 to 105%, more preferably in the range of from 98 to 102% of the diameter of the first substrate as defined in embodiment 48, said second substrate according to (g.1') preferably having an axial length in the range of from 0.15 to 2 inches, more preferably in the range of from 0.20 to 1.5 inches, more preferably in the range of from 0.30 to 1 inch.

Preferably, the process further comprises
(g.2') disposing a first DOC mixture on the surface of the internal walls of the second substrate according to (g.1') over at least 70% of the substrate axial length of the second substrate according to (g.1'), the first DOC mixture comprising a source of a platinum group metal component and a source of a non-zeolitic oxidic material comprising one or more of alumina, silica, zirconia and titania;

(g.3') optionally disposing a second DOC mixture on the second substrate coated with the first DOC mixture according to (g.2') over at least 70% of the substrate axial length of the second substrate according to (g.1'), the second DOC mixture comprising a source of a platinum group metal component and a non-zeolitic oxidic material comprising one or more of alumina, silica, zirconia and titania.

Preferably, the second substrate according to (g.1') is a flow-through substrate, preferably a metallic flow-through substrate, more preferably a metallic electrically and/or thermally conductive flow-through substrate.

Preferably, the second substrate according to (g.1') has a cylindrical shape, the diameter of the second substrate preferably being in the range of from 3 to 10 inches, more preferably in the range of from 3.5 to 8 inches, more preferably in the range of from 4 to 6 inches, wherein more preferably, the diameter of the second substrate is in the range of from 90 to 110%, preferably in the range of from 95 to 105%, more preferably in the range of from 98 to 102% of the diameter of the first substrate, wherein the first substrate preferably is a flow-through substrate or a wall flow filter substrate, preferably a flow-through substrate, wherein the flow-through substrate is preferably one or more of a cordierite flow-through substrate and a metallic flow-through substrate, wherein the first substrate preferably has a cylindrical shape, the diameter of the first substrate preferably being in the range of from 3 to 10 inches, more preferably in the range of from 3.5 to 8 inches, more preferably in the range of from 4 to 6 inches, wherein the first substrate preferably having an axial length in the range of from 0.5 to 8 inches, more preferably in the range of from 1 to 5 inches, more preferably in the range of from 1.25 to 3 inches, said second substrate according to (g.1') preferably having an axial length in the range of from 0.15 to 2 inches, more preferably in the range of from 0.20 to 1.5 inches, more preferably in the range of from 0.30 to 1 inch.

Preferably, the gas heating component is prepared by and/or the process further comprises (g.2') disposing a first DOC mixture on the surface of the internal walls of the second substrate according to (g.1') over at least 70% of the substrate axial length of the second substrate according to (g.1'), the first DOC mixture comprising a source of a platinum group metal component and a source of a non-zeolitic oxidic material comprising one or more of alumina, silica, zirconia and titania;

(g.3') preferably disposing a second DOC mixture on the second substrate coated with the first DOC mixture according to (g.2') over at least 70% of the substrate axial length of the second substrate according to (g.1'), the second DOC mixture comprising a source of a platinum group metal component and a source of a non-zeolitic oxidic material comprising one or more of alumina, silica, zirconia and titania.

Preferably, the source of a platinum group metal component of the first DOC mixture according to (g.2') comprises one or more of palladium, platinum, rhodium, iridium, osmium and ruthenium, preferably one or more of palladium, platinum and rhodium, more preferably one or more of palladium and platinum, wherein the source of a platinum group metal component more preferably comprises, more preferably is, platinum and palladium.

Preferably, the source of a non-zeolitic oxidic material according to (g.2') comprises one or more of alumina, silica, zirconia, silica-alumina, alumina-zirconia, and silica-zirconia more preferably one or more of alumina, silica, and silica-alumina, more preferably silica-alumina, more preferably gamma-alumina doped with silica, wherein the source of a non-zeolitic oxidic material more preferably comprises alumina in an amount in the range of from 80 to 99 weight-%, more preferably in the range of from 85 to 95 weight-%, more preferably in the range of from 88 to 90 weight-%, based on the weight of the non-zeolitic oxidic material.

Preferably, the source of a non-zeolitic oxidic material exhibits a BET specific surface area greater than 75 $m^2/g$, more preferably greater than 100 $m^2/g$.

Preferably, the source of a non-zeolitic oxidic material exhibits a pore volume of greater than 0.04 $cm^3/g$, more preferably greater than 0.06 $cm^3/g$.

Preferably, the first DOC mixture according to (g.2') further comprises a zeolitic material, more preferably a 12-membered ring pore zeolitic material, wherein the 12-membered ring pore zeolitic material has a framework type preferably selected from the group consisting of BEA, FAU, USY, GME, MOR, OFF, a mixture of two or more thereof and a mixed type of two or more thereof, more preferably selected from the group consisting of BEA, USY, FAU, a mixture of two or more thereof and a mixed type of two or more thereof, wherein more preferably the 12-membered ring pore zeolitic material has a framework type BEA, wherein the framework structure of the zeolitic material preferably comprises, more preferably consists of, Si, Al and oxygen, wherein the molar ratio of Si:Al, calculated as $SiO_2:Al_2O_3$, is preferably in the range of from 2:1 to 1200:1, more preferably in the range of from 10:1 to 400:1, more preferably in the range of from 15:1 to 100:1, more preferably in the range of from 18:1 to 30:1, more preferably in the range of from 20:1 to 26:1, said zeolitic material preferably comprising at most 0.001 weight-%, more preferably from 0 to 0.0001 weight-%, more preferably from 0 to 0.00001 weight-%, of copper, calculated as CuO;

wherein the first DOC mixture according to (g.2') is preferably disposed over 80 to 100%, more preferably over 90 to 100%, more preferably over 95 to 100%, more preferably over 98 to 100%, more preferably over 99 to 100%, of the substrate axial length of the second substrate according to (g.1').

Preferably, the gas heating component comprises a second DOC coating according to (g.3').

Preferably, the source of a platinum group metal component of the second DOC mixture according to (g.3') comprises one or more of palladium, platinum, rhodium, iridium, osmium and ruthenium, preferably one or more of palladium, platinum and rhodium, more preferably one or more of palladium and platinum, wherein the source of a non-zeolitic oxidic material of the second DOC mixture according to (g.3') preferably comprises one or more of alumina, silica, zirconia, silica-alumina, alumina-zirconia, and silica-zirconia, more preferably one or more of alumina, silica, and silica-alumina, more preferably silica-alumina, more preferably gamma-alumina doped with silica, wherein the non-zeolitic oxidic material of the second DOC coating according to (g.3') preferably comprises alumina in an amount in the range of from 80 to 99 weight-%, more preferably in the range of from 85 to 95 weight-%, more preferably in the range of from 88 to 90 weight-%, based on the weight of the non-zeolitic oxidic material;
wherein the source of a non-zeolitic oxidic material more preferably exhibits a BET specific surface area greater than 75 m$^2$/g, more preferably greater than 100 m$^2$/g;
wherein the source of a non-zeolitic oxidic material more preferably exhibits a pore volume of greater than 0.04 cm$^3$/g, more preferably greater than 0.06 cm$^3$/g;
wherein the second DOC mixture according to (g.3') is preferably disposed over 30 to 100%, preferably over 35 to 80%, more preferably over 40 to 60%, more preferably over 45 to 55%, of the substrate axial length of the second substrate according to (g.1').

Preferably, the coatings of the gas heating component exhibit essentially the same, preferably the same chemical and physical characteristics as the coatings of the catalyst as defined in any one of the embodiments disclosed herein.

Preferably, one single substrate is used to form the second substrate according to (g.1') and the third substrate according to (d.1) which comprises an inlet end, an outlet end, a substrate axial length extending from the inlet end to the outlet end of the single substrate, and a plurality of passages defined by internal walls of the single substrate extending therethrough, wherein the first DOC mixture according to (g.2') and the first DOC mixture according to (d.2) are disposed together to form one single first DOC coating, and wherein preferably the second DOC mixture according to (g.3') and the second DOC mixture according to (d.3) are disposed together to form one single second DOC coating; wherein the single first DOC mixture is disposed preferably over at least 90%, more preferably over 95 to 100%, more preferably over 98 to 100%, more preferably over 99 to 100%, of the substrate axial length of the single substrate, and wherein preferably the single second DOC mixture is disposed over preferably at least 40%, more preferably over 45 to 100%, more preferably over 50 to 80%, of the substrate axial length of the single substrate.

Preferably, the outlet end of the second substrate and the inlet end of the third substrate are arranged opposite to each other, wherein the angle between the surface normal of the surface defined by the outlet end of the second substrate and the surface normal of the surface defined by the inlet end of the third substrate is preferably in the range of from 0 to 5°, more preferably in the range of from 0 to 3°, more preferably in the range of from 0 to 1°.

Preferably, the outlet end of the second substrate and the inlet end of the third substrate are spaced from one another, preferably at a distance in the range of from 2 to 20 mm, preferably in the range of from 5 to 15 mm, more preferably in the range of from 8 to 12 mm, wherein the outlet end of the second substrate and the inlet end of the third substrate are preferably spaced from one another by one or more spacer means, preferably one or more spacer rods, wherein a given spacer rod is preferably fixed at either the outlet end of the second substrate, or at the inlet end of the third substrate, or at the outlet end of the second substrate as well as at the inlet end of the third substrate, wherein the one or more spacer means, preferably the one or more spacer rods, are preferably electrically insulating.

Preferably, a selective catalytic reduction (SCR) catalyst is provided as the SCR component, the selective catalytic reduction (SCR) catalyst being prepared by
(s.1) providing a fourth substrate, preferably a wall-flow filter substrate, comprising an inlet end, an outlet end, and a substrate axial length extending from the inlet end to the outlet end of the third substrate;
(s.2) disposing a selective catalytic reduction (SCR) mixture on the fourth substrate according to (s.1);
wherein the inlet end of the fourth substrate according to (s.1) and either the outlet end of the second substrate according to (s.1) or the outlet end of the third substrate according to (d.1) are coupled to allow exhaust gas exiting from the passages of the second substrate to enter the third substrate.

Preferably, the SCR mixture according to (s.2) comprises an 8-membered ring pore zeolitic material comprising one or more of copper and iron, preferably copper, wherein the amount of the one or more of copper and iron, calculated as CuO and Fe$_2$O$_3$, respectively, more preferably of copper, calculated as CuO, is in the range of from 1 to 10 weight-%, preferably in the range of from 2 to 8 weight-%, more preferably in the range of from 3 to 6 weight-%, based on the weight of the 8-membered ring pore zeolitic material comprising one or more of copper and iron.

Preferably, the 8-membered ring pore zeolitic material of the selective catalytic reduction coating has a framework type selected from the group consisting of CHA, AEI, RTH, LEV, DDR, KFI, ERI, AFX, a mixture of two or more thereof and a mixed type of two or more thereof, preferably selected from the group consisting of CHA, AEI, RTH, a mixture of two or more thereof and a mixed type of two or more thereof, more preferably selected from the group consisting of CHA and AEI, wherein more preferably the 8-membered ring pore zeolitic material of the selective catalytic reduction coating has a framework type CHA.

Preferably, the framework structure of the 8-membered ring pore zeolitic material comprises, preferably consists of, a tetravalent element Y, a trivalent element X and O, wherein Y is one or more of Si, Sn, Ti, Zr and Ge and X is one or more of Al, B, In and Ga, wherein the molar ratio of Y:X, calculated as YO$_2$:X$_2$O$_3$, is in the range of from 2:1 to 45:1, preferably in the range of from 10:1 to 40:1, more preferably in the range of from 15:1 to 30:1, wherein Y preferably comprises, more preferably is, Si, and wherein X preferably comprises, more preferably is, one or more of Al and B, preferably Al.

Preferably, the reductant injector comprises, preferably consists of, one or more of a hydrocarbon injector, a hydrocarbon in-cylinder post injector, and a urea injector, preferably a urea injector, wherein the reductant injector is preferably arranged downstream of the DOC component.

Product-by-Process

The present invention further relates a system for the treatment of an exhaust gas of a diesel combustion engine, preferably a system for the treatment of an exhaust gas of a diesel combustion engine according to any one of the embodiments disclosed herein, obtainable or obtained by a process according to any one of the embodiments disclosed herein.

Method for Treatment of an Exhaust Gas

The present invention further relates a method for the treatment of an exhaust gas of a diesel combustion engine, comprising providing an exhaust gas from a diesel combustion engine and passing said exhaust gas through a system according to any one of the embodiments disclosed herein.

Preferably, a reductant, more preferably one or more of a hydrocarbon and urea, is injected through the reductant injector into the exhaust gas passed through said system.

Preferably, the exhaust gas is heated through the gas heating component comprised in said system for heating one or more of the SCR component, the DOC component, and the NA adsorber component comprised in said system.

The present invention further relates a use of a system according to any one of the embodiments disclosed herein for the treatment of an exhaust gas of a diesel combustion engine, said use comprising passing said exhaust gas through said system.

By way of example, the reductant injector may comprise a pumping mechanism and/or a valve for interrupting the inlet for one or more reducing agents into the exhaust gas wherein said pumping device and/or valve is respectively adjusted for providing the desired amount of the one or more reducing agents into the exhaust gas and/or is connected to a control device which is preferably integrated in a monitoring system for allowing exact control of the rate of introduction of the one or more reducing agents into the exhaust gas depending on the desired composition of the exhaust gas upon contacting thereof with at least a portion of the catalyst bed.

In the context of the present invention, the term "the surface of the internal walls" is to be understood as the "naked" or "bare" or "blank" surface of the walls, i. e. the surface of the walls in an untreated state which consists—apart from any unavoidable impurities with which the surface may be contaminated—of the material of the walls.

In the context of the present invention, the term "consists of" with regard to the weight-% of one or more components indicates the weight-% amount of said component(s) based on 100 weight-% of the designated entity. For example, the wording "wherein from 0 to 0.001 weight-% of the first coating consists of X" indicates that among the 100 weight-% of the components of which said coating consists of, 0 to 0.001 weight-% is X.

In the context of the present invention, it is preferred that a platinum group metal component comprises, more preferably consists of, respective one or more platinum group metals or one or more oxides of respective one or more platinum group metals.

In the context of the present invention, a weight/loading of a platinum group metal component is calculated as the weight/loading of the respective platinum group metal as element or the sum the weights/loadings of the respective platinum group metals as elements. For example, if a platinum group metal component is Rh, the weight of said platinum group metal component is calculated as elemental Rh. As a further example, if a platinum group metal component consists of Pt and Pd, the weight of said platinum group metal component is calculated as elemental Pt and Pd.

In the context of the present invention, the term "loading of a given component/coating" (in $g/in^3$ or $g/ft^3$) refers to the mass of said component/coating per volume of the substrate, wherein the volume of the substrate is the volume which is defined by the cross-section of the substrate times the axial length of the substrate over which said component/coating is present. For example, if reference is made to the loading of a first coating extending over x % of the axial length of the substrate and having a loading of X $g/in^3$, said loading would refer to X gram of the first coating per x % of the volume (in $in^3$) of the entire substrate.

Further, in the context of the present invention, a term "X is one or more of A, B and C", wherein X is a given feature and each of A, B and C stands for specific realization of said feature, is to be understood as disclosing that X is either A, or B, or C, or A and B, or A and C, or B and C, or A and B and C. In this regard, it is noted that the skilled person is capable of transfer to above abstract term to a concrete example, e.g. where X is a chemical element and A, B and C are concrete elements such as Li, Na, and K, or X is a temperature and A, B and C are concrete temperatures such as 10° C., 20° C., and 30° C. In this regard, it is further noted that the skilled person is capable of extending the above term to less specific realizations of said feature, e.g. "X is one or more of A and B" disclosing that X is either A, or B, or A and B, or to more specific realizations of said feature, e.g. "X is one or more of A, B, C and D", disclosing that X is either A, or B, or C, or D, or A and B, or A and C, or A and D, or B and C, or B and D, or C and D, or A and B and C, or A and B and D, or B and C and D, or A and B and C and D.

In the context of the present invention, a weight/loading of a non-zeolitic oxidic material is calculated as the weight/loading of the respective non-zeolitic oxidic material as oxide or the sum the weights/loadings of the respective non-zeolitic oxidic material as oxides. For example, if a non-zeolitic oxidic material is silica, the weight of said non-zeolitic oxidic material is calculated as $SiO_2$. As a further example, if a non-zeolitic oxidic material consists of a mixed oxide comprising Ti and Al, the weight of said non-zeolitic oxidic material is calculated as sum of $TiO_2$ and $Al_2O_3$.

In the context of the present invention, the term "based on the weight of the zeolitic material" refers to the weight of the zeolitic material alone, meaning without a platinum group metal component.

The present invention is further illustrated by the following set of embodiments and combinations of embodiments resulting from the dependencies and back-references as indicated. In particular, it is noted that in each instance where a range of embodiments is mentioned, for example in the context of a term such as "any one of embodiments 1 to 4", every embodiment in this range is meant to be explicitly disclosed for the skilled person, i.e. the wording of this term is to be understood by the skilled person as being synonymous to "any one of embodiments 1, 2, 3, and 4". Further, it is explicitly noted that the following set of embodiments is not the set of claims determining the extent of protection, but represents a suitably structured part of the description directed to general and preferred aspects of the present invention.

System for the Treatment of an Exhaust Gas of a Diesel Combustion Engine
1. A system for the treatment of an exhaust gas of a diesel combustion engine, said system comprising an NOx adsorber component, a diesel oxidation catalyst (DOC) component, a selective catalytic reduction (SCR) component, a gas heating component, and a reductant injector, wherein in said system, the NOx adsorber component is arranged upstream of the gas heating component, the reductant injector is arranged upstream of the SCR component, the gas heating component is arranged upstream of the reductant injector, the DOC component is arranged upstream of the reductant injector, and the DOC component and the gas heating component are directly consecutive components,
wherein the NOx adsorber component is comprised in
(i) a catalyst which comprises
(i.1) a first substrate comprising an inlet end, an outlet end, a substrate axial length extending from the inlet end to the outlet end of the first substrate, and a plurality of passages defined by internal walls of the first substrate extending therethrough;
(i.2) an NOx adsorber coating being said NOx adsorber component, said coating being disposed on the surface of the internal walls of the first substrate over at least 50% of the substrate axial length of the first substrate, the NOx adsorber coating comprising a platinum group metal component and a 10-membered ring pore zeolitic material having a framework type selected from the group consisting of FER, TON, MTT, SZR, MWW, AEL, HEU, AFO, a mixture of two or more thereof and a mixed type of two or more thereof.

2. The system of embodiment 1, wherein between the DOC component and the gas heating component, no other component for the treatment of the exhaust gas is arranged.

3. The system of embodiment 1 or 2, wherein said components are arranged in a conduit for the exhaust gas, preferably in sequential order, the upstream end of said conduit preferably designed to be arranged downstream of a diesel combustion engine, wherein more preferably, the upstream end of said conduit is arranged downstream of a diesel combustion engine.

4. The system of any one of embodiments 1 to 3, wherein the reductant injector comprises, preferably consists of, one or more of a hydrocarbon injector, a hydrocarbon in-cylinder post injector, and a urea injector, preferably a urea injector, wherein the reductant injector is preferably arranged downstream of the DOC component.

First Alternative Arrangement

5. The system of any one of embodiments 1 to 4, wherein the DOC component is arranged upstream of the gas heating component, wherein the DOC component and the NOx adsorber component are preferably arranged upstream of the gas heating component.

6. The system of any one of embodiments 1 to 5, preferably embodiment 5, wherein the catalyst according to (i) further comprises
   (i.3) a diesel oxidation catalyst (DOC) coating being said DOC component, said DOC coating being at least partially disposed on the NOx adsorber coating over at least 70% of the substrate axial length of the first substrate, the DOC coating comprising a platinum group metal component and a non-zeolitic oxidic material comprising one or more of alumina, silica, zirconia and titania, wherein the DOC coating is preferably disposed from the outlet end to the inlet end of the first substrate.

7. The system of embodiment 6, wherein the NOx adsorber coating according to (i.2) is disposed on the surface of the internal walls of the first substrate over 70 to 100%, preferably 80 to 100%, more preferably 90 to 100%, more preferably 95 to 100%, more preferably 98 to 100%, more preferably 99 to 100%, of the substrate axial length of the first substrate, wherein the first NOx adsorber coating according to (i.2) preferably is disposed on the surface of the internal walls of the first substrate from the inlet end to the outlet end of the first substrate.

8. The system of embodiment 6 or 7, wherein the platinum group metal component of the NOx adsorber coating according to (i.2) comprises one or more of palladium, platinum, rhodium, iridium, osmium and ruthenium, preferably one or more of palladium, platinum and rhodium, more preferably one or more of palladium and platinum, wherein the platinum group metal component more preferably comprises, more preferably is, palladium, wherein the first NOx adsorber coating according to (i.2) comprises the platinum group metal component, preferably palladium, at a loading, calculated as elemental platinum group metal, preferably as elemental Pd, preferably in the range of from 30 to 300 g/ft$^3$, more preferably in the range of from 45 to 200 g/ft$^3$, more preferably in the range of from 60 to 150 g/ft$^3$, more preferably in the range of from 60 to 100 g/ft$^3$ or in the range of from 100 to 150 g/ft$^3$, more preferably in the range of from 60 to 80 g/ft$^3$ or in the range of from 100 to 140 g/ft$^3$.

9. The system of any one of embodiments 6 to 8, wherein the platinum group metal component of the NOx adsorber coating according to (i.2) is comprised in the 10-membered ring pore zeolitic material of the NOx adsorber coating according to (i.2), wherein the platinum group metal component preferably is present in said zeolitic material in an amount in the range of from 0.5 to 10 weight-%, more preferably in the range of from 1 to 6 weight-%, more preferably in the range of from 1.25 to 4 weight-%, more preferably in the range of from 1.5 to 3 weight-%, based on the total weight of the 10-membered ring pore zeolitic material of the NOx adsorber coating according to (i.2).

10. The system of any one of embodiments 6 to 9, wherein the 10-membered ring pore zeolitic material of the NOx adsorber coating according to (i.2) has a framework type selected from the group consisting of FER, TON, a mixture thereof and a mixed type thereof, wherein more preferably the 10-membered ring pore zeolitic material of the NOx adsorber coating according to (i.2) has a framework type FER, wherein the framework structure of the 10-membered ring pore zeolitic material of the NOx adsorber coating according to (i.2) preferably comprises, more preferably consists of, a tetravalent element Y, a trivalent element X and oxygen, wherein Y is preferably one or more of Si, Sn, Ti, Zr and Ge, more preferably Si, and X is preferably one or more of Al, B, In and Ga, more preferably Al, wherein the molar ratio of Y:X, calculated as $YO_2$:$X_2O_3$, is preferably in the range of from 2:1 to 100:1, more preferably in the range of from 10:1 to 55:1, more preferably in the range of from 12:1 to 40:1, more preferably in the range of from 15:1 to 28:1, more preferably in the range of from 18:1 to 25:1.

11. The system of any one of embodiments 6 to 10, wherein the NOx adsorber coating according to (i.2) comprises the 10-membered ring pore zeolitic material in an amount in the range of from 80 to 99.75 weight-%, preferably in the range of from 85 to 99.5 weight-%, more preferably in the range of from 90 to 99.25 weight-%, more preferably in the range of from 95 to 99 weight-%, based on the weight of the NOx adsorber coating.

12. The system of any one of embodiments 6 to 11, wherein the catalyst according to (i) comprises the NOx adsorber coating according to (i.2) at a loading in the range of from 0.5 to 8 g/in$^3$, preferably in the range of from 1 to 5 g/in$^3$, more preferably in the range of from 1.5 to 4.5 g/in$^3$, more preferably in the range of from 2 to 4 g/in$^3$.

13. The system of any one of embodiments 6 to 12, wherein from 95 to 100 weight-%, preferably from 98 to 100 weight-%, more preferably from 99 to 100 weight-%, more preferably from 99.5 to 100 weight-%, of the NOx adsorber coating according to (i.2) consist of the platinum group metal component and the 10-membered ring pore zeolitic material.

14. The system of any one of embodiments 6 to 13, wherein the DOC coating according to (i.3) is at least partially disposed on the NOx adsorber coating according to (i.2) and extends over 80 to 100%, preferably 95 to 100%, more preferably 98 to 100%, more preferably 99 to 100%, of the substrate axial length of the first substrate, wherein the DOC according to (i.3) preferably is at least partially disposed on the NOx adsorber coating according to (i.2) from the inlet end to the outlet end of the first substrate.

15. The system of any one of embodiments 6 to 14, wherein the platinum group metal component of the DOC coating according to (i.3) comprises one or more of palladium, platinum, rhodium, iridium, osmium and ruthenium, preferably one or more of palladium, platinum and rhodium, more preferably one or more of palladium and platinum, more preferably comprises, more preferably is, platinum, wherein the DOC coating according to (i.3) comprises the platinum group metal component, preferably platinum, at a loading, calculated as elemental platinum group metal, preferably as elemental Pt, preferably in the range of from 15 to 200 g/ft$^3$, more preferably in the range of from 20 to 150 g/ft$^3$, more preferably in the range of from 30 to 100 g/ft$^3$, more preferably in the range of from 40 to 90 g/ft$^3$, more preferably in the range of from 50 to 80 g/ft$^3$, wherein the platinum group metal component of the DOC coating according to (i.3) more preferably comprises platinum and palladium, wherein the weight ratio of platinum to palladium, Pt:Pd, calculated as element respectively, more preferably is in the range of from 1:1 to 11:1, more preferably in the range of from 2:1 to 10:1, more preferably in the range of from 3:1 to 5:1, wherein the weight ratio more preferably is about 4:1;

wherein the platinum group metal component of the DOC coating according to (i.3) is more preferably supported on the non-zeolitic oxidic material according to (i.3), more preferably at a loading in the range of from 1 to 5 weight-%, more preferably in the range of from 2 to 4 weight-%, calculated as element or elements, respectively, and based on the total weight of the non-zeolitic oxidic material according to (i.3).

16. The system of any one of embodiments 6 to 15, wherein the non-zeolitic oxidic material of the DOC coating according to (i.3) comprises one or more of alumina, silica and zirconia, preferably one or more of alumina and silica, more preferably alumina, more preferably gamma-alumina, wherein the non-zeolitic oxidic material preferably further comprises one or more of manganese, silicon and zirconium, wherein the non-zeolitic oxidic material more preferably comprises alumina and manganese, wherein the non-zeolitic oxidic material of the DOC coating according to (i.3) more preferably comprises the alumina in an amount in the range of from 80 to 99 weight-%, more preferably in the range of from 85 to 98 weight-%, more preferably in the range of from 90 to 97 weight-%, based on the weight of the non-zeolitic oxidic material, wherein the non-zeolitic oxidic material of the DOC coating according to (i.3) more preferably exhibits a BET specific surface area greater than 75 m$^2$/g, more preferably greater than 100 m$^2$/g, wherein the non-zeolitic oxidic material of the DOC coating according to (i.3) more preferably exhibits a pore volume of greater than 0.04 cm$^3$/g, more preferably greater than 0.06 cm$^3$/g.

17. The system of any one of embodiments 6 to 16, wherein the DOC coating according to (i.3) further comprises a zeolitic material, preferably a 12-membered ring pore zeolitic material, wherein the 12-membered ring pore zeolitic material preferably has a framework type selected from the group consisting of BEA, FAU, USY, GME, MOR, OFF, a mixture of two or more thereof and a mixed type of two or more thereof, more preferably selected from the group consisting of BEA, USY, FAU, a mixture of two or more thereof and a mixed type of two or more thereof, wherein more preferably the 12-membered ring pore zeolitic material has a framework type BEA, wherein the framework structure of the zeolitic material preferably comprises, more preferably consists of, Si, Al and O, wherein the molar ratio of Si:Al, calculated as SiO$_2$:Al$_2$O$_3$, is preferably in the range of from 2:1 to 1200:1, more preferably in the range of from 10:1 to 400:1, more preferably in the range of from 15:1 to 100:1, more preferably in the range of from 18:1 to 30:1, more preferably in the range of from 20:1 to 26:1, said zeolitic material preferably comprising at most 0.001 weight-%, more preferably from 0 to 0.0001 weight-%, more preferably from 0 to 0.00001 weight-%, of copper, calculated as CuO.

18. The system of embodiment 17, wherein the zeolitic material comprises at most 0.001 weight-%, more preferably from 0 to 0.0001 weight-%, more preferably from 0 to 0.00001 weight-%, of iron, calculated as Fe$_2$O$_3$; or wherein the zeolitic material comprises iron, preferably in an amount in the range of from 0.5 to 8 weight-%, more preferably in the range of from 1 to 5 weight-%, calculated as Fe$_2$O$_3$.

19. The system of embodiment 17 or 18, wherein the weight ratio of the non-zeolitic oxidic material of the DOC coating according to (i.3) relative to the zeolitic material of the DOC coating according to (i.3) is in the range of from 1:1 to 10:1, preferably in the range of from 1.5:1 to 8:1, more preferably in the range of from 2:1 to 4.5:1.

20. The system of any one of embodiments 6 to 19, wherein the catalyst according to (i) comprises the DOC coating according to (i.3) at a loading in the range of from 0.5 to 5 g/in$^3$, preferably in the range of from 0.75 to 4 g/in$^3$, more preferably in the range of from 1 to 3 g/in$^3$, more preferably in the range of from 1.25 to 2.5 g/in$^3$.

21. The system of any one of embodiments 6 to 20, wherein from 95 to 100 weight-%, preferably from 98 to 100 weight-%, more preferably from 99 to 100 weight-%, more preferably from 99.5 to 100 weight-%, of the DOC coating according to (i.3) consist of the platinum group metal component, the non-zeolitic oxidic material preferably being as defined in embodiment 16 and the zeolitic material preferably being as defined in embodiment 17 or 18.

22. The system of any one of embodiments 6 to 21, wherein the first substrate according to (i.1) is a flow-through substrate or a wall flow filter substrate, preferably a flow-through substrate, wherein the flow-through substrate is preferably one or more of a cordierite flow-through substrate and a metallic flow-through substrate, more preferably a metallic flow-through substrate, said first substrate preferably having a cylindrical shape, the diameter of the first substrate preferably being in the range of from 3 to 10 inches, more preferably in the range of from 3.5 to 8 inches, more preferably in the range of from 4 to 6 inches, the first substrate preferably having an axial length in the range of from 3 to 10 inches, more preferably in the range of from 3.5 to 8 inches, more preferably in the range of from 4 to 6 inches.
23. The system of any one of embodiments 6 to 22, wherein the catalyst according to (i) consists of (i.1), (i.2) and (i.3).

Gas Heating Component

24. The system of any one of embodiments 1 to 23, preferably 4 to 23, more preferably 6 to 23, wherein (ii) the gas heating component comprises
    (ii.1) a second substrate comprising an inlet end, an outlet end, a substrate axial length extending from the inlet end to the outlet end of the second substrate, and a plurality of passages defined by internal walls of the second substrate extending therethrough;
    wherein the inlet end of the second substrate according to (ii.1) and the outlet end of the first substrate according to (i.1) are coupled to allow exhaust gas exiting from the passages of the first substrate to enter the passages of the second substrate;
    wherein the internal walls of the second substrate are thermally conductive to allow heating thereof for heating of exhaust gas flowing through the passages of the second substrate.
25. The system of embodiment 24, wherein the second substrate according to (ii.1) is a flow-through substrate, preferably a metallic flow-through substrate, more preferably a metallic electrically and/or thermally conductive flow-through substrate.
26. The system of embodiment 24 or 25, wherein the second substrate according to (ii.1) has a cylindrical shape, the diameter of the second substrate preferably being in the range of from 3 to 10 inches, more preferably in the range of from 3.5 to 8 inches, more preferably in the range of from 4 to 6 inches, wherein more preferably, the diameter of the second substrate is in the range of from 90 to 110%, preferably in the range of from 95 to 105%, more preferably in the range of from 98 to 102% of the diameter of the first substrate as defined in embodiment 23, said second substrate according to (ii.1) preferably having an axial length in the range of from 0.15 to 2 inches, more preferably in the range of from 0.20 to 1.5 inches, more preferably in the range of from 0.30 to 1 inch.
27. The system of any one of embodiments 24 to 26, wherein the gas heating component according to (ii) consists of the second substrate according to (ii.1), said substrate being an uncoated substrate.
28. The system of any one of embodiments 24 to 26, wherein the gas heating component according to (ii) further comprises
    (ii.2) optionally an NOx adsorber coating disposed on the surface of the internal walls of the second substrate over at least 50% of the substrate axial length of the second substrate, the NOx adsorber coating comprising a platinum group metal component and a 10-membered ring pore zeolitic material having a framework type selected from the group consisting of FER, TON, MTT, SZR, MWW, AEL, HEU, AFO, a mixture of two or more thereof and a mixed type of two or more thereof;
    (ii.3) a diesel oxidation catalyst (DOC) coating at least partially disposed on the surface of the internal walls of the second substrate and/or at least partially disposed on the optional NOx adsorber coating according to (ii.2) and extending over at least 70% of the substrate axial length of the second substrate, the DOC coating comprising a platinum group metal component and a non-zeolitic oxidic material comprising one or more of alumina, silica, zirconia and titania.
29. The system of embodiment 28, wherein the NOx adsorber coating according to (ii.2) is disposed on the surface of the internal walls of the second substrate over 70 to 100%, preferably 80 to 100%, more preferably 90 to 100%, more preferably 95 to 100%, more preferably 98 to 100%, more preferably 99 to 100%, of the substrate axial length of the second substrate, wherein the NOx adsorber coating according to (ii.2) preferably is disposed on the surface of the internal walls of the second substrate from the outlet end to the inlet of the second substrate.
30. The system of embodiment 28 or 29,
    wherein the platinum group metal component of the NOx adsorber coating according to (ii.2) comprises one or more of palladium, platinum, rhodium, iridium, osmium and ruthenium, preferably one or more of palladium, platinum and rhodium, more preferably one or more of palladium and platinum, wherein the platinum group metal component more preferably comprises, more preferably is, palladium, wherein the NOx adsorber coating according to (ii.2) comprises the platinum group metal component, preferably palladium, at a loading, calculated as elemental platinum group metal, preferably as elemental Pd, preferably in the range of from 30 to 300 g/ft$^3$, more preferably in the range of from 45 to 200 g/ft$^3$, more preferably in the range of from 60 to 150 g/ft$^3$, more preferably in the range of from 60 to 100 g/ft$^3$ or in the range of from 100 to 150 g/ft$^3$, more preferably in the range of from 60 to 80 g/ft$^3$ or in the range of from of from 100 to 140 g/ft$^3$;
    wherein the platinum group metal component of the NOx adsorber coating according to (ii.2) is preferably comprised in the 10-membered ring pore zeolitic material of the NOx adsorber coating according to (ii.2), wherein the platinum group metal component preferably is present in said zeolitic material in an amount in the range of from 0.5 to 10 weight-%, more preferably in the range of from 1 to 6 weight-%, more preferably in the range of from 1.25 to 4 weight-%, more preferably in the range of from 1.5 to 3 weight-%, based on the total weight of the 10-membered ring pore zeolitic material of the NOx adsorber coating according to (ii.2);
    wherein the 10-membered ring pore zeolitic material of the NOx adsorber coating according to (ii.2) preferably has a framework type selected from the group consisting of FER, TON, a mixture thereof and a mixed type thereof, wherein more preferably the 10-membered ring pore zeolitic material of the NOx adsorber coating according to (ii.2) has a framework type FER, wherein the framework structure of the 10-membered ring pore zeolitic material of the NOx adsorber coating according to (ii.2) preferably comprises, more preferably consists of, a tetravalent element Y, a trivalent element X and oxygen, wherein Y is preferably one or more of Si, Sn, Ti, Zr and Ge, more preferably Si, and X is preferably one or more of Al, B, In and Ga, more preferably Al, wherein the molar ratio of Y:X, calculated as YO$_2$:X$_2$O$_3$, is preferably in the range of from 2:1 to 100:1, more preferably in the range of from 10:1 to 55:1, more preferably in the range of from 12:1 to 40:1, more preferably in the range of from 15:1 to 28:1, more preferably in the range of from 18:1 to 25:1;

wherein the NOx adsorber coating according to (ii.2) comprises the 10-membered ring pore zeolitic material preferably in an amount in the range of from 80 to 99.75 weight-%, more preferably in the range of from 85 to 99.5 weight-%, more preferably in the range of from 90 to 99.25 weight-%, more preferably in the range of from 95 to 99 weight-%, based on the weight of the NOx adsorber coating according to (ii.2);

wherein the gas heating component according to (ii) comprises the NOx adsorber coating according to (ii.2) at a loading preferably in the range of from 0.5 to 8 g/in$^3$, more preferably in the range of from 1 to 5 g/in$^3$, more preferably in the range of from 1.5 to 4.5 g/in$^3$, more preferably in the range of from 2 to 4 g/in$^3$;

wherein preferably from 95 to 100 weight-%, more preferably from 98 to 100 weight-%, more preferably from 99 to 100 weight-%, more preferably from 99.5 to 100 weight-%, of the NOx adsorber coating according to (ii.2) consist of the platinum group metal component and the 10-membered ring pore zeolitic material.

31. The system of any one of embodiments 28 to 30, wherein the DOC coating according to (ii.3) is at least partially disposed on the surface of the internal walls of the second substrate and/or at least partially disposed on the optional NOx adsorber coating according to (ii.2) and extends over 80 to 100%, preferably 95 to 100%, more preferably 98 to 100%, more preferably 99 to 100%, of the substrate axial length of the first substrate, wherein the DOC according to (ii.3) preferably is at least partially disposed on the surface of the internal walls of the second substrate and/or at least partially disposed on the optional NOx adsorber coating according to (ii.2) from the inlet end to the outlet end of the first substrate.

32. The system of any one of embodiments 28 to 31, wherein the platinum group metal component of the DOC coating according to (ii.3) comprises one or more of palladium, platinum, rhodium, iridium, osmium and ruthenium, preferably one or more of palladium, platinum and rhodium, more preferably one or more of palladium and platinum, more preferably comprises, more preferably is, platinum, wherein the DOC coating according to (ii.3) comprises the platinum group metal component, preferably platinum, at a loading, calculated as elemental platinum group metal, preferably as elemental Pt, preferably in the range of from 15 to 200 g/ft$^3$, more preferably in the range of from 20 to 150 g/ft$^3$, more preferably in the range of from 30 to 100 g/ft$^3$, more preferably in the range of from 40 to 90 g/ft$^3$, more preferably in the range of from 50 to 80 g/ft$^3$ wherein the platinum group metal component of the DOC coating according to (ii.3) is more preferably supported on the non-zeolitic oxidic material according to (ii.3), more preferably at a loading in the range of from 1 to 5 weight-%, more preferably in the range of from 2 to 4 weight-%, calculated as element or elements, respectively, and based on the total weight of the non-zeolitic oxidic material according to (ii.3);

wherein the platinum group metal component of the DOC coating according to (ii.3) more preferably comprises platinum and palladium, wherein the weight ratio of platinum to palladium, Pt:Pd, calculated as element respectively, more preferably is in the range of from 1:1 to 11:1, more preferably in the range of from 2:1 to 10:1, more preferably in the range of from 3:1 to 5:1, wherein the weight ratio more preferably is about 4:1;

wherein the non-zeolitic oxidic material of the DOC coating according to (ii.3) preferably comprises one or more of alumina, silica and zirconia, more preferably one or more of alumina and silica, more preferably alumina, more preferably gamma-alumina, wherein the non-zeolitic oxidic material preferably further comprises one or more of manganese, silicon and zirconium, wherein the non-zeolitic oxidic material more preferably comprises alumina and manganese, wherein the non-zeolitic oxidic material of the DOC coating according to (ii.3) more preferably comprises the alumina in an amount in the range of from 80 to 99 weight-%, more preferably in the range of from 85 to 98 weight-%, more preferably in the range of from 90 to 97 weight-%, based on the weight of the non-zeolitic oxidic material;

wherein the non-zeolitic oxidic material of the DOC coating according to (ii.3) more preferably exhibits a BET specific surface area greater than 75 m$^2$/g, more preferably greater than 100 m$^2$/g, wherein the non-zeolitic oxidic material of the DOC coating according to (ii.3) more preferably exhibits a pore volume of greater than 0.04 cm$^3$/g, more preferably greater than 0.06 cm$^3$/g;

wherein the DOC coating according to (ii.3) preferably further comprises a zeolitic material, more preferably a 12-membered ring pore zeolitic material, wherein the 12-membered ring pore zeolitic material preferably has a framework type selected from the group consisting of BEA, FAU, USY, GME, MOR, OFF, a mixture of two or more thereof and a mixed type of two or more thereof, more preferably selected from the group consisting of BEA, USY, FAU, a mixture of two or more thereof and a mixed type of two or more thereof, wherein more preferably the 12-membered ring pore zeolitic material has a framework type BEA, wherein the framework structure of the zeolitic material preferably comprises, more preferably consists of, Si, Al and O, wherein the molar ratio of Si:Al, calculated as SiO$_2$:Al$_2$O$_3$, is preferably in the range of from 2:1 to 1200:1, more preferably in the range of from 10:1 to 400:1, more preferably in the range of from 15:1 to 100:1, more preferably in the range of from 18:1 to 30:1, more preferably in the range of from 20:1 to 26:1, said zeolitic material preferably comprising at most 0.001 weight-%, more preferably from 0 to 0.0001 weight-40%, more preferably from 0 to 0.00001 weight-%, of copper, calculated as CuO;

wherein said zeolitic material preferably comprises at most 0.001 weight-%, more preferably from 0 to 0.0001 weight-%, more preferably from 0 to 0.00001 weight-%, of iron, calculated as Fe$_2$O$_3$; or wherein the zeolitic material preferably comprises iron, preferably in an amount in the range of from 0.5 to 8 weight-%, more preferably in the range of from 1 to 5 weight-%, calculated as Fe$_2$O$_3$;

wherein the weight ratio of the non-zeolitic oxidic material of the DOC coating according to (ii.3) relative to the zeolitic material of the DOC coating according to (ii.3) is preferably in the range of from 1:1 to 10:1, more preferably in the range of from 1.5:1 to 8:1, more preferably in the range of from 2:1 to 4.5:1;
wherein the gas heating component according to (ii) comprises the DOC coating according to (ii.3) preferably at a loading in the range of from 0.5 to 5 g/in$^3$, more preferably in the range of from 0.75 to 4 g/in$^3$, more preferably in the range of from 1 to 3 g/in$^3$, more preferably in the range of from 1.25 to 2.5 g/in$^3$;
wherein preferably from 95 to 100 weight-%, more preferably from 98 to 100 weight-%, more preferably from 99 to 100 weight-%, more preferably from 99.5 to 100 weight-%, of the DOC coating according to (ii.3) consist of the platinum group metal component, the non-zeolitic oxidic material and preferably the zeolitic material as defined in embodiments 17 or 18.

33. The system of any one of embodiment 28 to 32, wherein the gas heating component according to (ii) consists of (ii.1), and (ii.3), wherein the gas heating component according to (ii) preferably consists of (ii.1), (ii.2), and (ii.3).

34. The system of any one of embodiments 28 to 33, wherein the DOC coating according to (ii.3) exhibits essentially the same, preferably the same chemical and physical characteristics as the DOC coating according to (i.3), wherein preferably the coatings of the gas heating component according to (ii) exhibit essentially the same, preferably the same chemical and physical characteristics as the coatings of the catalyst according to (i).

35. The system of any one of embodiments 24 to 34, wherein the outlet end of the first substrate and the inlet end of the second substrate are arranged opposite to each other, wherein the angle between the surface normal of the surface defined by the outlet end of the first substrate and the surface normal of the surface defined by the inlet end of the second substrate is preferably in the range of from 0 to 5°, more preferably in the range of from 0 to 3°, more preferably in the range of from 0 to 1°.

36. The system of embodiment 35, wherein the outlet end of the first substrate and the inlet end of the second substrate are spaced from one another, preferably at a distance in the range of from 2 to 20 mm, preferably in the range of from 5 to 15 mm, more preferably in the range of from 8 to 12 mm, wherein the outlet end of the first substrate and the inlet end of the second substrate are preferably spaced from one another by one or more spacer means, preferably one or more spacer rods, wherein a given spacer rod is preferably fixed at either the outlet end of the first substrate, or at the inlet end of the second substrate, or at the outlet end of the first substrate as well as at the inlet end of the second substrate, wherein the one or more spacer means, preferably the one or more spacer rods, are preferably electrically insulating.

37. The system of any one of embodiments 24 to 34, wherein the first substrate and the second substrate together form one single substrate which comprises an inlet end, an outlet end, a substrate axial length extending from the inlet end to the outlet end of the single substrate, and a plurality of passages defined by internal walls of the single substrate extending therethrough, wherein the DOC coating according to (i.3) and the DOC coating according to (ii.3) together form one single DOC coating, wherein the single DOC coating preferably is at least partially disposed on the NOx adsorber coating according to (i.2) and wherein the single DOC coating preferably extends over at least 90%, more preferably over 95 to 100%, more preferably over 98 to 100%, more preferably over 99 to 100%, of the substrate axial length of the single substrate;
wherein the first substrate and the second substrate together form one single substrate which comprises an inlet end, an outlet end, a substrate axial length extending from the inlet end to the outlet end of the single substrate, and a plurality of passages defined by internal walls of the single substrate extending therethrough, wherein the NOx adsorber coating according to (i.2) and the NOx adsorber coating according to (ii.2) together form one single NOx adsorber coating, and wherein the DOC coating according to (i.3) and the DOC coating according to (ii.3) together form one single DOC coating;
wherein the single NOx adsorber coating preferably extends over at least 50%, more preferably over 70 to 100%, more preferably over 80 to 100%, more preferably over 95 to 100%, more preferably over 98 to 100%, more preferably over 99 to 100%, of the substrate axial length of the single substrate, and/or
wherein the single DOC coating preferably is at least partially disposed on the single NOx adsorber coating and preferably extends over at least 90%, more preferably over 95 to 100%, more preferably over 98 to 100%, more preferably over 99 to 100%, of the substrate axial length of the single substrate.

38. The system of any one of embodiments 24 to 37, further comprising a jacket surrounding the first substrate according to (i) and the second substrate according to (ii), wherein preferably from 95 to 100%, more preferably from 98 to 100%, more preferably from 99 to 100% of the inlet end face of the first substrate and preferably from 95 to 100%, more preferably from 98 to 100%, more preferably from 99 to 100% of the outlet end face of the second substrate are not covered by the jacket, wherein the jacket preferably comprises one or more means for connecting the second substrate to an electrical power supply.

Second Alternative Arrangement

39. The system of any one of embodiments 1 to 3, wherein the DOC component is arranged downstream of the gas heating component.

40. The system of embodiment 39, wherein the NOx adsorber component is comprised in
    (i) a catalyst comprising
        (i.1) a first substrate which comprises an inlet end, an outlet end, a substrate axial length extending from the inlet end to the outlet end of the first substrate, and a plurality of passages defined by internal walls of the first substrate extending therethrough;
        (i.2) an NOx adsorber coating disposed on the surface of the internal walls of the first substrate over at least 50% of the substrate axial length of the first substrate, the NOx adsorber coating comprising a platinum group metal component and a 10-membered ring pore zeolitic material having a framework type selected from the group consisting of FER, TON, MTT, SZR, MWW, AEL, HEU, AFO, a mixture of two or more thereof and a mixed type of two or more thereof.

41. The system of embodiment 40, wherein the NOx adsorber coating according to (i.2) is disposed on the surface of the internal walls of the first substrate over 70 to 100%, preferably 80 to 100%, more preferably 90 to 100%, more preferably 95 to 100%, more preferably 98 to 100%, more preferably 99 to 100%, of the substrate axial length of the first substrate, wherein the first NOx adsorber coating according to (i.2) preferably is disposed on the surface of the internal walls of the first substrate from the inlet end to the outlet end of the first substrate.

42. The system of embodiment 40 or 41, wherein the platinum group metal component of the NOx adsorber coating according to (i.2) comprises one or more of palladium, platinum, rhodium, iridium, osmium and ruthenium, preferably one or more of palladium, platinum and rhodium, more preferably one or more of palladium and platinum, wherein the platinum group metal component more preferably comprises, more preferably is, palladium, wherein the first NOx adsorber coating according to (i.2) comprises the platinum group metal component, preferably palladium, at a loading, calculated as elemental platinum group metal, preferably as elemental Pd, preferably in the range of from 30 to 300 g/ft$^3$, more preferably in the range of from 45 to 200 g/ft$^3$, more preferably in the range of from 60 to 150 g/ft$^3$, more preferably in the range of from 60 to 100 g/ft$^3$ or in the range of from 100 to 150 g/ft$^3$, more preferably in the range of from 60 to 80 g/ft$^3$ or in the range of from of from 100 to 140 g/ft$^3$.

43. The system of any one of embodiments 40 to 42, wherein the platinum group metal component of the NOx adsorber coating according to (i.2) is comprised in the 10-membered ring pore zeolitic material of the NOx adsorber coating according to (i.2), wherein the platinum group metal component preferably is present in said zeolitic material in an amount in the range of from 0.5 to 10 weight-%, more preferably in the range of from 1 to 6 weight-%, more preferably in the range of from 1.25 to 4 weight-%, more preferably in the range of from 1.5 to 3 weight-%, based on the total weight of the 10-membered ring pore zeolitic material of the NOx adsorber coating according to (i.2).

44. The system of any one of embodiments 40 to 43, wherein the 10-membered ring pore zeolitic material of the NOx adsorber coating according to (i.2) has a framework type selected from the group consisting of FER, TON, a mixture thereof and a mixed type thereof, wherein more preferably the 10-membered ring pore zeolitic material of the NOx adsorber coating according to (i.2) has a framework type FER, wherein the framework structure of the 10-membered ring pore zeolitic material of the NOx adsorber coating according to (i.2) preferably comprises, more preferably consists of, a tetravalent element Y, a trivalent element X and oxygen, wherein Y is preferably one or more of Si, Sn, Ti, Zr and Ge, more preferably Si, and X is preferably one or more of Al, B, In and Ga, more preferably Al, wherein the molar ratio of Y:X, calculated as YO$_2$:X$_2$O$_3$, is preferably in the range of from 2:1 to 100:1, more preferably in the range of from 10:1 to 55:1, more preferably in the range of from 12:1 to 40:1, more preferably in the range of from 15:1 to 28:1, more preferably in the range of from 18:1 to 25:1.

45. The system of any one of embodiments 40 to 44, wherein the NOx adsorber coating according to (i.2) comprises the 10-membered ring pore zeolitic material in an amount in the range of from 80 to 99.75 weight-%, preferably in the range of from 85 to 99.5 weight-%, more preferably in the range of from 90 to 99.25 weight-%, more preferably in the range of from 95 to 99 weight-%, based on the weight of the NOx adsorber coating.

46. The system of any one of embodiments 40 to 45, wherein the catalyst according to (i) comprises the NOx adsorber coating according to (i.2) at a loading in the range of from 0.5 to 8 g/in$^3$, preferably in the range of from 1 to 5 g/in$^3$, more preferably in the range of from 1.5 to 4.5 g/in$^3$, more preferably in the range of from 2 to 4 g/in$^3$.

47. The system of any one of embodiments 40 to 46, wherein from 95 to 100 weight-%, preferably from 98 to 100 weight-%, more preferably from 99 to 100 weight-%, more preferably from 99.5 to 100 weight-%, of the NOx adsorber coating according to (i.2) consist of the platinum group metal component and the 10-membered ring pore zeolitic material.

48. The system of any one of embodiments 40 to 47, wherein the first substrate according to (i.1) is a flow-through substrate or a wall flow filter substrate, preferably a flow-through substrate, wherein the flow-through substrate is preferably one or more of a cordierite flow-through substrate and a metallic flow-through substrate, wherein the first substrate according to (i.1) preferably has a cylindrical shape, the diameter of the first substrate preferably being in the range of from 3 to 10 inches, more preferably in the range of from 3.5 to 8 inches, more preferably in the range of from 4 to 6 inches, wherein the first substrate according to (i.1) preferably having an axial length in the range of from 0.5 to 8 inches, more preferably in the range of from 1 to 5 inches, more preferably in the range of from 1.25 to 3 inches.

49. The system of any one of embodiments 40 to 48, wherein the catalyst according to (i) consists of the first substrate according to (i.1) and the NOx adsorber coating according to (i.2).

50. The system of any one of embodiments 39 to 49, wherein the DOC component is comprised in
  (iii) a catalyst comprising
    (iii.1) a third substrate which comprises an inlet end, an outlet end, a substrate axial length extending from the inlet end to the outlet end of the third substrate, and a plurality of passages defined by internal walls of the third substrate extending therethrough;
    (iii.2) a first DOC coating disposed on the surface of the internal walls of the third substrate over at least 70% of the substrate axial length of the third substrate, the first DOC coating comprising a platinum group metal component and a non-zeolitic oxidic material comprising one or more of alumina, silica, zirconia and titania; and
    (iii.3) optionally a second DOC coating at least partially disposed on the first DOC coating and extending over at least 20% of the substrate axial length of the third substrate, the second DOC coating comprising a platinum group metal component and a non-zeolitic oxidic material comprising one or more of alumina, silica, zirconia and titania, wherein the second DOC coating is preferably disposed from the outlet end to the inlet end of the third substrate.

51. The system of embodiment 50, wherein the platinum group metal component of the first DOC coating according to (iii.2) comprises one or more of palladium, platinum, rhodium, iridium, osmium and ruthenium, preferably one or more of palladium, platinum and rhodium, more preferably one or more of palladium and platinum, wherein the second platinum group metal component more preferably comprises, more preferably is, platinum and palladium, wherein the weight ratio of Pt to Pd, Pt:Pd, calculated as elemental Pt and Pd, is preferably in the range of from 0.5:1 to 5:1, more preferably in the range of from 0.75:1 to 4.5:1, more preferably in the range of from 1:1 to 4:1, more preferably in the range of from 1.5:1 to 3:1.

52. The system of embodiment 50 or 51, wherein the non-zeolitic oxidic material according to (iii.2) comprises one or more of alumina, silica, zirconia, silica-alumina, alumina-zirconia, silica-zirconia, preferably one or more of alumina, silica, and silica-alumina, more preferably silica-alumina, more preferably gamma-alumina doped with silica, wherein the non-zeolitic oxidic material more preferably comprises alumina in an amount in the range of from 80 to 99 weight-%, more preferably in the range of from 85 to 95 weight-%, more preferably in the range of from 88 to 90 weight-%, based on the weight of the non-zeolitic oxidic material, wherein the non-zeolitic oxidic material more preferably exhibits a BET specific surface area greater than 75 m$^2$/g, more preferably greater than 100 m$^2$/g, wherein the non-zeolitic oxidic material more preferably exhibits a pore volume of greater than 0.04 cm$^3$/g, more preferably greater than 0.06 cm$^3$/g.

53. The system of any one of embodiments 50 to 52, wherein the first DOC coating according to (iii.2) further comprises a zeolitic material, preferably a 12-membered ring pore zeolitic material, wherein the 12-membered ring pore zeolitic material has a framework type preferably selected from the group consisting of BEA, FAU, USY, GME, MOR, OFF, a mixture of two or more thereof and a mixed type of two or more thereof, more preferably selected from the group consisting of BEA, USY, FAU, a mixture of two or more thereof and a mixed type of two or more thereof, wherein more preferably the 12-membered ring pore zeolitic material has a framework type BEA, wherein the framework structure of the zeolitic material preferably comprises, more preferably consists of, Si, Al and oxygen, wherein the molar ratio of Si:Al, calculated as SiO$_2$:Al$_2$O$_3$, is preferably in the range of from 2:1 to 1200:1, more preferably in the range of from 10:1 to 400:1, more preferably in the range of from 15:1 to 100:1, more preferably in the range of from 18:1 to 30:1, more preferably in the range of from 20:1 to 26:1, said zeolitic material preferably comprising at most 0.001 weight-%, more preferably from 0 to 0.0001 weight-%, more preferably from 0 to 0.00001 weight-%, of copper, calculated as CuO.

54. The system of embodiment 53, wherein the zeolitic material comprises at most 0.001 weight-%, more preferably from 0 to 0.0001 weight-%, more preferably from 0 to 0.00001 weight-%, of iron, calculated as Fe$_2$O$_3$; or wherein the zeolitic material comprises iron, preferably in an amount in the range of from 0.5 to 8 weight-%, more preferably in the range of from 1 to 5 weight-%, calculated as Fe$_2$O$_3$.

55. The system of embodiment 53 or 54, wherein the weight ratio of the non-zeolitic oxidic material of the first DOC coating according to (iii.2) to the zeolitic material of the first DOC coating according to (iii.2) is in the range of from 1:1 to 10:1, preferably in the range of from 1.5:1 to 8:1, more preferably in the range of from 2:1 to 4.5:1.

56. The system of any one of embodiments 50 to 55, wherein the catalyst according to (iii) comprises the first DOC coating according to (iii.2) at a loading in the range of from 0.5 to 5 g/in$^3$, preferably in the range of from 0.75 to 4 g/in$^3$, more preferably in the range of from 1 to 3 g/in$^3$, more preferably in the range of from 1.25 to 2.5 g/in$^3$.

57. The system of any one of embodiments 50 to 56, wherein from 98 to 100 weight-%, preferably from 99 to 100 weight-%, more preferably from 99.5 to 100 weight-%, of the first DOC coating according to (iii.2) consist of the platinum group metal component, preferably Pt and Pd, the non-zeolitic oxidic material preferably as defined in embodiment 52 and preferably the zeolitic material as defined in embodiment 53 or 54.

58. The system of any one of embodiments 50 to 57, wherein the first DOC coating according to (iii.2) extends over 80 to 100%, preferably over 90 to 100%, more preferably over 95 to 100%, more preferably over 98 to 100%, more preferably over 99 to 100%, of the substrate axial length of the third substrate according to (iii.1).

59. The system of any one of embodiments 50 to 58, wherein the catalyst according to (iii) comprises a second DOC coating according to (iii.3).

60. The system of embodiment 59, wherein the platinum group metal component of the second DOC coating according to (iii.3) comprises one or more of palladium, platinum, rhodium, iridium, osmium and ruthenium, preferably one or more of palladium, platinum and rhodium, more preferably one or more of palladium and platinum, wherein the second platinum group metal component more preferably comprises, more preferably is, platinum and palladium, wherein the weight ratio of Pt to Pd, Pt:Pd, calculated as elemental Pt and Pd, is preferably in the range of from 2:1 to 20:1, more preferably in the range of from 3:1 to 8:1, more preferably in the range of from 4:1 to 7.5:1, more preferably in the range of from 5:1 to 7:1;

wherein the platinum group metal component of the second DOC coating according to (iii.3) more preferably comprises platinum, wherein the second DOC coating according to (iii.3) comprises the platinum at a loading, calculated as elemental Pt, preferably in the range of from 15 to 200 g/ft$^3$, more preferably in the range of from 20 to 150 g/ft$^3$, more preferably in the range of from 30 to 100 g/ft$^3$, more preferably in the range of from 40 to 90 g/ft$^3$, more preferably in the range of from 50 to 80 g/ft$^3$, wherein the platinum group metal component of the second DOC coating according to (iii.3) is more preferably supported on the non-zeolitic oxidic material according to (iii.3), more preferably at a loading in the range of from 1 to 5 weight-%, more preferably in the range of from 2 to 4 weight-%, calculated as element or elements, respectively, and based on the total weight of the non-zeolitic oxidic material according to (ii.3).

61. The system of embodiment 59 or 60, wherein the non-zeolitic oxidic material of the second DOC coating according to (iii.3) comprises one or more of alumina, silica, zirconia, silica-alumina, alumina-zirconia, and silica-zirconia, preferably one or more of alumina, silica, and silica-alumina, more preferably silica-alumina, more preferably gamma-alumina doped with silica, wherein the non-zeolitic oxidic material of the second DOC coating according to (iii.3) preferably comprises alumina in an amount in the range of from 80 to 99 weight-%, more preferably in the range of from 85 to 95 weight-%, more preferably in the range of from 88 to 90 weight-%, based on the weight of the non-zeolitic oxidic material, wherein the non-zeolitic oxidic material of the second DOC coating according to (iii.3) more preferably exhibits a BET specific surface area greater than 75 m$^2$/g, more preferably greater than 100 m$^2$/g, wherein the non-zeolitic oxidic material of the second DOC coating according to (iii.3) more preferably exhibits a pore volume of greater than 0.04 cm$^3$/g, more preferably greater than 0.06 cm$^3$/g.

62. The system of any one of embodiments 59 to 61, wherein the catalyst according to (iii) comprises the second DOC coating according to (iii.3) at a loading in the range of from 0.5 to 5 g/in$^3$, preferably in the range of from 0.75 to 4 g/in$^3$, more preferably in the range of from 0.75 to 3 g/in$^3$, more preferably in the range of from 1 to 2.5 g/in$^3$.

63. The system of any one of embodiments 59 to 62, wherein from 98 to 100 weight-%, preferably from 99 to 100 weight-%, more preferably from 99.5 to 100 weight-%, of the second DOC coating according to (iii.3) consist of the platinum group metal component, preferably Pt and Pd, and the non-zeolitic oxidic material.

64. The system of any one of embodiments 59 to 63, wherein the second DOC coating according to (iii.3) extends over 30 to 100%, preferably over 35 to 80%, more preferably over 40 to 60%, more preferably over 45 to 55%, of the substrate axial length of the third substrate according to (iii.1).

65. The system of any one of embodiments 50 to 64, wherein the third substrate according to (iii.1) is a flow-through substrate, preferably one or more of a cordierite flow-through substrate and a metallic flow-through substrate, wherein the third substrate according to (iii.1) preferably has a cylindrical shape, the diameter of the third substrate preferably being in the range of from 3 to 10 inches, more preferably in the range of from 3.5 to 8 inches, more preferably in the range of from 4 to 6 inches, the third substrate according to (iii.1) preferably having an axial length in the range of from 1 to 10 inches, more preferably in the range of from 1.5 to 7 inches, more preferably in the range of from 2 to 5 inches.

66. The system of any one of embodiments 50 to 65, preferably 59 to 65, wherein the catalyst according to (iii) consists of the third substrate according to (iii.1), the first DOC coating according to (iii.2) and preferably the second DOC coating according to (iii.3).

Gas Heating Component

67. The system of any one of embodiments 39 to 66, wherein
(ii) the gas heating component comprises
(ii.1) a second substrate comprising an inlet end, an outlet end, a substrate axial length extending from the inlet end to the outlet end of the second substrate, and a plurality of passages defined by internal walls of the second substrate extending therethrough;
wherein the inlet end of the second substrate according to (ii.1) and the outlet end of the first substrate according to (i.1) are coupled to allow gas exiting from the passages of the first substrate according to (i.1) to enter the passages of the second substrate according to (ii.1);
wherein the inlet end of the third substrate according to (iii.1) and the outlet end of the second substrate according to (ii.1) are coupled to allow gas exiting from the passages of the second substrate to enter the passages of the third substrate according to (iii.1);
wherein the internal walls of the second substrate according to (ii.1) are thermally conductive to allow heating thereof for heating of exhaust gas flowing through the passages of the second substrate.

68. The system of embodiment 67, wherein the second substrate according to (ii.1) is a flow-through substrate, preferably a metallic flow-through substrate, more preferably a metallic electrically and/or thermally conductive flow-through substrate.

69. The system of embodiment 67 or 68, wherein the second substrate according to (ii.1) has a cylindrical shape, the diameter of the second substrate preferably being in the range of from 3 to 10 inches, more preferably in the range of from 3.5 to 8 inches, more preferably in the range of from 4 to 6 inches, wherein more preferably, the diameter of the second substrate is in the range of from 90 to 110%, preferably in the range of from 95 to 105%, more preferably in the range of from 98 to 102% of the diameter of the first substrate as defined in embodiment 48, said second substrate according to (ii.1) preferably having an axial length in the range of from 0.15 to 2 inches, more preferably in the range of from 0.20 to 1.5 inches, more preferably in the range of from 0.30 to 1 inch.

70. The system of any one of embodiments 67 to 69, wherein the gas heating component according to (ii) consists of the second substrate according to (ii.1), said substrate being an uncoated substrate.

71. The system of any one of embodiments 67 to 69, wherein the gas heating component according to (ii) further comprises
(ii.2) a first DOC coating disposed on the surface of the internal walls of the second substrate according to (ii.1) over at least 50% of the substrate axial length of the second substrate according to (ii.1), the first DOC coating comprising a platinum group metal component and a non-zeolitic oxidic material comprising one or more of alumina, silica, zirconia and titania;
(ii.3) optionally a second DOC coating at least partially disposed on the first DOC coating according to (ii.2) and extending over at least 50% of the substrate axial length of the second substrate according to (ii.1), the second DOC coating comprising a platinum group metal component and a non-zeolitic oxidic material comprising one or more of alumina, silica, zirconia and titania.

72. The system of embodiment 71, wherein the platinum group metal component of the first DOC coating according to (ii.2) comprises one or more of palladium, platinum, rhodium, iridium, osmium and ruthenium, preferably one or more of palladium, platinum and rhodium, more preferably one or more of palladium and platinum, wherein the second platinum group metal component more preferably comprises, more preferably is, platinum and palladium, wherein the weight ratio of Pt to Pd, Pt:Pd, calculated as elemental Pt and Pd, is preferably in the range of from 0.5:1 to 5:1, more preferably in the range of from 0.75:1 to 4.5:1, more preferably in the range of from 1:1 to 4:1, more preferably in the range of from 1.5:1 to 3:1, wherein the platinum group metal component of the first DOC coating according to (ii.2) more preferably comprises platinum, wherein the first DOC coating according to (ii.2) comprises the platinum at a loading, calculated as elemental Pt, preferably in the range of from 15 to 200 g/ft$^3$, more preferably in the range of from 20 to 150 g/ft$^3$, more preferably in the range of from 30 to 100 g/ft$^3$, more preferably in the range of from 40 to 90 g/ft$^3$, more preferably in the range of from 50 to 80 g/ft$^3$, wherein the platinum group metal component of the first DOC coating according to (ii.2) is more preferably supported on the non-zeolitic oxidic material according to (ii.2), more preferably at a loading in the range of from 1 to 5 weight-%, more preferably in the range of from 2 to 4 weight-%, calculated as element or elements, respectively, and based on the total weight of the non-zeolitic oxidic material according to (ii.2);

wherein the non-zeolitic oxidic material according to (ii.2) preferably comprises one or more of alumina, silica, zirconia, silica-alumina, alumina-zirconia, and silica-zirconia more preferably one or more of alumina, silica, and silica-alumina, more preferably silica-alumina, more preferably gamma-alumina doped with silica, wherein the non-zeolitic oxidic material more preferably comprises the alumina in an amount in the range of from 80 to 99 weight-%, more preferably in the range of from 85 to 95 weight-%, more preferably in the range of from 88 to 90 weight-%, based on the weight of the non-zeolitic oxidic material;

wherein the non-zeolitic oxidic material more preferably exhibits a BET specific surface area greater than 75 m$^2$/g, more preferably greater than 100 m$^2$/g;

wherein the non-zeolitic oxidic material more preferably exhibits a pore volume of greater than 0.04 cm$^3$/g, more preferably greater than 0.06 cm$^3$/g;

wherein the first DOC coating according to (ii.2) preferably further comprises a zeolitic material, more preferably a 12-membered ring pore zeolitic material, wherein the 12-membered ring pore zeolitic material has a framework type preferably selected from the group consisting of BEA, FAU, USY, GME, MOR, OFF, a mixture of two or more thereof and a mixed type of two or more thereof, more preferably selected from the group consisting of BEA, USY, FAU, a mixture of two or more thereof and a mixed type of two or more thereof, wherein more preferably the 12-membered ring pore zeolitic material has a framework type BEA, wherein the framework structure of the zeolitic material preferably comprises, more preferably consists of, Si, Al and oxygen, wherein the molar ratio of Si:Al, calculated as SiO$_2$:Al$_2$O$_3$, is preferably in the range of from 2:1 to 1200:1, more preferably in the range of from 10:1 to 400:1, more preferably in the range of from 15:1 to 100:1, more preferably in the range of from 18:1 to 30:1, more preferably in the range of from 20:1 to 26:1, said zeolitic material preferably comprising at most 0.001 weight-%, more preferably from 0 to 0.0001 weight-%, more preferably from 0 to 0.00001 weight-%, of copper, calculated as CuO;

wherein the zeolitic material preferably comprises at most 0.001 weight-%, more preferably from 0 to 0.0001 weight-%, more preferably from 0 to 0.00001 weight-%, of iron, calculated as Fe$_2$O$_3$; or wherein the zeolitic material comprises iron, preferably in an amount in the range of from 0.5 to 8 weight-%, more preferably in the range of from 1 to 5 weight-%, calculated as Fe$_2$O$_3$;

wherein the weight ratio of the non-zeolitic oxidic material of the first DOC coating according to (ii.2) to the zeolitic material of the first DOC coating according to (ii.2) is preferably in the range of from 1:1 to 10:1, more preferably in the range of from 1.5:1 to 8:1, more preferably in the range of from 2:1 to 4.5:1;

wherein the gas heating component according to (ii) comprises the first DOC coating according to (ii.2) preferably at a loading in the range of from 0.5 to 5 g/in$^3$, more preferably in the range of from 0.75 to 4 g/in$^3$, more preferably in the range of from 1 to 3 g/in$^3$, more preferably in the range of from 1.25 to 2.5 g/in$^3$;

wherein preferably from 98 to 100 weight-%, more preferably from 99 to 100 weight-%, more preferably from 99.5 to 100 weight-%, of the first DOC coating according to (ii.2) consist of the platinum group metal component, preferably Pt and Pd, the non-zeolitic oxidic material and preferably the zeolitic material;

wherein the first DOC coating according to (ii.2) preferably extends over 80 to 100%, more preferably over 90 to 100%, more preferably over 95 to 100%, more preferably over 98 to 100%, more preferably over 99 to 100%, of the substrate axial length of the second substrate according to (ii.1).

73. The system of embodiment 71 or 72, wherein the gas heating component according to (ii) comprises a second DOC coating according to (ii.3).

74. The system of embodiment 73, wherein the platinum group metal component of the second DOC coating according to (ii.3) comprises one or more of palladium, platinum, rhodium, iridium, osmium and ruthenium, preferably one or more of palladium, platinum and rhodium, more preferably one or more of palladium and platinum, wherein the second platinum group metal component more preferably comprises, more preferably is, platinum and palladium, wherein the weight ratio of Pt to Pd, Pt:Pd, calculated as elemental Pt and Pd, is preferably in the range of from 2:1 to 20:1, more preferably in the range of from 3:1 to 8:1, more preferably in the range of from 4:1 to 7.5:1, more preferably in the range of from 5:1 to 7:1;

wherein the non-zeolitic oxidic material of the second DOC coating according to (ii.3) preferably comprises one or more of alumina, silica, zirconia, silica-alumina, alumina-zirconia, and silica-zirconia, more preferably one or more of alumina, silica, and silica-alumina, more preferably silica-alumina, more preferably gamma-alumina doped with silica, wherein the non-zeolitic oxidic material of the second DOC coating according to (iii.3) preferably comprises alumina in an amount in the range of from 80 to 99 weight-%, more preferably in the range of from 85 to 95 weight-%, more preferably in the range of from 88 to 90 weight-%, based on the weight of the non-zeolitic oxidic material;

wherein the non-zeolitic oxidic material more preferably exhibits a BET specific surface area greater than 75 m$^2$/g, more preferably greater than 100 m$^2$/g;

wherein the non-zeolitic oxidic material more preferably exhibits a pore volume of greater than 0.04 cm$^3$/g, more preferably greater than 0.06 cm$^3$/g;

wherein the gas heating component according to (ii) comprises the second DOC coating according to (ii.3) preferably at a loading in the range of from 0.5 to 5 g/in$^3$, more preferably in the range of from 0.75 to 4 g/in$^3$, more preferably in the range of from 0.75 to 3 g/in$^3$, more preferably in the range of from 1 to 2.5 g/in$^3$;

wherein preferably from 98 to 100 weight-%, more preferably from 99 to 100 weight-%, more preferably from 99.5 to 100 weight-%, of the second DOC coating according to (ii.3) consist of the platinum group metal component, preferably Pt and Pd, and the non-zeolitic oxidic material;

wherein the second DOC coating according to (ii.3) preferably extends over 30 to 100%, preferably over 35 to 80%, more preferably over 40 to 60%, more preferably over 45 to 55%, of the substrate axial length of the second substrate according to (ii.1).

75. The system of any one of embodiments 67 to 74, preferably 72 or 74, wherein the gas heating component according to (ii) consists of the second substrate according to (ii.1), the first DOC coating according to (ii.2) and preferably the second DOC coating according to (ii.3).

76. The system of any one of embodiments 67 to 75, wherein the coatings of the gas heating component according to (ii) exhibit essentially the same, preferably the same chemical and physical characteristics as the coatings of the catalyst according to (iii).

77. The system of any one of embodiments 67 to 76, wherein the second substrate according to (ii.1) and the third substrate according to (iii.1) together form one single substrate which comprises an inlet end, an outlet end, a substrate axial length extending from the inlet end to the outlet end of the single substrate, and a plurality of passages defined by internal walls of the single substrate extending therethrough, wherein the first DOC coating according to (ii.2) and the first DOC coating according to (iii.2) together form one single first DOC coating, and wherein preferably the second DOC coating according to (ii.3) and the second DOC coating according to (iii.3) together form one single second DOC coating; wherein the single first DOC coating preferably extends over at least 90%, more preferably over 95 to 100%, more preferably over 98 to 100%, more preferably over 99 to 100%, of the substrate axial length of the single substrate, and wherein preferably the single second DOC coating extends over preferably at least 40%, more preferably over 45 to 100%, more preferably over 50 to 80%, of the substrate axial length of the single substrate.

78. The system of any one of embodiments 67 to 77, wherein the outlet end of the second substrate and the inlet end of the third substrate are arranged opposite to each other, wherein the angle between the surface normal of the surface defined by the outlet end of the second substrate and the surface normal of the surface defined by the inlet end of the third substrate is preferably in the range of from 0 to 5°, more preferably in the range of from 0 to 3°, more preferably in the range of from 0 to 1°.

79. The system of embodiment 78, wherein the outlet end of the second substrate and the inlet end of the third substrate are spaced from one another, preferably at a distance in the range of from 2 to 20 mm, preferably in the range of from 5 to 15 mm, more preferably in the range of from 8 to 12 mm, wherein the outlet end of the second substrate and the inlet end of the third substrate are preferably spaced from one another by one or more spacer means, preferably one or more spacer rods, wherein a given spacer rod is preferably fixed at either the outlet end of the second substrate, or at the inlet end of the third substrate, or at the outlet end of the second substrate as well as at the inlet end of the third substrate, wherein the one or more spacer means, preferably the one or more spacer rods, are preferably electrically insulating.

SCR Component

80. The system of any one of embodiments 1 to 79, wherein the SCR component is comprised in
    (iv) a selective catalytic reduction (SCR) catalyst comprising
       (iv.1) a fourth substrate, preferably a wall-flow filter substrate, comprising an inlet end, an outlet end, and a substrate axial length extending from the inlet end to the outlet end of the fourth substrate;
       (iv.2) a selective catalytic reduction (SCR) coating disposed on the surface of the internal walls of the fourth substrate according to (iv.1);
    wherein the inlet end of the fourth substrate according to (iv.1) and either the outlet end of the second substrate according to (ii.1) as far as embodiment 80 refers to any one of embodiments 24 to 38, or the outlet end of the third substrate according to (iii.1) as far as embodiment 80 refers to any one of embodiments 50 to 79 are coupled to allow exhaust gas exiting from the passages of the second substrate or exiting from the passages of the third substrate to enter the fourth substrate.

81. The system of embodiment 80, wherein the SCR coating according to (iv.2) comprises an 8-membered ring pore zeolitic material comprising one or more of copper and iron, preferably copper, wherein the amount of the one or more of copper and iron, calculated as CuO and Fe$_2$O$_3$, respectively, more preferably of copper, calculated as CuO, is in the range of from 1 to 10 weight-%, preferably in the range of from 2 to 8 weight-%, more preferably in the range of from 3 to 6 weight-%, based on the weight of the 8-membered ring pore zeolitic material comprising one or more of copper and iron.

82. The system of embodiment 81, wherein the 8-membered ring pore zeolitic material of the selective catalytic reduction coating has a framework type selected from the group consisting of CHA, AEI, RTH, LEV, DDR, KFI, ERI, AFX, a mixture of two or more thereof and a mixed type of two or more thereof, preferably selected from the group consisting of CHA, AEI, RTH, a mixture of two or more thereof and a mixed type of two or more thereof, more preferably selected from the group consisting of CHA and AEI, wherein more preferably the 8-membered ring pore zeolitic material of the selective catalytic reduction coating has a framework type CHA.

83. The system of embodiment 81 or 82, wherein the framework structure of the 8-membered ring pore zeolitic material comprises, preferably consists of, a tetravalent element Y, a trivalent element X and O, wherein Y is one or more of Si, Sn, Ti, Zr and Ge and X is one or more of Al, B, In and Ga, wherein the molar ratio of Y:X, calculated as YO$_2$:X$_2$O$_3$, is in the range of from 2:1 to 45:1, preferably in the range of from 10:1 to 40:1, more preferably in the range of from 15:1 to 30:1, wherein Y preferably comprises, more preferably is, Si, and wherein X preferably comprises, more preferably is, one or more of Al and B, preferably Al.

84. The system of any one of embodiments 1 to 83, consisting of the NOx adsorber component, the DOC component, the SCR component and the gas heating component.

Process for Preparing a System

85. A process for preparing a system for the treatment of an exhaust gas of a diesel combustion engine, preferably for preparing a system for the treatment of an exhaust gas of a diesel combustion engine according to any one of embodiments 1 to 84, said process comprising
 (1) providing an NOx adsorber component, a diesel oxidation catalyst (DOC) component, a selective catalytic reduction (SCR) component, a gas heating component, and a reductant injector,
  wherein the NOx adsorber component is comprised in
  (i) a catalyst which comprises
   (i.1) a first substrate comprising an inlet end, an outlet end, a substrate axial length extending from the inlet end to the outlet end of the first substrate, and a plurality of passages defined by internal walls of the first substrate extending therethrough;
   (i.2) an NOx adsorber coating being said NOx adsorber component, said coating being disposed on the surface of the internal walls of the first substrate over at least 50% of the substrate axial length of the first substrate, the NOx adsorber coating comprising a platinum group metal component and a 10-membered ring pore zeolitic material having a framework type selected from the group consisting of FER, TON, MTT, SZR, MWW, AEL, HEU, AFO, a mixture of two or more thereof and a mixed type of two or more thereof;
 (2) arranging the NOx adsorber component upstream of the gas heating component;
 (3) arranging the reductant injector upstream of the SCR component;
 (4) arranging the gas heating component upstream of the reductant injector;
 (5) arranging the DOC component upstream of the reductant injector;
 (6) arranging the DOC component and the gas heating component in directly consecutive order.

86. The process of embodiment 85, wherein between the DOC component according to (1) and the gas heating component according to (1), no other component for the treatment of the exhaust gas is arranged.

87. The process of embodiment 85 or 86, wherein said components are arranged in a conduit for the exhaust gas, preferably in sequential order, the upstream end of said conduit preferably designed to be arranged downstream of a diesel combustion engine, wherein more preferably, the upstream end of said conduit is arranged downstream of a diesel combustion engine.

88. The process of any one of embodiments 85 to 87, wherein the DOC component is arranged upstream of the gas heating component, wherein the DOC component and the NOx adsorber component are preferably arranged upstream of the gas heating component.

89. The process of any one of embodiments 85 to 88, the DOC component and the NOx adsorber component being comprised in a catalyst, wherein the catalyst is prepared by and/or wherein the process further comprises
 (a) providing a first substrate, and a NOx adsorber mixture comprising water, a source of a platinum group metal component and a 10-membered ring pore zeolitic material;
 (b) disposing the NOx adsorber mixture obtained in (a) on the surface of the internal walls of the first substrate comprising an inlet end, an outlet end, a substrate axial length extending from the inlet end to the outlet end of the first substrate, and a plurality of passages defined by internal walls of the first substrate extending therethrough, over at least 50% of the substrate axial length of the first substrate;
 (c) optionally calcining of the coated substrate obtained in (b) in a gas atmosphere, preferably having a temperature in the range of from 400 to 800° C., preferably in the range of from 450 to 700° C., more preferably in the range of from 550 to 650° C., the gas atmosphere preferably being air,
  wherein, prior to calcining in (c), drying of the first NOx adsorber mixture disposed on the first substrate is performed in a gas atmosphere having a temperature in the range of from 90 to 150° C., preferably in the range of from 100 to 120° C., the gas atmosphere preferably being air, preferably for a duration in the range of from 0.5 to 4 hours, more preferably in the range of from 0.75 to 2 hours; wherein prior to calcining in (c), the coated substrate obtained in (b) is preferably dried in a gas atmosphere having a temperature in the range of from 90 to 150° C., more preferably in the range of from 100 to 120° C., the gas atmosphere more preferably being air,
 (d) providing a diesel oxidation catalyst (DOC) mixture comprising water, a source of a platinum group metal component, a non-zeolitic oxidic material comprising one or more of alumina, silica, zirconia and titania, and preferably a zeolitic material;
 (e) disposing the diesel oxidation mixture obtained in (d) on the first substrate comprising a NOx adsorber coating disposed thereon obtained according to (b) or (c), over at least 70% of the substrate axial length of the first substrate, wherein the coated substrate is preferably dried in a gas atmosphere having a temperature in the range of from 90 to 150° C., more preferably in the range of from 100 to 120° C., the gas atmosphere preferably being air, wherein the dried substrate is preferably calcined in a gas atmosphere having a temperature in the range of from 400 to 800° C., preferably in the range of from 450 to 700° C., more preferably in the range of from 550 to 650° C., preferably for a duration in the range of from 0.25 to 5 hours; obtaining a first substrate comprising a NOx adsorber coating and a diesel oxidation coating disposed thereon.

90. The process of embodiment 89, wherein the NOx adsorber mixture is disposed in (b) on the surface of the internal walls of the first substrate over 70 to 100%, preferably 80 to 100%, more preferably 90 to 100%, more preferably 95 to 100%, more preferably 98 to 100%, more preferably 99 to 100%, of the substrate axial length of the first substrate, wherein the first NOx adsorber mixture is preferably disposed in (b) on the surface of the internal walls of the first substrate from the inlet end to the outlet end of the first substrate.

91. The process of embodiment 89 or 90, wherein the platinum group metal component of the NOx adsorber mixture according to (a) comprises one or more of palladium, platinum, rhodium, iridium, osmium and ruthenium, preferably one or more of palladium, platinum and rhodium, more preferably one or more of palladium and platinum, wherein the platinum group metal component more preferably comprises, more preferably is, palladium.

92. The process of any one of embodiments 89 to 90, wherein the 10-membered ring pore zeolitic material of the NOx adsorber mixture according to (a) is impregnated with the source of a platinum group metal component of the NOx adsorber mixture according to (a), wherein impregnating is preferably performed by mixing the 10-membered ring pore zeolitic material with the source of a platinum group metal component, preferably a source of palladium, more preferably a palladium nitrate solution, and wherein the impregnated 10-membered ring pore zeolitic material is preferably dispersed in water.

93. The process of any one of embodiments 89 to 92, wherein the 10-membered ring pore zeolitic material of the NOx adsorber mixture according to (a) has a framework type selected from the group consisting of FER, TON, a mixture thereof and a mixed type thereof, wherein more preferably the 10-membered ring pore zeolitic material of the NOx adsorber mixture according to (a) has a framework type FER, wherein the framework structure of the 10-membered ring pore zeolitic material of the NOx adsorber mixture according to (a) preferably comprises, more preferably consists of, a tetravalent element Y, a trivalent element X and oxygen, wherein Y is preferably one or more of Si, Sn, Ti, Zr and Ge, more preferably Si, and X is preferably one or more of Al, B, In and Ga, more preferably Al, wherein the molar ratio of Y:X, calculated as $YO_2:X_2O_3$, is preferably in the range of from 2:1 to 100:1, more preferably in the range of from 10:1 to 55:1, more preferably in the range of from 12:1 to 40:1, more preferably in the range of from 15:1 to 28:1, more preferably in the range of from 18:1 to 25:1.

94. The process of any one of embodiments 89 to 93, wherein the DOC mixture according to (d) is disposed on the first substrate comprising a NOx adsorber coating disposed thereon obtained according to (b) or (c), over 80 to 100%, preferably 90 to 100%, more preferably 95 to 100%, more preferably 98 to 100%, more preferably 99 to 100%, of the substrate axial length of the first substrate, wherein the DOC according to (d) preferably is disposed on the first substrate comprising a NOx adsorber coating disposed thereon obtained according to (b) or (c) from the inlet end to the outlet end of the first substrate.

95. The process of any one of embodiments 89 to 94, wherein the platinum group metal component of the DOC mixture according to (d) comprises one or more of palladium, platinum, rhodium, iridium, osmium and ruthenium, preferably one or more of palladium, platinum and rhodium, more preferably one or more of palladium and platinum, more preferably comprises, more preferably is, platinum, wherein the non-zeolitic oxidic material according to (d) is more preferably impregnated with the platinum group metal component of the DOC mixture according to (d).

96. The process of any one of embodiments 89 to 95, wherein the non-zeolitic oxidic material of the DOC mixture according to (d) comprises one or more of alumina, silica and zirconia, preferably one or more of alumina and silica, more preferably alumina, more preferably gamma-alumina, wherein the non-zeolitic oxidic material preferably further comprises one or more of manganese, silicon and zirconium, wherein the non-zeolitic oxidic material more preferably comprises alumina and manganese, wherein the non-zeolitic oxidic material of the DOC mixture according to (d) more preferably comprises the alumina in an amount in the range of from 80 to 99 weight-%, more preferably in the range of from 85 to 98 weight-%, more preferably in the range of from 90 to 97 weight-%, based on the weight of the non-zeolitic oxidic material.

97. The process of any one of embodiments 89 to 96, wherein the DOC mixture according to (d) further comprises a zeolitic material, preferably a 12-membered ring pore zeolitic material, wherein the 12-membered ring pore zeolitic material preferably has a framework type selected from the group consisting of BEA, FAU, USY, GME, MOR, OFF, a mixture of two or more thereof and a mixed type of two or more thereof, more preferably selected from the group consisting of BEA, USY, FAU, a mixture of two or more thereof and a mixed type of two or more thereof, wherein more preferably the 12-membered ring pore zeolitic material has a framework type BEA, wherein the framework structure of the zeolitic material preferably comprises, more preferably consists of, Si, Al and O, wherein the molar ratio of Si:Al, calculated as $SiO_2:Al_2O_3$, is preferably in the range of from 2:1 to 1200:1, more preferably in the range of from 10:1 to 400:1, more preferably in the range of from 15:1 to 100:1, more preferably in the range of from 18:1 to 30:1, more preferably in the range of from 20:1 to 26:1, said zeolitic material preferably comprising at most 0.001 weight-%, more preferably from 0 to 0.0001 weight-%, more preferably from 0 to 0.00001 weight-%, of copper, calculated as CuO.

98. The process of any one of embodiments 89 to 97, wherein the first substrate according to (a) is a flow-through substrate or a wall flow filter substrate, preferably a flow-through substrate, wherein the flow-through substrate is preferably one or more of a cordierite flow-through substrate and a metallic flow-through substrate, more preferably a metallic flow-through substrate, said first substrate preferably having a cylindrical shape, the diameter of the first substrate preferably being in the range of from 3 to 10 inches, more preferably in the range of from 3.5 to 8 inches, more preferably in the range of from 4 to 6 inches, the first substrate preferably having an axial length in the range of from 3 to 10 inches, more preferably in the range of from 3.5 to 8 inches, more preferably in the range of from 4 to 6 inches.

99. The process of any one of embodiments 85 to 98, wherein the gas heating component according to (1) comprises a second substrate comprising an inlet end, an outlet end, a substrate axial length extending from the inlet end to the outlet end of the second substrate, and a plurality of passages defined by internal walls of the second substrate extending therethrough, and wherein the inlet end of the second substrate and the outlet end of the first substrate according to (a) are coupled to allow exhaust gas exiting from the passages of the first substrate to enter the passages of the second substrate;
wherein the internal walls of the second substrate are thermally conductive to allow heating thereof for heating of exhaust gas flowing through the passages of the second substrate.

100. The process of embodiment 99, wherein the second substrate is a flow-through substrate, preferably a metallic flow-through substrate, more preferably a metallic electrically and/or thermally conductive flow-through substrate.

101. The process of embodiment 99 or 100, wherein the second substrate has a cylindrical shape, the diameter of the second substrate preferably being in the range of from 3 to 10 inches, more preferably in the range of from 3.5 to 8 inches, more preferably in the range of from 4 to 6 inches, wherein more preferably, the diameter of the second substrate is in the range of from 90 to 110%, preferably in the range of from 95 to 105%, more preferably in the range of from 98 to 102% of the diameter of the first substrate as defined in embodiment 23, said second substrate preferably having an axial length in the range of from 0.15 to 2 inches, more preferably in the range of from 0.20 to 1.5 inches, more preferably in the range of from 0.30 to 1 inch.

102. The process of any one of embodiments 99 to 101, wherein the gas heating component according to (1) is prepared by and/or wherein the process further comprises
(g.1) optionally disposing an NOx adsorber mixture on the surface of the internal walls of the second substrate over at least 50% of the substrate axial length of the second substrate, the NOx adsorber mixture comprising a source of a platinum group metal component and a 10-membered ring pore zeolitic material having a framework type selected from the group consisting of FER, TON, MTT, SZR, MWW, AEL, HEU, AFO, a mixture of two or more thereof and a mixed type of two or more thereof;
(g.2) disposing a diesel oxidation catalyst (DOC) mixture on the surface of the internal walls of the second substrate and/or on the NOx adsorber coating of the substrate obtained from (g.1) over at least 70% of the substrate axial length of the second substrate, the DOC mixture comprising a source of a platinum group metal component and a source of a non-zeolitic oxidic material comprising one or more of alumina, silica, zirconia and titania.

103. The process of embodiment 102, wherein the NOx adsorber mixture according to (g.1) is disposed on the surface of the internal walls of the second substrate over 70 to 100%, preferably 80 to 100%, more preferably 90 to 100%, more preferably 95 to 100%, more preferably 98 to 100%, more preferably 99 to 100%, of the substrate axial length of the second substrate, wherein the NOx adsorber mixture according to (g.1) preferably is disposed on the surface of the internal walls of the second substrate from the outlet end to the inlet of the second substrate.

104. The process of embodiment 102 or 103,
wherein the platinum group metal component of the NOx adsorber mixture according to (g.1) comprises one or more of palladium, platinum, rhodium, iridium, osmium and ruthenium, preferably one or more of palladium, platinum and rhodium, more preferably one or more of palladium and platinum, wherein the platinum group metal component more preferably comprises, more preferably is, palladium;
wherein the 10-membered ring pore zeolitic material of the NOx adsorber mixture according to (g.1) is preferably impregnated with the source of a platinum group metal component of the NOx adsorber mixture according to (g.1);
wherein the 10-membered ring pore zeolitic material of the NOx adsorber mixture according to (g.1) preferably has a framework type selected from the group consisting of FER, TON, a mixture thereof and a mixed type thereof, wherein more preferably the 10-membered ring pore zeolitic material of the NOx adsorber mixture according to (g.1) has a framework type FER, wherein the framework structure of the 10-membered ring pore zeolitic material of the NOx adsorber mixture according to (g.1) preferably comprises, more preferably consists of, a tetravalent element Y, a trivalent element X and oxygen, wherein Y is preferably one or more of Si, Sn, Ti, Zr and Ge, more preferably Si, and X is preferably one or more of Al, B, In and Ga, more preferably Al, wherein the molar ratio of Y:X, calculated as $YO_2$:$X_2O_3$, is preferably in the range of from 2:1 to 100:1, more preferably in the range of from 10:1 to 55:1, more preferably in the range of from 12:1 to 40:1, more preferably in the range of from 15:1 to 28:1, more preferably in the range of from 18:1 to 25:1.

105. The process of any one of embodiments 102 to 104, wherein the DOC mixture according to (g.2) is disposed on the surface of the internal walls of the second substrate and/or on the NOx adsorber coating of the substrate obtained according to (g.1) over 80 to 100%, preferably 90 to 100%, more preferably 95 to 100%, more preferably 98 to 100%, more preferably 99 to 100%, of the substrate axial length of the first substrate, wherein the DOC mixture according to (g.2) preferably is disposed on the surface of the internal walls of the second substrate and/or on the NOx adsorber coating of the substrate obtained according to (g.1) from the inlet end to the outlet end of the first substrate.

106. The process of any one of embodiments 102 to 105, wherein the DOC mixture according to (g.2) is disposed on the surface of the internal walls of the second substrate and/or on the NOx adsorber coating of the substrate obtained according to (g.1) over 80 to 100%, preferably 90 to 100%, more preferably 95 to 100%, more preferably 98 to 100%, more preferably 99 to 100%, of the substrate axial length of the first substrate, wherein the DOC mixture according to (g.2) preferably is disposed on the surface of the internal walls of the second substrate and/or on the NOx adsorber coating of the substrate obtained according to (g.1) from the inlet end to the outlet end of the first substrate.

107. The process of any one of embodiments 102 to 106, wherein the platinum group metal component of the DOC mixture according to (g.2) comprises one or more of palladium, platinum, rhodium, iridium, osmium and ruthenium, preferably one or more of palladium, platinum and rhodium, more preferably one or more of palladium and platinum, more preferably comprises, more preferably is, platinum, wherein the non-zeolitic oxidic material according to (g.2) is more preferably impregnated with the source of a platinum group metal component of the DOC mixture according to (g.2);

wherein the source of a non-zeolitic oxidic material of the DOC coating according to (g.2) preferably comprises one or more of alumina, silica and zirconia, more preferably one or more of alumina and silica, more preferably alumina, more preferably gamma-alumina, wherein the source of a non-zeolitic oxidic material preferably further comprises one or more of manganese, silicon and zirconium, wherein the source of a non-zeolitic oxidic material more preferably comprises alumina and manganese, wherein the source of a non-zeolitic oxidic material of the DOC mixture according to (g.2) more preferably comprises alumina in an amount in the range of from 80 to 99 weight-%, more preferably in the range of from 85 to 98 weight-%, more preferably in the range of from 90 to 97 weight-%, based on the weight of the non-zeolitic oxidic material;

wherein the DOC mixture according to (g.2) preferably further comprises a zeolitic material, more preferably a 12-membered ring pore zeolitic material, wherein the 12-membered ring pore zeolitic material preferably has a framework type selected from the group consisting of BEA, FAU, USY, GME, MOR, OFF, a mixture of two or more thereof and a mixed type of two or more thereof, more preferably selected from the group consisting of BEA, USY, FAU, a mixture of two or more thereof and a mixed type of two or more thereof, wherein more preferably the 12-membered ring pore zeolitic material has a framework type BEA, wherein the framework structure of the zeolitic material preferably comprises, more preferably consists of, Si, Al and O, wherein the molar ratio of Si:Al, calculated as $SiO_2:Al_2O_3$, is preferably in the range of from 2:1 to 1200:1, more preferably in the range of from 10:1 to 400:1, more preferably in the range of from 15:1 to 100:1, more preferably in the range of from 18:1 to 30:1, more preferably in the range of from 20:1 to 26:1, said zeolitic material preferably comprising at most 0.001 weight-%, more preferably from 0 to 0.0001 weight-%, more preferably from 0 to 0.00001 weight-%, of copper, calculated as CuO;

wherein said zeolitic material preferably comprises at most 0.001 weight-%, more preferably from 0 to 0.0001 weight-%, more preferably from 0 to 0.00001 weight-%, of iron, calculated as $Fe_2O_3$; or wherein the zeolitic material preferably comprises iron, preferably in an amount in the range of from 0.5 to 8 weight-%, more preferably in the range of from 1 to 5 weight-%, calculated as $Fe_2O_3$.

108. The process of any one of embodiments 99 to 107, wherein the outlet end of the first substrate and the inlet end of the second substrate are arranged opposite to each other, wherein the angle between the surface normal of the surface defined by the outlet end of the first substrate and the surface normal of the surface defined by the inlet end of the second substrate is preferably in the range of from 0 to 5°, more preferably in the range of from 0 to 3°, more preferably in the range of from 0 to 1°.

109. The process of embodiment 108, wherein the outlet end of the first substrate and the inlet end of the second substrate are spaced from one another, preferably at a distance in the range of from 2 to 20 mm, preferably in the range of from 5 to 15 mm, more preferably in the range of from 8 to 12 mm, wherein the outlet end of the first substrate and the inlet end of the second substrate are preferably spaced from one another by one or more spacer means, preferably one or more spacer rods, wherein a given spacer rod is preferably fixed at either the outlet end of the first substrate, or at the inlet end of the second substrate, or at the outlet end of the first substrate as well as at the inlet end of the second substrate, wherein the one or more spacer means, preferably the one or more spacer rods, are preferably electrically insulating.

110. The process of any one of embodiments 99 to 109, wherein one single substrate is used as the first substrate and the second substrate together which comprises an inlet end, an outlet end, a substrate axial length extending from the inlet end to the outlet end of the single substrate, and a plurality of passages defined by internal walls of the single substrate extending therethrough, wherein the NOx adsorber mixture according to (b) is disposed on the surface of the internal walls of the single substrate, wherein the coated substrate is preferably dried in a gas atmosphere having a temperature in the range of from 90 to 150° C., more preferably in the range of from 100 to 120° C., preferably for a duration in the range of from 0.5 to 4 hours, preferably in the range of from 0.75 to 2 hours, the gas atmosphere preferably being air, wherein the dried substrate is preferably calcined in a gas atmosphere having a temperature in the range of from 400 to 800° C., preferably in the range of from 450 to 700° C., more preferably in the range of from 550 to 650° C., preferably for a duration in the range of from 0.25 to 5 hours, preferably in the range of from 0.5 to 2 hours, the gas atmosphere preferably being air, wherein the DOC mixture according to (d) and the DOC mixture according to (g.2) are at least partially disposed on the single substrate coated with the single NOx adsorber coating to form one single DOC coating;

wherein the NOx adsorber coating is preferably disposed over at least 50%, more preferably over 70 to 100%, more preferably over 80 to 100%, more preferably over 95 to 100%, more preferably over 98 to 100%, more preferably over 99 to 100%, of the substrate axial length of the single substrate, and/or wherein the single DOC coating preferably is at least partially disposed on the surface of the internal walls of the single substrate and/or on the NOx adsorber coating over at least 90%, more preferably over 95 to 100%, more preferably over 98 to 100%, more preferably over 99 to 100%, of the substrate axial length of the single substrate, wherein the coated substrate is preferably dried in a gas atmosphere having a temperature in the range of from 90 to 150° C., more preferably in the range of from 100 to 120° C., preferably for a duration in the range of from 0.5 to 4 hours, preferably in the range of from 0.75 to 2 hours, the gas atmosphere preferably being air, wherein the dried substrate is preferably calcined in a gas atmosphere having a temperature in the range of from 400 to 800° C., preferably in the range of from 450 to 700° C., more preferably in the range of from 550 to 650° C., preferably for a duration in the range of from 0.25 to 5 hours, preferably in the range of from 0.5 to 2 hours, the gas atmosphere preferably being air;

wherein more preferably one single substrate is used as the first substrate and the second substrate together which comprises an inlet end, an outlet end, a substrate axial length extending from the inlet end to the outlet end of the single substrate, and a plurality of passages defined by internal walls of the single substrate extending therethrough, wherein the NOx adsorber mixture according to (b) and the NOx adsorber mixture according to (g.1) are disposed on the internal walls of the single substrate to form one single NOx adsorber coating, wherein the coated substrate is preferably dried in a gas atmosphere having a temperature in the range of from 90 to 150° C., more preferably in the range of from 100 to 120° C., preferably for a duration in the range of from 0.5 to 4 hours, preferably in the range of from 0.75 to 2 hours, the gas atmosphere preferably being air, wherein the dried substrate is preferably calcined in a gas atmosphere having a temperature in the range of from 400 to 800° C., preferably in the range of from 450 to 700° C., more preferably in the range of from 550 to 650° C., preferably for a duration in the range of from 0.25 to 5 hours, preferably in the range of from 0.5 to 2 hours, the gas atmosphere preferably being air, wherein the DOC mixture according to (d) and the DOC mixture according to (g.2) are at least partially disposed on the single substrate coated with the single NOx adsorber coating to form one single DOC coating;

wherein the single NOx adsorber coating is preferably disposed over at least 50%, more preferably over 70 to 100%, more preferably over 80 to 100%, more preferably over 95 to 100%, more preferably over 98 to 100%, more preferably over 99 to 100%, of the substrate axial length of the single substrate, and/or wherein the single DOC coating preferably is at least partially disposed on the surface of the internal walls of the single substrate and/or on the single NOx adsorber coating over at least 90%, more preferably over 95 to 100%, more preferably over 98 to 100%, more preferably over 99 to 100%, of the substrate axial length of the single substrate, wherein the coated substrate is preferably dried in a gas atmosphere having a temperature in the range of from 90 to 150° C., more preferably in the range of from 100 to 120° C., preferably for a duration in the range of from 0.5 to 4 hours, preferably in the range of from 0.75 to 2 hours, the gas atmosphere preferably being air, wherein the dried substrate is preferably calcined in a gas atmosphere having a temperature in the range of from 400 to 800° C., preferably in the range of from 450 to 700° C., more preferably in the range of from 550 to 650° C., preferably for a duration in the range of from 0.25 to 5 hours, preferably in the range of from 0.5 to 2 hours, the gas atmosphere preferably being air.

111. The process of any one of embodiments 99 to 110, wherein the first substrate according to (a) and the second substrate are surrounded by a jacket, wherein preferably from 95 to 100%, more preferably from 98 to 100%, more preferably from 99 to 100% of the inlet end face of the first substrate and preferably from 95 to 100%, more preferably from 98 to 100%, more preferably from 99 to 100% of the outlet end face of the second substrate are not covered by the jacket, wherein the jacket preferably comprises one or more means for connecting the second substrate to an electrical power supply.

112. The process of any one of embodiments 85 to 87, wherein the DOC component is arranged downstream of the gas heating component.

113. The process of embodiment 112, the NOx adsorber component being comprised in a catalyst, wherein the catalyst is prepared by and/or wherein the process further comprises
   (n.1) providing a first substrate which comprises an inlet end, an outlet end, a substrate axial length extending from the inlet end to the outlet end of the first substrate, and a plurality of passages defined by internal walls of the first substrate extending therethrough;
   (n.2) disposing an NOx adsorber mixture on the surface of the internal walls of the first substrate over at least 50% of the substrate axial length of the first substrate, the NOx adsorber mixture comprising a source of a platinum group metal component and a 10-membered ring pore zeolitic material, wherein the coated substrate is preferably dried in a gas atmosphere having a temperature in the range of from 90 to 150° C., more preferably in the range of from 100 to 120° C., preferably for a duration in the range of from 0.5 to 4 hours, preferably in the range of from 0.75 to 2 hours, the gas atmosphere preferably being air, wherein the dried substrate is preferably calcined in a gas atmosphere having a temperature in the range of from 400 to 800° C., preferably in the range of from 450 to 700° C., more preferably in the range of from 550 to 650° C., preferably for a duration in the range of from 0.25 to 5 hours, preferably in the range of from 0.5 to 2 hours, the gas atmosphere preferably being air.

114. The process of embodiment 113, wherein the NOx adsorber mixture according to (n.2) is disposed on the surface of the internal walls of the first substrate over 70 to 100%, preferably 80 to 100%, preferably 90 to 100%, more preferably 95 to 100%, more preferably 98 to 100%, more preferably 99 to 100%, of the substrate axial length of the first substrate, wherein the first NOx adsorber mixture according to (n.2) preferably is disposed on the surface of the internal walls of the first substrate from the inlet end to the outlet end of the first substrate.

115. The process of embodiment 113 or 114, wherein the platinum group metal component of the NOx adsorber coating according to (n.2) comprises one or more of palladium, platinum, rhodium, iridium, osmium and ruthenium, preferably one or more of palladium, platinum and rhodium, more preferably one or more of palladium and platinum, wherein the platinum group metal component more preferably comprises, more preferably is, palladium, wherein the platinum group metal component of the NOx adsorber coating according to (n.2) is preferably impregnated on the 10-membered ring pore zeolitic material.

116. The process of any one of embodiments 113 to 115, wherein the 10-membered ring pore zeolitic material of the NOx adsorber coating according to (n.2) has a framework type selected from the group consisting of FER, TON, a mixture thereof and a mixed type thereof, wherein more preferably the 10-membered ring pore zeolitic material of the NOx adsorber coating according to (n.2) has a framework type FER, wherein the framework structure of the 10-membered ring pore zeolitic material of the NOx adsorber coating according to (n.2) preferably comprises, more preferably consists of, a tetravalent element Y, a trivalent element X and oxygen, wherein Y is preferably one or more of Si, Sn, Ti, Zr and Ge, more preferably Si, and X is preferably one or more of Al, B, In and Ga, more preferably Al, wherein the molar ratio of Y:X, calculated as $YO_2$:$X_2O_3$, is preferably in the range of from 2:1 to 100:1, more preferably in the range of from 10:1 to 55:1, more preferably in the range of from 12:1 to 40:1, more preferably in the range of from 15:1 to 28:1, more preferably in the range of from 18:1 to 25:1.

117. The process of any one of embodiments 113 to 116, wherein the first substrate according to (n.1) is a flow-through substrate or a wall flow filter substrate, preferably a flow-through substrate, wherein the flow-through substrate is preferably one or more of a cordierite flow-through substrate and a metallic flow-through substrate, wherein the first substrate according to (n.1) preferably has a cylindrical shape, the diameter of the first substrate preferably being in the range of from 3 to 10 inches, more preferably in the range of from 3.5 to 8 inches, more preferably in the range of from 4 to 6 inches, wherein the first substrate according to (n.1) preferably having an axial length in the range of from 0.5 to 8 inches, more preferably in the range of from 1 to 5 inches, more preferably in the range of from 1.25 to 3 inches.

118. The process of any one of embodiments 113 to 117, the DOC component being comprised in a catalyst, wherein the catalyst is prepared by and/or wherein the process further comprises
   (d.1) providing a third substrate which comprises an inlet end, an outlet end, a substrate axial length extending from the inlet end to the outlet end of the third substrate, and a plurality of passages defined by internal walls of the third substrate extending therethrough;
   (d.2) disposing a first DOC mixture on the surface of the internal walls of the third substrate over at least 70% of the substrate axial length of the third substrate, the first DOC mixture comprising a source of a platinum group metal component and a source of a non-zeolitic oxidic material comprising one or more of alumina, silica, zirconia and titania;
   (d.3) optionally disposing a second DOC mixture on the third substrate coated with the first DOC mixture over at least 20% of the substrate axial length of the third substrate, the second DOC mixture comprising a source of a platinum group metal component and a source of a non-zeolitic oxidic material comprising one or more of alumina, silica, zirconia and titania, wherein the second DOC coating is preferably disposed from the outlet end to the inlet end of the third substrate.

119. The process of embodiment 118, wherein the platinum group metal component of the first DOC mixture according to (d.2) comprises one or more of palladium, platinum, rhodium, iridium, osmium and ruthenium, preferably one or more of palladium, platinum and rhodium, more preferably one or more of palladium and platinum, wherein the second platinum group metal component more preferably comprises, more preferably is, platinum and palladium.

120. The process of embodiment 118 or 119, wherein the source of a non-zeolitic oxidic material according to (d.2) comprises one or more of alumina, silica, zirconia, silica-alumina, alumina-zirconia, silica-zirconia, preferably one or more of alumina, silica, and silica-alumina, more preferably silica-alumina, more preferably gamma-alumina doped with silica, wherein the non-zeolitic oxidic material more preferably comprises alumina in an amount in the range of from 80 to 99 weight-%, more preferably in the range of from 85 to 95 weight-%, more preferably in the range of from 88 to 90 weight-%, based on the weight of the non-zeolitic oxidic material, wherein the non-zeolitic oxidic material more preferably exhibits a BET specific surface area greater than 75 $m^2/g$, more preferably greater than 100 $m^2/g$, wherein the non-zeolitic oxidic material more preferably exhibits a pore volume of greater than 0.04 $cm^3/g$, more preferably greater than 0.06 $cm^3/g$ 121. The process of any one of embodiments 118 to 120, wherein the first DOC coating according to (d.2) further comprises a zeolitic material, preferably a 12-membered ring pore zeolitic material, wherein the 12-membered ring pore zeolitic material has a framework type preferably selected from the group consisting of BEA, FAU, USY, GME, MOR, OFF, a mixture of two or more thereof and a mixed type of two or more thereof, more preferably selected from the group consisting of BEA, USY, FAU, a mixture of two or more thereof and a mixed type of two or more thereof, wherein more preferably the 12-membered ring pore zeolitic material has a framework type BEA, wherein the framework structure of the zeolitic material preferably comprises, more preferably consists of, Si, Al and oxygen, wherein the molar ratio of Si:Al, calculated as $SiO_2$:$Al_2O_3$, is preferably in the range of from 2:1 to 1200:1, more preferably in the range of from 10:1 to 400:1, more preferably in the range of from 15:1 to 100:1, more preferably in the range of from 18:1 to 30:1, more preferably in the range of from 20:1 to 26:1, said zeolitic material preferably comprising at most 0.001 weight-%, more preferably from 0 to 0.0001 weight-%, more preferably from 0 to 0.00001 weight-%, of copper, calculated as CuO.

122. The process of any one of embodiments 118 to 121, wherein the first DOC mixture according to (d.2) is disposed over 80 to 100%, preferably over 90 to 100%, more preferably over 95 to 100%, more preferably over 98 to 100%, more preferably over 99 to 100%, of the substrate axial length of the third substrate according to (d.1).

123. The process of any one of embodiments 118 to 122, wherein a second DOC mixture is disposed on the third substrate coated with the first DOC mixture according to (d.3).

124. The process of embodiment 123, wherein the source of a platinum group metal component of the second DOC mixture according to (d.3) comprises one or more of palladium, platinum, rhodium, iridium, osmium and ruthenium, preferably one or more of palladium, platinum and rhodium, more preferably one or more of palladium and platinum, wherein the source of a second platinum group metal component more preferably comprises, more preferably is, platinum and palladium.

125. The process of embodiment 123 or 124, wherein the non-zeolitic oxidic material of the second DOC mixture according to (d.3) comprises one or more of alumina, silica, zirconia, silica-alumina, alumina-zirconia, and silica-zirconia, preferably one or more of alumina, silica, and silica-alumina, more preferably silica-alumina, more preferably gamma-alumina doped with silica, wherein the non-zeolitic oxidic material of the second DOC mixture according to (d.3) preferably comprises alumina in an amount in the range of from 80 to 99 weight-%, more preferably in the range of from 85 to 95 weight-%, more preferably in the range of from 88 to 90 weight-%, based on the weight of the non-zeolitic oxidic material, wherein the non-zeolitic oxidic material more preferably exhibits a BET specific surface area greater than 75 m²/g, more preferably greater than 100 m²/g.

126. The process of any one of embodiments 123 to 125, wherein the second DOC mixture according to (d.3) is disposed over 30 to 100%, preferably over 35 to 80%, more preferably over 40 to 60%, more preferably over 45 to 55%, of the substrate axial length of the third substrate according to (d.1).

127. The process of any one of embodiments 123 to 126, wherein the third substrate according to (d.1) is a flow-through substrate, preferably one or more of a cordierite flow-through substrate and a metallic flow-through substrate, wherein the third substrate according to (d.1) preferably has a cylindrical shape, the diameter of the third substrate preferably being in the range of from 3 to 10 inches, more preferably in the range of from 3.5 to 8 inches, more preferably in the range of from 4 to 6 inches, the third substrate according to (d.1) preferably having an axial length in the range of from 1 to 10 inches, more preferably in the range of from 1.5 to 7 inches, more preferably in the range of from 2 to 5 inches.

128. The process of any one of embodiments 113 to 127, wherein the gas heating component comprises
   (g.1') a second substrate comprising an inlet end, an outlet end, a substrate axial length extending from the inlet end to the outlet end of the second substrate, and a plurality of passages defined by internal walls of the second substrate extending therethrough;
   wherein the inlet end of the second substrate according to (g.1') and the outlet end of the first substrate according to (n.1) are coupled to allow gas exiting from the passages of the first substrate according to (n.1) to enter the passages of the second substrate according to (g.1');
   wherein the inlet end of the third substrate according to (d.1) and the outlet end of the second substrate according to (g.1') are coupled to allow gas exiting from the passages of the second substrate to enter the passages of the third substrate according to (d.1);
   wherein the internal walls of the second substrate according to (g.1') are thermally conductive to allow heating thereof for heating of exhaust gas flowing through the passages of the second.

129. The process of embodiment 128, wherein the second substrate according to (g.1') is a flow-through substrate, preferably a metallic flow-through substrate, more preferably a metallic electrically and/or thermally conductive flow-through substrate.

130. The process of embodiment 128 or 129, wherein the second substrate according to (g.1') has a cylindrical shape, the diameter of the second substrate preferably being in the range of from 3 to 10 inches, more preferably in the range of from 3.5 to 8 inches, more preferably in the range of from 4 to 6 inches, wherein more preferably, the diameter of the second substrate is in the range of from 90 to 110%, preferably in the range of from 95 to 105%, more preferably in the range of from 98 to 102% of the diameter of the first substrate as defined in embodiment 48, said second substrate according to (g.1') preferably having an axial length in the range of from 0.15 to 2 inches, more preferably in the range of from 0.20 to 1.5 inches, more preferably in the range of from 0.30 to 1 inch.

131. The process of any one of embodiments 128 to 130, further comprising
   (g.2') disposing a first DOC mixture on the surface of the internal walls of the second substrate according to (g.1') over at least 70% of the substrate axial length of the second substrate according to (g.1'), the first DOC mixture comprising a source of a platinum group metal component and a source of a non-zeolitic oxidic material comprising one or more of alumina, silica, zirconia and titania;
   (g.3') optionally disposing a second DOC mixture on the second substrate coated with the first DOC mixture according to (g.2') over at least 70% of the substrate axial length of the second substrate according to (g.1'), the second DOC mixture comprising a source of a platinum group metal component and a non-zeolitic oxidic material comprising one or more of alumina, silica, zirconia and titania.

132. The process of embodiment 131, wherein the second substrate according to (g.1') is a flow-through substrate, preferably a metallic flow-through substrate, more preferably a metallic electrically and/or thermally conductive flow-through substrate.

133. The process of embodiment 131 or 132, wherein the second substrate according to (g.1') has a cylindrical shape, the diameter of the second substrate preferably being in the range of from 3 to 10 inches, more preferably in the range of from 3.5 to 8 inches, more preferably in the range of from 4 to 6 inches, wherein more preferably, the diameter of the second substrate is in the range of from 90 to 110%, preferably in the range of from 95 to 105%, more preferably in the range of from 98 to 102% of the diameter of the first substrate as defined in embodiment 48, said second substrate according to (g.1') preferably having an axial length in the range of from 0.15 to 2 inches, more preferably in the range of from 0.20 to 1.5 inches, more preferably in the range of from 0.30 to 1 inch.

134. The process of any one of embodiments 131 to 133, wherein the gas heating component is prepared by and/or wherein the process further comprises
   (g.2') disposing a first DOC mixture on the surface of the internal walls of the second substrate according to (g.1') over at least 70% of the substrate axial length of the second substrate according to (g.1'), the first DOC mixture comprising a source of a platinum group metal component and a source of a non-zeolitic oxidic material comprising one or more of alumina, silica, zirconia and titania;
   (g.3') preferably disposing a second DOC mixture on the second substrate coated with the first DOC mixture according to (g.2') over at least 70% of the substrate axial length of the second substrate according to (g.1'), the second DOC mixture comprising a source of a platinum group metal component and a source of a non-zeolitic oxidic material comprising one or more of alumina, silica, zirconia and titania.

135. The process of embodiment 134, wherein the source of a platinum group metal component of the first DOC mixture according to (g.2') comprises one or more of palladium, platinum, rhodium, iridium, osmium and ruthenium, preferably one or more of palladium, platinum and rhodium, more preferably one or more of palladium and platinum, wherein the source of a platinum group metal component more preferably comprises, more preferably is, platinum and palladium;
wherein the source of a non-zeolitic oxidic material according to (g.2') preferably comprises one or more of alumina, silica, zirconia, silica-alumina, alumina-zirconia, and silica-zirconia more preferably one or more of alumina, silica, and silica-alumina, more preferably silica-alumina, more preferably gamma-alumina doped with silica, wherein the source of a non-zeolitic oxidic material more preferably comprises alumina in an amount in the range of from 80 to 99 weight-%, more preferably in the range of from 85 to 95 weight-%, more preferably in the range of from 88 to 90 weight-%, based on the weight of the non-zeolitic oxidic material;
wherein the source of a non-zeolitic oxidic material more preferably exhibits a BET specific surface area greater than 75 m$^2$/g, more preferably greater than 100 m$^2$/g;
wherein the source of a non-zeolitic oxidic material more preferably exhibits a pore volume of greater than 0.04 cm$^3$/g, more preferably greater than 0.06 cm$^3$/g;
wherein the first DOC mixture according to (g.2') preferably further comprises a zeolitic material, more preferably a 12-membered ring pore zeolitic material, wherein the 12-membered ring pore zeolitic material has a framework type preferably selected from the group consisting of BEA, FAU, USY, GME, MOR, OFF, a mixture of two or more thereof and a mixed type of two or more thereof, more preferably selected from the group consisting of BEA, USY, FAU, a mixture of two or more thereof and a mixed type of two or more thereof, wherein more preferably the 12-membered ring pore zeolitic material has a framework type BEA, wherein the framework structure of the zeolitic material preferably comprises, more preferably consists of, Si, Al and oxygen, wherein the molar ratio of Si:Al, calculated as SiO$_2$:Al$_2$O$_3$, is preferably in the range of from 2:1 to 1200:1, more preferably in the range of from 10:1 to 400:1, more preferably in the range of from 15:1 to 100:1, more preferably in the range of from 18:1 to 30:1, more preferably in the range of from 20:1 to 26:1, said zeolitic material preferably comprising at most 0.001 weight-%, more preferably from 0 to 0.0001 weight-%, more preferably from 0 to 0.00001 weight-%, of copper, calculated as CuO;
wherein the first DOC mixture according to (g.2') is preferably disposed over 80 to 100%, more preferably over 90 to 100%, more preferably over 95 to 100%, more preferably over 98 to 100%, more preferably over 99 to 100%, of the substrate axial length of the second substrate according to (g.1').

136. The process of embodiment 135, wherein the gas heating component comprises a second DOC coating according to (g.3').

137. The process of embodiment 136, wherein the source of a platinum group metal component of the second DOC mixture according to (g.3') comprises one or more of palladium, platinum, rhodium, iridium, osmium and ruthenium, preferably one or more of palladium, platinum and rhodium, more preferably one or more of palladium and platinum, wherein the source of a non-zeolitic oxidic material of the second DOC mixture according to (g.3') preferably comprises one or more of alumina, silica, zirconia, silica-alumina, alumina-zirconia, and silica-zirconia, more preferably one or more of alumina, silica, and silica-alumina, more preferably silica-alumina, more preferably gamma-alumina doped with silica, wherein the non-zeolitic oxidic material of the second DOC coating according to (g.3') preferably comprises alumina in an amount in the range of from 80 to 99 weight-%, more preferably in the range of from 85 to 95 weight-%, more preferably in the range of from 88 to 90 weight-%, based on the weight of the non-zeolitic oxidic material;
wherein the source of a non-zeolitic oxidic material more preferably exhibits a BET specific surface area greater than 75 m$^2$/g, more preferably greater than 100 m$^2$/g;
wherein the source of a non-zeolitic oxidic material more preferably exhibits a pore volume of greater than 0.04 cm$^3$/g, more preferably greater than 0.06 cm$^3$/g;
wherein the second DOC mixture according to (g.3') is preferably disposed over 30 to 100%, preferably over 35 to 80%, more preferably over 40 to 60%, more preferably over 45 to 55%, of the substrate axial length of the second substrate according to (g.1').

138. The process of any one of embodiments 128 to 137, wherein the coatings of the gas heating component exhibit essentially the same, preferably the same chemical and physical characteristics as the coatings of the catalyst as defined in any one of embodiments 118 to 127.

139. The process of any one of embodiments 128 to 138, wherein one single substrate is used to form the second substrate according to (g.1') and the third substrate according to (d.1) which comprises an inlet end, an outlet end, a substrate axial length extending from the inlet end to the outlet end of the single substrate, and a plurality of passages defined by internal walls of the single substrate extending therethrough, wherein the first DOC mixture according to (g.2') and the first DOC mixture according to (d.2) are disposed together to form one single first DOC coating, and wherein preferably the second DOC mixture according to (g.3') and the second DOC mixture according to (d.3) are disposed together to form one single second DOC coating; wherein the single first DOC mixture is disposed preferably over at least 90%, more preferably over 95 to 100%, more preferably over 98 to 100%, more preferably over 99 to 100%, of the substrate axial length of the single substrate, and wherein preferably the single second DOC mixture is disposed over preferably at least 40%, more preferably over 45 to 100%, more preferably over 50 to 80%, of the substrate axial length of the single substrate.

140. The process of any one of embodiments 128 to 139, wherein the outlet end of the second substrate and the inlet end of the third substrate are arranged opposite to each other, wherein the angle between the surface normal of the surface defined by the outlet end of the second substrate and the surface normal of the surface defined by the inlet end of the third substrate is preferably in the range of from 0 to 5°, more preferably in the range of from 0 to 3°, more preferably in the range of from 0 to 1°.

141. The process of embodiment 140, wherein the outlet end of the second substrate and the inlet end of the third substrate are spaced from one another, preferably at a distance in the range of from 2 to 20 mm, preferably in the range of from 5 to 15 mm, more preferably in the range of from 8 to 12 mm, wherein the outlet end of the second substrate and the inlet end of the third substrate are preferably spaced from one another by one or more spacer means, preferably one or more spacer rods, wherein a given spacer rod is preferably fixed at either the outlet end of the second substrate, or at the inlet end of the third substrate, or at the outlet end of the second substrate as well as at the inlet end of the third substrate, wherein the one or more spacer means, preferably the one or more spacer rods, are preferably electrically insulating.

142. The process of any one of embodiments 85 to 141, wherein a selective catalytic reduction (SCR) catalyst is provided as the SCR component, the selective catalytic reduction (SCR) catalyst being prepared by
  (s.1) providing a fourth substrate, preferably a wall-flow filter substrate, comprising an inlet end, an outlet end, and a substrate axial length extending from the inlet end to the outlet end of the third substrate;
  (s.2) disposing a selective catalytic reduction (SCR) mixture on the fourth substrate according to (s.1);
  wherein the inlet end of the fourth substrate according to (s.1) and either the outlet end of the second substrate according to (s.1) as far as embodiment 142 refers to any one of embodiments 99 to 111, or the outlet end of the third substrate according to (d.1) as far as embodiment 142 refers to any one of embodiments 118 to 141 are coupled to allow exhaust gas exiting from the passages of the second substrate to enter the third substrate.

143. The process of embodiment 142, wherein the SCR mixture according to (s.2) comprises an 8-membered ring pore zeolitic material comprising one or more of copper and iron, preferably copper, wherein the amount of the one or more of copper and iron, calculated as CuO and $Fe_2O_3$, respectively, more preferably of copper, calculated as CuO, is in the range of from 1 to 10 weight-%, preferably in the range of from 2 to 8 weight-%, more preferably in the range of from 3 to 6 weight-%, based on the weight of the 8-membered ring pore zeolitic material comprising one or more of copper and iron.

144. The process of embodiment 143, wherein the 8-membered ring pore zeolitic material of the selective catalytic reduction coating has a framework type selected from the group consisting of CHA, AEI, RTH, LEV, DDR, KFI, ERI, AFX, a mixture of two or more thereof and a mixed type of two or more thereof, preferably selected from the group consisting of CHA, AEI, RTH, a mixture of two or more thereof and a mixed type of two or more thereof, more preferably selected from the group consisting of CHA and AEI, wherein more preferably the 8-membered ring pore zeolitic material of the selective catalytic reduction coating has a framework type CHA.

145. The process of embodiment 142 or 143, wherein the framework structure of the 8-membered ring pore zeolitic material comprises, preferably consists of, a tetravalent element Y, a trivalent element X and O, wherein Y is one or more of Si, Sn, Ti, Zr and Ge and X is one or more of Al, B, In and Ga, wherein the molar ratio of Y:X, calculated as $YO_2:X_2O_3$, is in the range of from 2:1 to 45:1, preferably in the range of from 10:1 to 40:1, more preferably in the range of from 15:1 to 30:1, wherein Y preferably comprises, more preferably is, Si, and wherein X preferably comprises, more preferably is, one or more of Al and B, preferably Al.

146. The process of any one of embodiments 85 to 145, wherein the reductant injector comprises, preferably consists of, one or more of a hydrocarbon injector, a hydrocarbon in-cylinder post injector, and a urea injector, preferably a urea injector, wherein the reductant injector is preferably arranged downstream of the DOC component.

147. A system for the treatment of an exhaust gas of a diesel combustion engine, preferably a system for the treatment of an exhaust gas of a diesel combustion engine according to any one of embodiments 1 to 84, obtainable or obtained by a process according to any one of embodiments 85 to 146.

148. A method for the treatment of an exhaust gas of a diesel combustion engine, comprising providing an exhaust gas from a diesel combustion engine and passing said exhaust gas through a system according to any one of embodiments 1 to 84 or 147.

149. The method of embodiment 148, wherein a reductant, preferably one or more of a hydrocarbon and urea, is injected through the reductant injector into the exhaust gas passed through said system.

150. The method of embodiment 148 or 149, wherein the exhaust gas is heated through the gas heating component comprised in said system for heating one or more of the SCR component, the DOC component, and the NA adsorber component comprised in said system.

151. Use of a system according to any one of embodiments 1 to 84 or 147 for the treatment of an exhaust gas of a diesel combustion engine, said use comprising passing said exhaust gas through said system.

The present invention is further illustrated by the following reference examples, comparative examples and examples.

EXAMPLES

Reference Example 1

1.1 Determination of the Volume-Based Particle Size Distribution, in Particular of Dv10, Dv50, Dv90 Values The volume-based particle size distributions were determined by a static light scattering method using a state of the art equipment, wherein the optical concentration of the sample was in the range of from 5 to 10 weight-%.

1.2 Measurement of the BET Specific Surface Area

The BET specific surface area was determined according to DIN 66131 or DIN ISO 9277 using liquid nitrogen.

1.3 Determination of the Crystallinity

The determination of the relative crystallinity of a zeolite was performed via x-ray diffraction using a test method under the jurisdiction of ASTM Committee D32 on catalysts, in particular of Subcommittee D32.05 on zeolites. The current edition was approved on Mar. 10, 2001 and published in May 2001, which was originally published as D 5758-95.

Reference Example 2: Preparation of a NOx Adsorber with a DOC Function Catalyst (Layered Catalyst—FER)

Bottom Coating:

An ammonium ferrierite (having framework structure type FER, a $SiO_2$:$Al_2O_3$ molar ratio of 21 and a crystallinity vs. standard (XRD)>80%) zeolitic material was wet impregnated with an aqueous palladium nitrate solution, to attain a Pd loading of 2.31 weight-% based on the weight of the final material (zeolitic material+palladium) dispersed in water. An uncoated flow-through metallic substrate (total volume 1.81 L, 400 cpsi and 40 micrometers wall thickness, cylindrical shape, diameter: 5.2 inches×length: 5.3 inches), was immersed in the obtained slurry over 100% of the substrate axial length, forming a bottom coating. The coated substrate was dried in air having a temperature of 110° C. for 1 hour and subsequently calcined in air at 590° C. for 2 hours, forming a bottom coating. The loading of palladium in the bottom coating was 120 g/ft$^3$ and the total bottom coating loading was 3 g/in$^3$.

Top Coating:

A high porous gamma-alumina support material comprising 5% by weight $MnO_2$ ($Al_2O_3$ 95 weight-% with Mn 5 weight-%, calculated as $MnO_2$) was impregnated with a solution of stabilized platinum complexes via a wet impregnation process to attain a Pt loading of 3.2 weight-% based on the weight of the final material (Mn-alumina+platinum). Ammonium Beta zeolitic material (BEA, a $SiO_2$:$Al_2O_3$ molar ratio of 23 and a crystallinity vs. standard (XRD) >90%) was added to the Pt-alumina mixture. The weight ratio of the alumina doped with Mn to the Beta zeolitic material was of 3.14:1. The substrate coated with the bottom coating was coated with the obtained slurry over 100% of the substrate axial length. The coated substrate was dried in air having a temperature of 110° C. for 1 hour and subsequently calcined in air at 590° C. for 2 hours, forming a top coating. The loading of platinum in the top coating was 60 g/ft$^3$ and the total top coating loading was 1.45 g/in$^3$. The catalyst of Reference Example 1 was represented in FIG. 3 (with an optional SCRoF (2)).

Reference Example 3: Gas Heating Component

As electrical heating substrate and, thus as gas heating component, an uncoated flow-through metallic substrate having a total volume of 0.164 L, diameter: 5.66 inches× length 0.4 inch, 130 cpsi and 50 micrometers wall thickness was used. The substrate was electrically heatable, whereby a voltage of 48 V was used for Example 1 and Comparative Example 1 and a voltage of 12 V for Examples 4 and 5 and Comparative Examples 2 and 3.

Comparative Example 1: Preparation of a NOx Adsorber (NA-) with a DOC Function Catalyst (Layered Catalyst on a Substrate Including an Upstream Heating Substrate—FER)

The catalyst of Comparative Example 1 not according to the present invention was prepared by applying a Pd-FER slurry, as the one prepared in Reference Example 2 for the bottom coating, onto a substrate which was made of, in its upstream portion, an uncoated electrical heating substrate (total volume 0.164 L, 48 Volts, diameter: 5.7 inches×length 0.4 inch, 130 cpsi and 50 micrometers wall thickness) electrically connected to an uncoated flow-through metallic substrate (total volume 1.85 L, 400 cpsi and 40 micrometers wall thickness, diameter: 5.7 inches×length: 4.45 inches) in its downstream portion. The coated substrate was dried in air having a temperature of 110° C. for 1 hour and subsequently calcined in air at 590° C. for 2 hours, forming a bottom coating. The bottom coating covered 100% of the substrate axial length. Further, a Pt/Mn-alumina/BEA slurry, as the one prepared in Reference Example 2 for the top coating, was applied on the substrate coated with the bottom coating over 100% of the substrate axial length. The coated substrate was dried in air having a temperature of 110° C. for 1 hour and subsequently calcined in air at 590° C. for 2 hours, forming a top coating. The catalyst of Comparative Example 1 is shown in FIG. 3 (there with an optional SCRoF 2).

Example 1: Preparation of a NOx Adsorber (NA-) with a DOC Function Catalyst (Layered Catalyst on a Substrate Including a Downstream Heating Substrate—FER)

The catalyst of Example 1 according to the present invention was prepared by applying a Pd-FER slurry, as the one prepared in Reference Example 2 for the bottom coating, onto a substrate which was made of, in its upstream portion, an uncoated flow-through metallic substrate (total volume 1.81 L, 400 cpsi and 40 micrometers wall thickness, diameter: 5.7 inches×length: 4.45 inches) connected to an uncoated electrical heating flow-through metallic substrate (total volume 0.164 L, 48 Volts, diameter: 5.7 inches×length 0.4 inch, 130 cpsi and 50 micrometers wall thickness) in its downstream portion. The coated substrate was dried in air having a temperature of 110° C. for 1 hour and subsequently calcined in air at 590° C. for 2 hours, forming a bottom coating. The bottom coating covered 100% of the substrate axial length. Further, a Pt/Mn-alumina/BEA slurry, as the one prepared in Reference Example 2 for the top coating, was applied on the substrate coated with the bottom coating over 100% of the substrate axial length. The coated substrate was dried in air having a temperature of 110° C. for 1 hour and subsequently calcined in air at 590° C. for 2 hours, forming a top coating. The catalyst of Example 1 is shown in FIG. 3 (with an optional SCRoF 2).

Example 2: Testing of the NA-DOC Catalyst of Reference Example 2—Simulated Low Temperature City Driving Cycle, NOx Adsorption Evaluation The catalyst of Reference Example 2 was tested in a simulated low temperature city driving mode on a 2 L diesel engine after aging for 16 hours at 800° C. in 10% steam/air. The driving cycle was compiled from city driving mode of the New European Driving Cycle (NEDC). The average temperature of the cycle was about 170° C. The cycle was driven twice for 1880 s. The test was conducted with an SCR catalyst article downstream from the NOx adsorber-DOC sample from Reference Example 2 noted above. The SCR catalyst article comprises Cu-CHA coated on a filter substrate. Between the NOx adsorber-DOC article and the SCR catalyst article an injector for urea dosing was applied to deliver the reductant for the SCR reaction. The tested system was represented in FIG. 3. Prior to the first test the temperature of the NOx adsorber-DOC sample was increased to 650° C. for 10 min.

FIG. 1 provides the test results of the first test run. All formulations adsorb $NO_x$ in the exhaust leaving the engine up to about 500 s. FIG. 2 provides the test results of the second test run. In the $2^{nd}$ test run, it is shown that the emissions of the tested system are caused by an insufficient NOx handshake with the downstream SCR of NA-DOC of Reference Example 2 meaning that the desorbed NOx from the NA-DOC is not fully converted by the downstream SCR.

Example 3: Testing of the Catalysts of Reference Example 2, of Comparative Example 1 and of Example 1 in a System—WLTC Evaluation on a Diesel Engine The catalysts of Reference Example 2, Comparative Example 1 and Example 1 were tested each in a Worldwide Harmonized Light Vehicle Test Cycle (WLTC) on a 3 L diesel engine after aging for 16 h at 800° C. in 10% steam/air. Prior to the first test, the temperature of the NOx adsorber samples was increased to 650° C. for 10 min, to remove pre-adsorbed NOx.

The catalysts of Reference Example 2, Comparative Example 1 and Example 1 were evaluated with a downstream SCR catalyst. The SCR catalyst article comprises Cu-CHA coated on a filter substrate (SCRoF). Between a sample (a component comprising a NOx adsorber function and a DOC function) and the SCR catalyst article an injector for urea dosing was applied to deliver the reductant for the SCR reaction. The tested systems are shown in FIG. 3.

For Comparative Example 1 and Example 1, the electrical heating element was switched on directly after the start of the WLTC for 450 s. After additional 50 s, the heating element was started again for 400 s. The temperature post heating element is increasing to a maximum temperature of 350° C.

FIG. 4 provides the test results. The thicker lines are the emissions from the samples prior to the SCRoF. The thin lines show the NOx emissions after the SCR catalytic article. The catalysts of Reference Example 1 and Example 1 adsorb $NO_x$ in the exhaust leaving the engine up to about 800 s. The catalyst of Comparative Example 1 shows no NOx adsorption caused by too high inlet temperature from the heating element. The catalysts of Reference Example 1 and Example 1 show a high release of NOx after about 800 s. For the inventive Example 1, the downstream SCRoF, which is directly heated by the heating element, fully converts the released NOx.

Table 1 provides the system NOx emissions in mg/km for the total WLTC cycle (23 km) and after 600 s for the city driving part only (3 km). Only Example 1 (inventive) achieves lowest emissions for both the full WLTC and during the urban part of the WLTC. The values were measured at the outlet end of the SCRoF.

TABLE 1

|  | NOx total WLTC/mg/km | NOx after 600 s/3 km of the WLTC mg/km |
| --- | --- | --- |
| Reference Example 2 | 44 | 50 |
| Comparative Example 1 | 11 | 60 |
| Example 1 | 6 | 19 |

Table 2 shows the CO and THC emissions in g/km for the full WLTC cycle of the catalyst/systems of Reference Example 1, Comparative Example 1 and Example 1.

TABLE 2

|  | CO/g/km | THC/g/km |
| --- | --- | --- |
| Reference Example 2 | 0.23 | 0.038 |
| Comparative Example 1 | 0.05 | 0.012 |
| Example 1 | 0.15 | 0.03 |

As may be taken from these tables and FIG. 4, the system according to Example 1 according to the present invention permits to greatly decrease the NOx emissions as well as CO and THC (total hydrocarbon) compared to a NA-DOC catalyst which is not coupled with a gas heating component (Reference Example 1). Surprisingly, it has been found that the gas heating component should be disposed downstream of the NA-DOC catalyst in order to obtain the best balance for reducing NOx, CO and THC emissions.

Reference Example 4: Preparation of a NOx Adsorber (NA) Catalyst (FER)

An ammonium ferrierite (having framework structure type FER, a $SiO_2:Al_2O_3$ molar ratio of 21 and a crystallinity vs. standard (XRD) greater than 90%) zeolitic material was wet impregnated with an aqueous solution of palladium nitrate to attain a Pd loading of 2.7 weight-% based on the weight of the zeolitic material. An uncoated flow-through honeycomb cordierite substrate (total volume 0.6 L, 400 cpsi and 4 mil wall thickness, diameter: 5.66 inches×length: 1.6 inches), was coated with the obtained slurry over 100% of the substrate axial length. The coated substrate was dried in air having a temperature of 110° C. for 1 hour and subsequently calcined in air at 590° C. for 2 hours. The loading of palladium was 140 g/ft³ and the total coating loading was 3 g/in³.

Reference Example 5: Preparation of a DOC Catalyst

Bottom Coating:
A high porous gamma-alumina support material comprising 95 weight-% Al, calculated as $Al_2O_3$, and 5 weight-% Si, calculated as $SiO_2$, having a BET specific surface area of greater than 100 m²/g, and a pore volume of greater than 0.06 cm³/g, was impregnated with an aqueous solution of stabilized platinum complexes and an aqueous solution of palladium nitrate using incipient wetness technique. The Pd/Pt-alumina powder was slurried in water with the addition of an ammonium-Beta zeolitic material (BEA, a $SiO_2$:$Al_2O_3$ molar ratio of 23 and a crystallinity vs. standard (XRD) greater than 90%). The weight ratio of the alumina doped with Si to the Beta zeolitic material was of 4.3:1. An uncoated flow-through honeycomb cordierite substrate (total volume 1.24 L, 400 cpsi and 4 mil wall thickness, diameter: 5.66 inches×length: 3 inches), was coated with the obtained slurry over 100% of the substrate axial length. The coated substrate was dried in air having a temperature of 110° C. for 1 hour and subsequently calcined in air at 590° C. for 2 hours, forming a bottom coating. The loading of palladium and platinum in the bottom coating was 20 g/ft³ and 40 g/ft³, respectively, and the total bottom coating loading was 1.9 g/in³.

Top Coating:
A high porous gamma-alumina support material comprising 95 weight-% Al, calculated as $Al_2O_3$ and 5 weight-% Si calculated as $SiO_2$, having a BET specific surface area of greater than 100 m²/g, and a pore volume of greater than 0.06 cm³/g was impregnated with an aqueous solution of stabilized platinum complexes and an aqueous solution of palladium nitrate using an incipient wetness technique. The Pd/Pt-alumina powder was slurried in water. The substrate coated with the bottom coating was coated with the obtained slurry over 50% of the substrate axial length from the outlet end toward the inlet end of the substrate. The coated substrate was dried in air having a temperature of 110° C. for 1 hour and subsequently calcined in air at 590° C. for 2 hours, forming a top coating. The loading of palladium and platinum in the top coating (on 50% of the substrate length) was 17 g/ft³ and 103 g/ft³, respectively, and the total top coating loading (onto 50% of the volume of the substrate) was 1.5 g/in³. The total coating loading (bottom and top coatings) was of 2.65 g/in³ with a palladium loading of 28.5 g/ft³ and a platinum loading of 91.5 g/ft³ (total PGM loading 120 g/ft³).

Comparative Example 2: Preparation of a System Comprising a DOC, an Electrical Heating Substrate and a DOC The system of Comparative Example 2 not according to the present invention was prepared by combining two diesel oxidation catalysts according to Reference Example 5 and the electrical heating substrate of Reference Example 3, wherein a first DOC of Reference Example 5 is positioned upstream of the electrical heating substrate of Reference Example 3 and the electrical heating substrate of Reference Example 3 is positioned upstream of a second DOC of Reference Example 5.

Example 4: Preparation of a System Comprising a NOx Adsorber (NA-)Catalyst, an Electrical Heating Substrate and a DOC Catalyst With respect to a test in particular a comparatively lower Pd loading on the zeolitic material having framework structure type FER, Example 4 was prepared which is otherwise very similar to Example 2.

The system of Example 4 according to the present invention was prepared by combining the NOx adsorber catalyst of Reference Example 4, the diesel oxidation catalyst (DOC) of Reference Example 5 and the electrical heating substrate of Reference Example 3, wherein the NOx adsorber catalyst of Reference Example 4 is positioned upstream of the electrical heating substrate of Reference Example 3 and the electrical heating substrate of Reference Example 3 is positioned upstream of the DOC of Reference Example 5.

Reference Example 6: Preparation of a NOx Adsorber (NA) Catalyst (FER)

A ammonium ferrierite (having framework structure type FER, a $SiO_2:Al_2O_3$ molar ratio of 21 and a crystallinity vs. standard (XRD)>90%) zeolitic material was wet impregnated with an aqueous solution of palladium nitrate, dried in air having a temperature of 110° C. for 1 hour and calcined in air at 590° C. for 2 hours to attain a Pd loading of 2.3 weight-% based on the weight of the zeolitic material. This Pd-FER powder was slurried in water. An uncoated flow-through metallic substrate (total volume 0.6 L, 400 cpsi and 40 micrometers wall thickness, diameter: 5.66 inches×length: 1.6 inches), was coated with the obtained slurry over 100% of the substrate axial length. The coated substrate was dried in air having a temperature of 110° C. for 1 hour and subsequently calcined in air at 590° C. for 2 hours. The loading of palladium was 120 g/ft³ and the total coating loading was 3 g/in³.

Reference Example 7: Preparation of a DOC Catalyst

Bottom Coating:
A high porous gamma-alumina support material comprising 95 weight-% Al, calculated as $Al_2O_3$, and 5% weight Si, calculated as $SiO_2$, having a BET specific surface area of greater than 100 m²/g, and a pore volume of greater than 0.06 cm³/g was impregnated with an aqueous solution of stabilized platinum complexes and an aqueous solution of palladium nitrate using an incipient wetness technique The Pd/Pt-alumina powder was slurried in water. An uncoated flow-through honeycomb cordierite substrate (total volume 1.24 L, 400 cpsi and 4 mil wall thickness, diameter: 5.66 inches×length: 3 inches), was coated with the obtained slurry over 100% of the substrate axial length. The coated substrate was dried in air having a temperature of 110° C. for 1 hour and subsequently calcined in air at 590° C. for 2 hours, forming a bottom coating. The loading of palladium and platinum in the bottom coating was 32.75 g/ft³ and 65.5 g/ft³, respectively, and the total bottom coating loading was 1.5 g/in³.

Top Coating:
A high porous gamma-alumina support material comprising 95 weight-% Al, calculated as $Al_2O_3$, and 5% weight Si, calculated as $SiO_2$, having a BET specific surface area of greater than 100 m²/g, a pore volume of greater than 0.06 cm³/g was impregnated with an aqueous solution of palladium nitrate using an incipient wetness technique. The Pd-alumina powder was slurried in water with the addition of an ammonium-Beta zeolitic material (BEA, a $SiO_2:Al_2O_3$ molar ratio of 23 and on the weight of the zeolitic material and a crystallinity vs. standard (XRD) greater than 90%). The substrate coated with the bottom coating was coated with the obtained slurry over 100% of the substrate axial length. The coated substrate was dried in air having a temperature of 110° C. for 1 hour and subsequently calcined in air at 590° C. for 2 hours, forming a top coating. The loading of palladium in the top coating was 32.75 g/ft³ and the total top coating loading was 1.5 g/in³.

Comparative Example 3: Preparation of a System Comprising a DOC, an Electrical Heating Substrate and a DOC The system of Comparative Example 3, not according to the present invention, was prepared by combining the diesel oxidation catalyst of Reference Example 7, the diesel oxidation catalyst of Reference Example 5 and the electrical heating substrate of Reference Example 3, wherein the DOC of Reference Example 7 is positioned upstream of the electrical heating substrate of Reference Example 3 and the electrical heating substrate of Reference Example 3 is positioned upstream of the DOC of Reference Example 5.

Example 5: Preparation of a System Comprising a NOx Adsorber (NA-)Catalyst, an Electrical Heating Substrate and a DOC Catalyst The system of Example 5 according to the present invention was prepared by combining the NOx adsorber catalyst of Reference Example 6, the diesel oxidation catalyst (DOC) of Reference Example 5 and the gas heating component of Reference Example 3, wherein the NOx adsorber catalyst of Reference Example 6 is positioned upstream of the gas heating component of Reference Example 3 and the electrical heating substrate of Reference Example 3 is positioned upstream of the DOC of Reference Example 5.

Example 6: Testing of the System of Comparative Examples 2 and 3 and of Examples 4 and 5—WLTC Evaluation on a Diesel Engine—NOx Emissions The systems of Comparative Examples 2 and 3 and of Examples 4 and 5 were tested in a Worldwide Harmonized Light Vehicle Test Cycle (WLTC) on a 2 L diesel engine after aging for 16 h at 800° C. in 10% steam/air. Prior to the first test the temperature of the NOx adsorber samples (in Examples 4 and 5) was increased to 650° C. for 10 min, to remove pre-adsorbed NOx.

The systems of Comparative Examples 2 and 3 and of Examples 4 and 5 were evaluated with a downstream SCRoF. The SCR catalyst article comprises Cu-CHA coated on a filter substrate (SCRoF). Between the NOx adsorber and DOC article and the SCR catalyst article an injector for urea dosing was applied to deliver the reductant for the SCR reaction. The tested systems of Comparative Example 2 and Example 4 are shown in FIG. 3.

The electrical heating element for all systems was switched on directly after the start of the WLTC. The temperature in front of the SCR article was adjusted between 200 and 250° C. The temperature directly behind the heating element was increasing to a maximum temperature of 380° C.

Table 3 provides the system NOx emissions in mg/km for the total WLTC cycle (23 km) and after 600 s for the city driving part only (3 km). The system of Example 4 achieves lowest emissions for both the full WLTC and during the urban part of WLTC. The system of Example 5 achieves lower emissions for both the full WLTC compared to the systems of Comparative Examples 2 and 3.

TABLE 3

|  | NOx total WLTC [mg/km] | NOx after 600 s of the WLTC [mg/km] |
| --- | --- | --- |
| Example 4 | 5 | 20 |
| Comparative Example 2 | 8 | 45 |
| Example 5 | 8 | 32 |
| Comparative Example 3 | 10 | 53 |

Table 4 shows the CO and THC emissions in g/km for the full WLTC cycle of systems of Comparative Example 2 and Example 4. Both examples show very low CO and THC emissions from the high temperatures in the DOC behind the heating element. The CO and THC emissions are also lowered compare to the emissions obtained with the system of Comparative Example 1. The system of Example 5 shows similar results for CO emissions.

TABLE 4

|  | CO/g/km | THC/g/km |
| --- | --- | --- |
| Example 4 | 0.04 | 0.010 |
| Comparative Example 2 | 0.04 | 0.010 |
| Comparative Example 1 | 0.05 | 0.012 |
| Example 5 | 0.04 | 0.011 |
| Comparative Example 3 | 0.05 | 0.010 |

As may be taken from these tables, the system of Example 4 provides the lowest emissions for all three components, CO, THC and NOx. Therefore, it has been surprisingly found that a further treatment system which uses an electrical heating element between a NA catalyst and a DOC (inventive system) permits to obtain the lowest NOx, CO and THC emissions.

Further, it has been surprisingly found that both types of substrate, namely cordierite and metallic, for supporting a NA catalyst permits to obtain great reduction in NOx, CO and THC emissions compared to the emissions obtained with the comparative examples.

Example 7: Testing of the Systems of Comparative Example 2 and Example 4—WLTC Evaluation on a Diesel Engine—N₂O Formation The systems of Comparative Example 2 and Example 4 were tested in a Worldwide Harmonized Light Vehicle Test Cycle (WLTC) on a 2 L diesel engine after aging for 16 h at 800° C. in 10% steam/air. Between the DOC component and the SCR catalyst of a system an reductant injector for urea dosing was arranged to deliver the reductant for the SCR reaction.

FIG. 5 displays the NOx emissions divided by the distance of the WLTC vs. the distance of the WLTC. From this data plot, the system of Example 4 achieves after 2 km driving NOx emissions below 30 mg/km. For the system of Comparative Example 2 NOx emissions below 30 mg/km are reached after 4× longer driving, i.e., 8 km. FIG. 6 provides the emissions of the greenhouse gas, N$_2$O, over the WLTC. The system of Comparative Example 2 is showing higher N$_2$O emissions compared to the system of Example 4.

Reference Example 8: Preparation of a NOx Adsorber (NA) with a DOC Function Catalyst (Layered Catalyst on a Substrate Including a Downstream Heating Substrate—FER)

Bottom Coating (NOx Adsorber Coating):

An ammonium ferrierite zeolitic material (a zeolitic material having framework structure type FER, a SiO$_2$:Al$_2$O$_3$ molar ratio of 21:1 and a crystallinity vs. standard (XRD) >80%) was wet impregnated with an aqueous palladium nitrate solution to attain a Pd loading of 1.48 weight-% based on the weight of the final material (zeolitic material+palladium). To the resulting slurry a zirconium acetate mixture was added. The amount of zirconium acetate was calculated such that the amount of zirconia in the bottom coating, calculated as ZrO$_2$, was 5 weight-% based on the weight of the zeolitic material.

A porous uncoated round flow-through honeycomb cordierite substrate (having a total volume of 1.85 L, 400 cpsi and 4 mil wall thickness, a diameter of 5.66 inches and a length of 4.5 inches), was coated with the obtained slurry over 100% of the substrate axial length. The coated substrate was dried in air at 110° C. for 1 h and subsequently calcined in air at 590° C. for 2 h, forming a bottom coating. The loading of palladium in the bottom coating was 70 g/ft$^3$, the loading of the FER in the bottom coating was 2.7 g/in$^3$ and the loading of ZrO$_2$ was 0.135 g/in$^3$. The loading of the bottom coating was 2.9 g/in$^3$.

Top Coating (DOC Coating):

For the outlet top coating, an Al$_2$O$_3$ support material comprising 5 weight-% MnO$_2$ (Al$_2$O$_3$ 95 weight-% with Mn 5 weight-%, calculated as MnO$_2$, having a BET specific surface area of greater than 100 m$^2$/g, and a pore volume of greater than 0.06 cm$^3$/g) was impregnated with platinum via a wet impregnation process. A slurry containing the resulting material was coated over 50% of the substrate axial length from the outlet end towards the inlet end of the cordierite substrate carrying the Pd-FER bottom coating. The outlet top coating contained 80 g/ft$^3$ platinum and the loading of the outlet coating was 1.3 g/in$^3$.

For the inlet top coating, an alumina support material comprising 5 weight-% SiO$_2$ was impregnated with platinum and palladium in a weight ratio of 2:1 via a wet impregnation process. A Fe-Beta zeolitic material (a zeolitic material having framework structure type BEA, a SiO$_2$:Al$_2$O$_3$ molar ratio of 23:1 and a crystallinity vs. standard (XRD)>90% and an Fe content, calculated as Fe$_2$O$_3$ of 4.3 weight-% based on the weight of the zeolitic material) was added to the Pt/Pd-alumina slurry. The weight ratio of the alumina doped with Si to the Beta zeolitic material was 1:1. The resulting slurry was coated over 50% of the substrate axial length from the inlet end towards the outlet end of the cordierite substrate coated with the Pd-FER bottom layer and the outlet top coating. The inlet top coating contained 13.3 g/ft$^3$ platinum and 6.7 g/ft$^3$ Pd. The loading of the inlet top coating was 1.41 g/in$^3$.

The total loading of the top coating (outlet top coating+inlet top coating) was 1.355 g/in$^3$.

Reference Example 9: Preparation of a NOx Adsorber Catalyst (NA)

A H-chabazite zeolitic material (having framework structure type CNA, a SiO$_2$:Al$_2$O$_3$ molar ratio of 14 and a crystallinity vs. standard (XRD)>90%) was wet impregnated with an aqueous palladium nitrate solution and calcined in air at 590° C. for 2 hours. The resulting Pd-impregnated chabazite had a Pd loading of 1.22 weight-% based on the weight of the final material (zeolitic material+palladium). Said Pd-impregnated chabazite was dispersed in water to obtain a slurry.

A porous uncoated flow-through cordierite honeycomb substrate (having a total volume of 1.85 L, 400 cpsi and 4 mil wall thickness, a diameter of 5.66 inches and a length of 4.5 inches) was coated with said slurry over 100% of the substrate axial length. The coated substrate was dried in air having a temperature of 110° C. for 1 h and subsequently calcined in air at 590° C. for 2 h. The loading of palladium on the coated substrate was 60 g/ft$^3$ and the total washcoat loading was 2.85 g/in$^3$.

Example 8: Preparation of a System Comprising a Catalyst with NOx Adsorber (Pd-FER) Component and a DOC Component and an Electrical Heating Substrate The system of Example 8 according to the present invention was prepared by combining the catalyst of Reference Example 8 which comprises a NOx adsorber component and a diesel oxidation catalyst (DOC) component and the gas heating component of Reference Example 3, wherein the catalyst of Reference Example 8 was positioned upstream of the gas heating component of Reference Example 3.

Comparative Example 4: Preparation of a System Comprising a NOx Adsorber (Pd-CHA) Catalyst, and an Electrical Heating Substrate The system of Comparative Example 4 according to the present invention was prepared by combining the catalyst of Reference Example 9 which comprises a NOx adsorber component and the gas heating component of Reference Example 3, wherein the catalyst of Reference Example 9 was positioned upstream of the gas heating component of Reference Example 3.

Example 9: Testing of Inventive and Comparative Examples—Simulated Low Temperature City Driving Cycle, NOx Adsorption Evaluation The system according to Example 8 and the system according to Comparative Example 4 were each tested using a simulated low temperature city driving mode on a 2 L diesel engine after hydrothermal aging at 800° C. for 16 hours in 10% steam (water)/air. The systems according to Example 8 and Comparative Example 4 were tested independently from one another with a selective catalytic reduction (SCR) catalyst positioned downstream thereto. The SCR catalyst comprised a Cu-CHA zeolite coated on a 3 L filter substrate. Between the system and the SCR catalyst an injector for urea dosing was applied suitable for delivering a reductant for the SCR reaction.

The driving cycle was compiled from city driving mode of the New European Driving Cycle (NEDC). The average temperature of the cycle was about 170° C. The cycle was driven twice for 1880 s. Prior to the first test run the temperature of the NOx adsorber catalyst was increased to 650° C. for 10 min, to purge pre-adsorbed NOx.

The test results of the first test run are shown in FIG. 7. Both systems adsorb some NOx from the exhaust leaving the engine up to about 500 s. The NOx catalyst comprising a Pd-CHA zeolite comprised in the system according to Comparative Example 4 shows a lower NOx adsorption during the first 500 s and also a lower NOx release at the end of the first test run compared to the NOx adsorber catalyst comprised in the system according to Example 8.

Prior to the second test run, the systems were cooled to room temperature and no high temperature preconditioning was conducted. The test results of the second test run are shown in FIG. 8. In the second test run, the system according to Comparative Example 4, thus comprising a NOx adsorber catalyst with a Pd-CHA zeolite, did not show a NOx adsorption but a strong NOx release instead since the NOx was not released during the first cold city cycle. Therefore, the system according to Comparative Example 4 would require an undesirable thermal treatment to release the stored NOx, if it is run on such a cold city cycle. The system according to Example 8, thus comprising a NOx adsorber catalyst with a Pd-FER zeolite, shows still a good NOx adsorption in the second cold city cycle.

CITED LITERATURE

Figure 1:
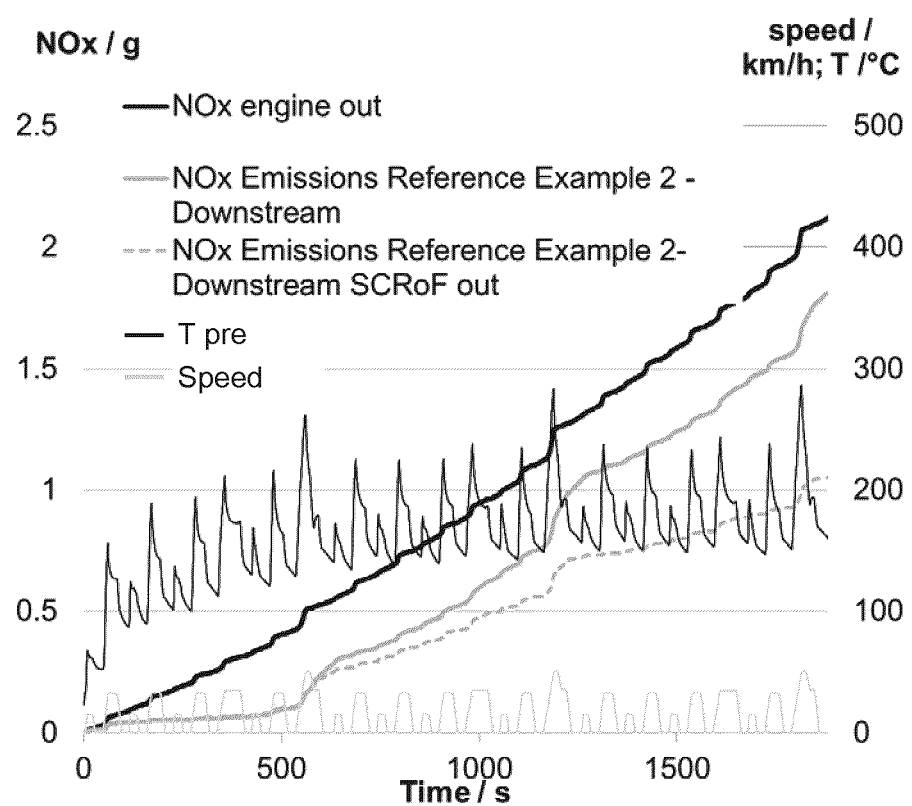
FIG. 1 shows the simulated low temperature city driving cycle and NOx adsorption evaluation of Reference Example 2 (1$^{st}$ test run).
Figure 2:
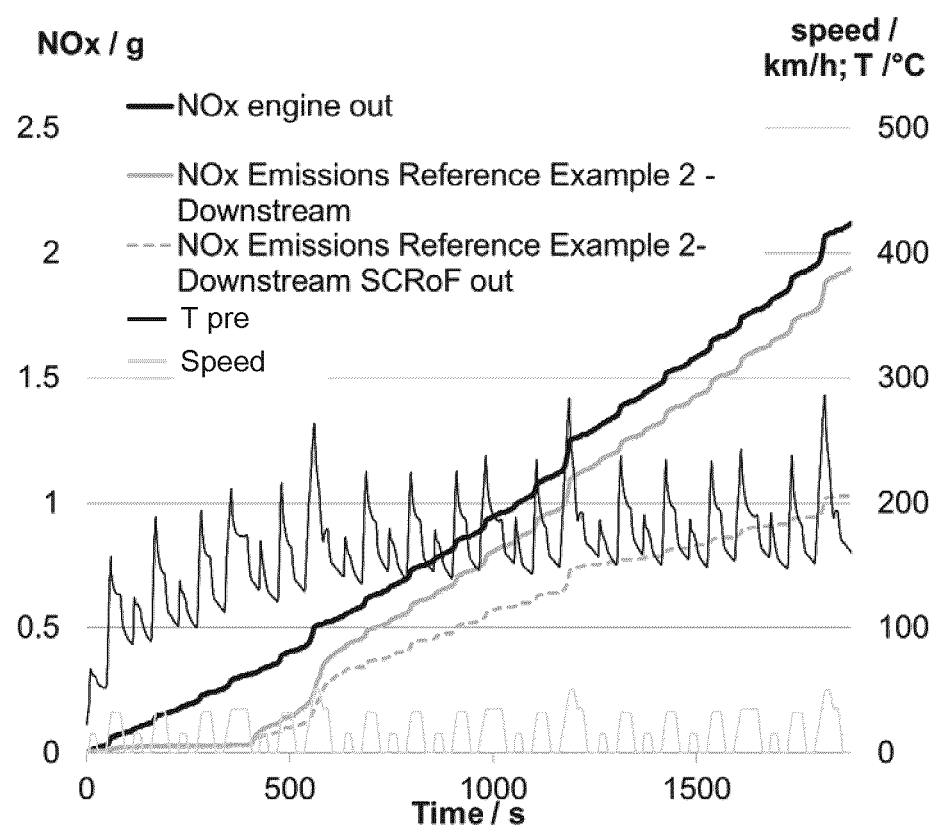
FIG. 2 shows the simulated low temperature city driving cycle and NOx adsorption evaluation of Reference Example 2 (2$^{nd}$ test run).
Figure 3:
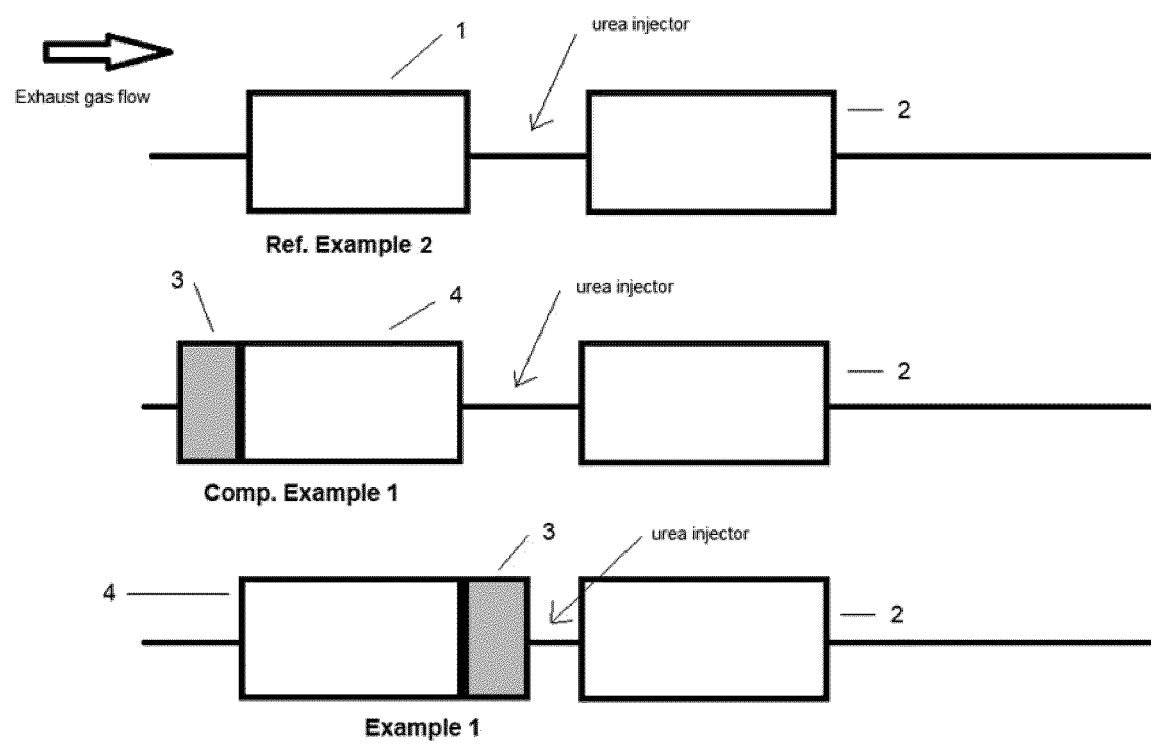
FIG. 3 shows a schematic depiction of systems for treating NOx, CO and THC emissions. In particular, this figure first shows a first system not according to the present invention comprising the NA-DOC catalyst 1 comprising a substrate coated with a NA (NOx adsorber) coating and a DOC (diesel oxidation catalyst) coating on the NA coating of Reference Example 2 and a selective catalytic reduction catalyst on a filter substrate (SCRoF) 2 downstream of said NA-DOC catalyst 1 (the coatings are not shown in the figure). Further, a urea injector positioned between the NA-DOC 1 and the SCRoF 2 can be added. Further, this figure shows a second system not according to the present invention comprising a NA-DOC catalyst according to Comparative Example 1 comprising a NA coating and a DOC coating disposed on the NA coating (coatings not shown in the figure), wherein the NA coating is disposed on a single substrate comprising a gas heating component 3 positioned upstream of a flow-through substrate 4 (the coating is not shown in the figure) and a selective catalytic reduction catalyst on a filter substrate (SCRoF) 2 downstream of the NA-DOC catalyst (3+4+coatings). Further, a urea injector positioned between the NA-DOC catalyst and the SCRoF 2 can be added. Furthermore, this figure shows a system according to the present invention comprising a NA-DOC catalyst according to Example 1 comprising a NA coating and a DOC coating disposed on the NA coating (the coatings are not shown in the figure), wherein the NA coating is disposed on a single substrate comprising a flow-through substrate 4 positioned upstream of a gas heating component 3 (the coatings are not shown in the figure) and an optional selective catalytic reduction catalyst on a filter substrate (SCRoF) 2 downstream of said NA-DOC catalyst (4+3+coatings). Further, a urea injector positioned between the NA-DOC catalyst and the optional SCRoF 2 can be added.
Figure 4:
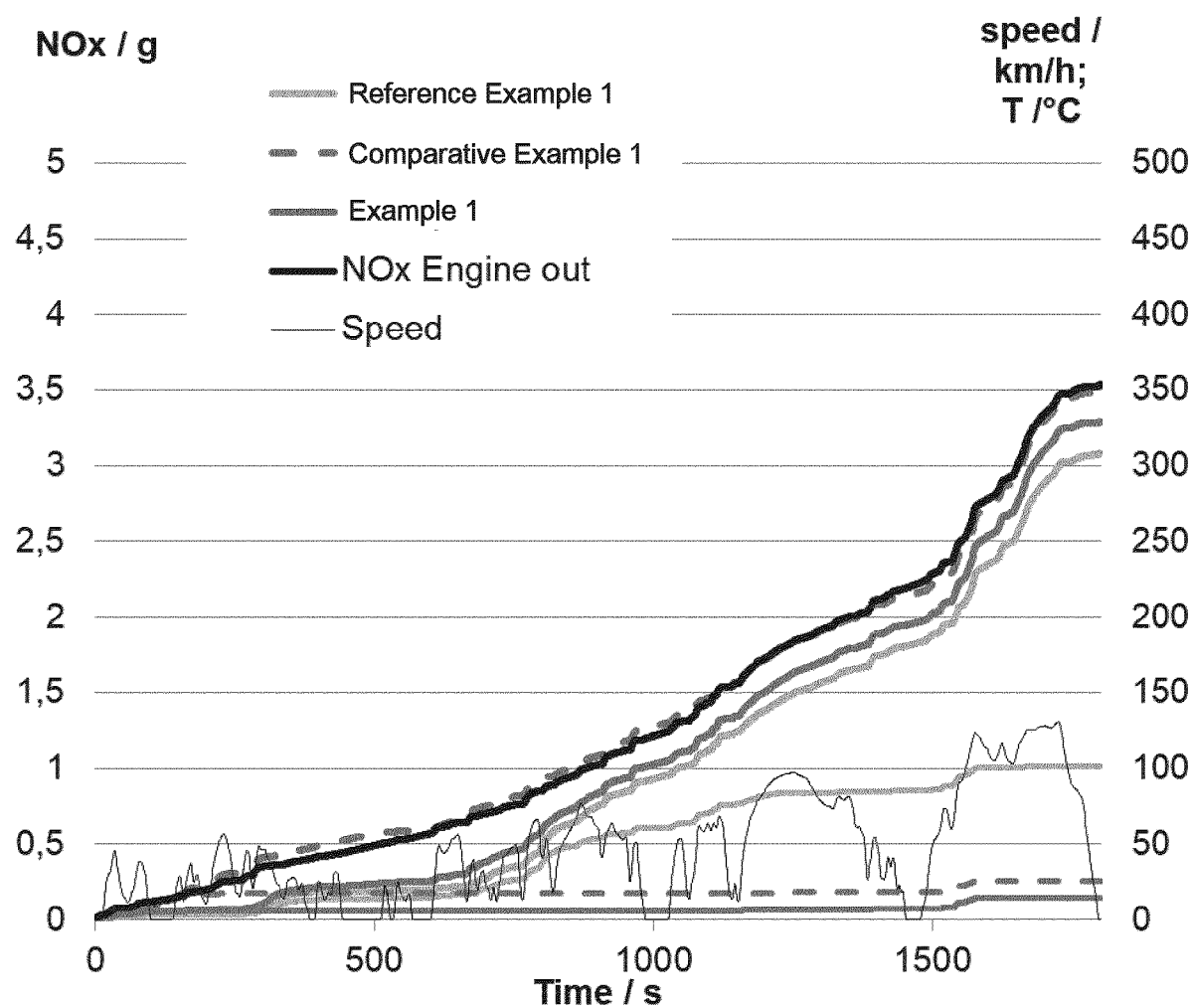
FIG. 4 shows the WLTC Evaluation of NOx adsorber DOC of Reference Example 2, Example 1 and Comparative Example 1 with electrical heating on a diesel engine (NOx emissions).
Figure 5:
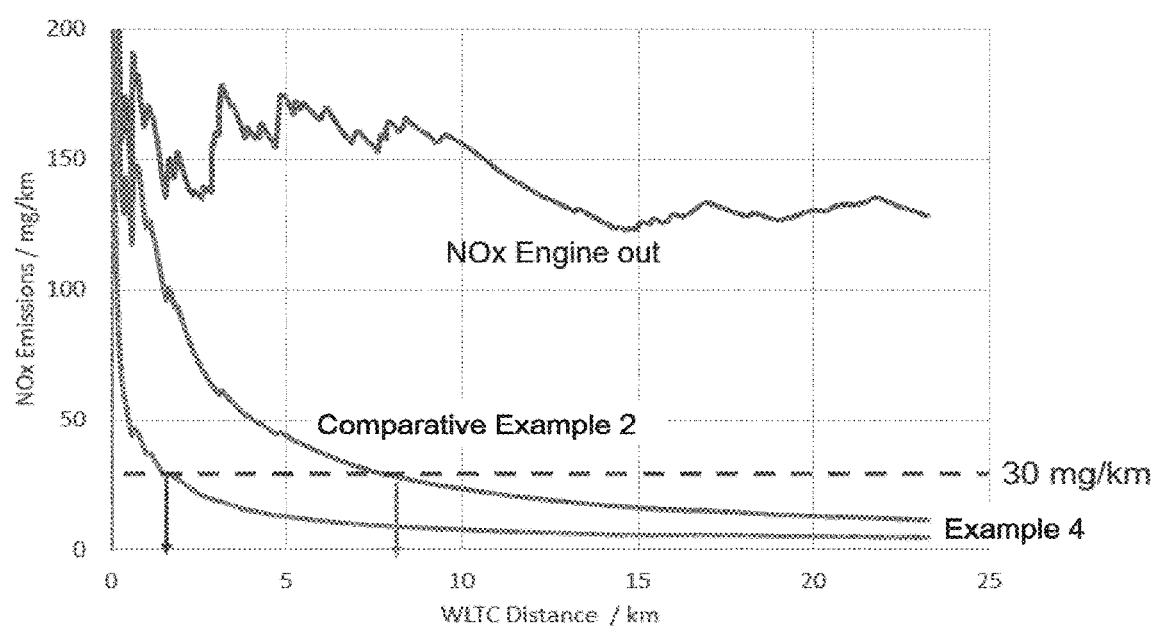
FIG. 5 shows the WLTC Evaluation of the systems of Comparative 2 and Example 4 with electrical heating on a diesel engine (NOx emissions).
Figure 6:
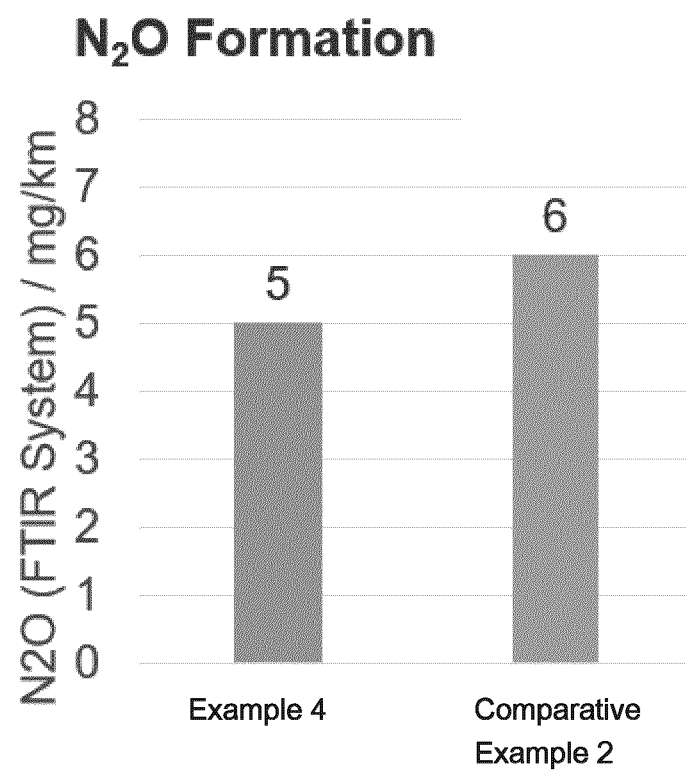
FIG. 6 shows the WLTC Evaluation of the systems of Comparative 2 and Example 4 with electrical heating on a diesel engine ($N_2O$ emission).
Figure 7:
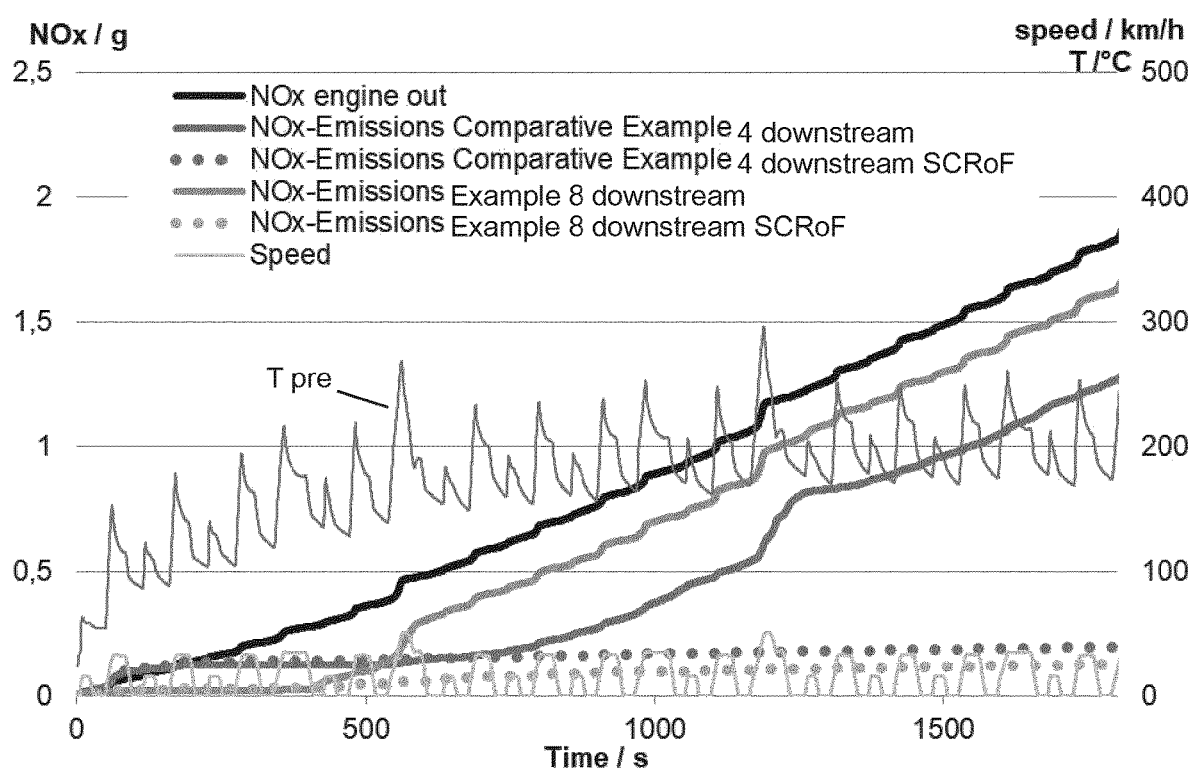
FIG. 7 shows the simulated low temperature city driving cycle and NOx adsorption evaluation of the system according to Example 8 and the system according to Comparative Example 4 ($1^{st}$ test run).
Figure 8:
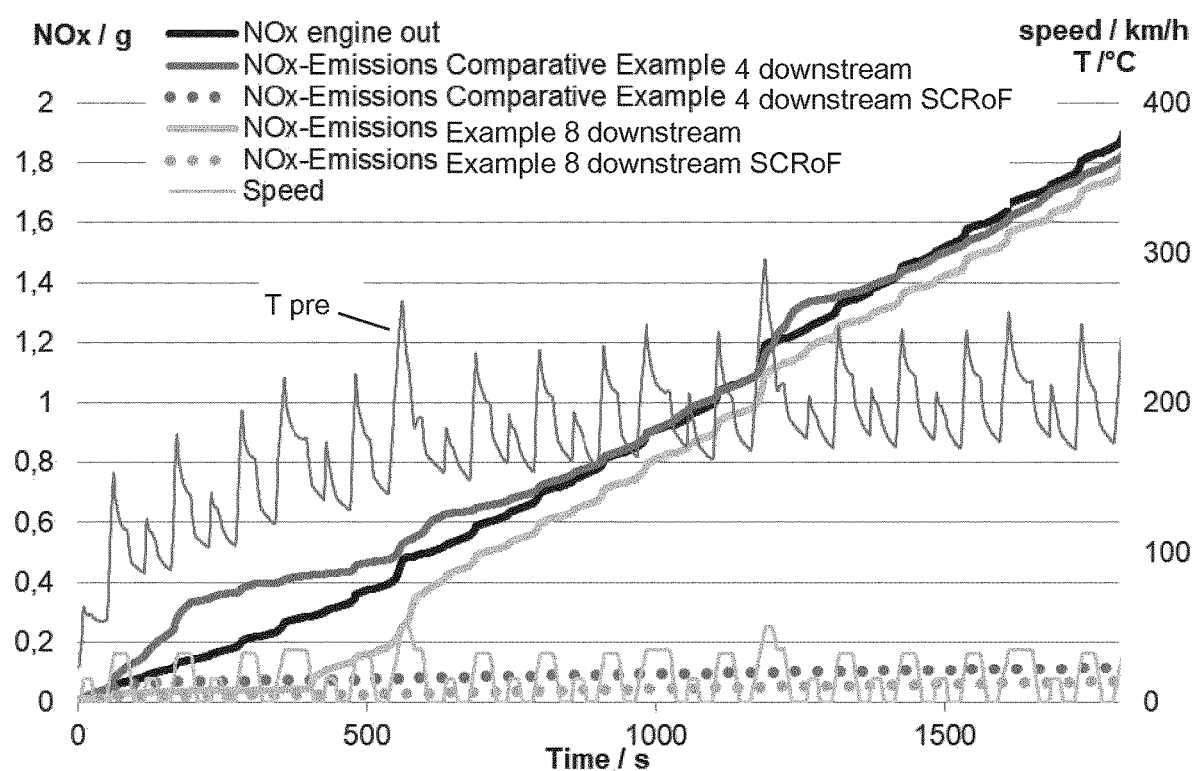
FIG. 8 shows the simulated low temperature city driving cycle and NOx adsorption evaluation of the system according to Example 8 and the system according to Comparative Example 4 ($2^{nd}$ test run).

DE 10 2018 101929
US 2017/0284250A1
U.S. Pat. No. 10,480,369 B1

The invention claimed is:
1. A system for the treatment of an exhaust gas of a diesel combustion engine, said system comprising an NOx adsorber component, a diesel oxidation catalyst (DOC) component, a selective catalytic reduction (SCR) component, a gas heating component, and a reductant injector, wherein in said system, the NOx adsorber component is arranged upstream of the gas heating component, the reductant injector is arranged upstream of the SCR component, the gas heating component is arranged upstream of the reductant injector, the DOC component is arranged upstream of the reductant injector, and the DOC component and the gas heating component are directly consecutive components, wherein the NOx adsorber component is comprised in
(i) a catalyst which comprises
  (i.1) a first substrate comprising an inlet end, an outlet end, a substrate axial length extending from the inlet end to the outlet end of the first substrate, and a plurality of passages defined by internal walls of the first substrate extending therethrough;
  (i.2) an NOx adsorber coating being said NOx adsorber component, said coating being disposed on the surface of the internal walls of the first substrate over at least 50% of the substrate axial length of the first substrate, the NOx adsorber coating comprising a platinum group metal component and a 10-membered ring pore zeolitic material having a framework type selected from the group consisting of FER, TON, MTT, SZR, MWW, AEL, HEU, AFO, a mixture of two or more thereof and a mixed type of two or more thereof.

2. The system of claim 1, wherein the platinum group metal component of the NOx adsorber coating according to (i.2) is comprised in the 10-membered ring pore zeolitic material of the NOx adsorber coating according to (i.2).

3. The system of claim 1, wherein the DOC component is arranged upstream of the gas heating component.

4. The system of claim 1, wherein the catalyst according to (i) further comprises
  (i.3) a diesel oxidation catalyst (DOC) coating being said DOC component, said DOC coating being at least partially disposed on the NOx adsorber coating over at least 70% of the substrate axial length of the first substrate, the DOC coating comprising a platinum group metal component and a non-zeolitic oxidic material comprising one or more of alumina, silica, zirconia and titania.

5. The system of claim 1, wherein
(ii) the gas heating component comprises
  (ii.1) a second substrate comprising an inlet end, an outlet end, a substrate axial length extending from the inlet end to the outlet end of the second substrate, and a plurality of passages defined by internal walls of the second substrate extending therethrough;
wherein the inlet end of the second substrate according to (ii.1) and the outlet end of the first substrate according to (i.1) are coupled to allow exhaust gas exiting from the passages of the first substrate to enter the passages of the second substrate;
wherein the internal walls of the second substrate are thermally conductive to allow heating thereof for heating of exhaust gas flowing through the passages of the second substrate.

6. The system of claim 5, wherein the gas heating component according to (ii) further comprises
  (ii.2) optionally an NOx adsorber coating disposed on the surface of the internal walls of the second substrate over at least 50% of the substrate axial length of the second substrate, the NOx adsorber coating comprising a platinum group metal component and a 10-membered ring pore zeolitic material having a framework type selected from the group consisting of FER, TON, MTT, SZR, MWW, AEL, HEU, AFO, a mixture of two or more thereof and a mixed type of two or more thereof;
  (ii.3) a diesel oxidation catalyst (DOC) coating at least partially disposed on the surface of the internal walls of the second substrate and/or at least partially disposed on the optional NOx adsorber coating according to (ii.2) and extending over at least 70% of the substrate axial length of the second substrate, the DOC coating comprising a platinum group metal component and a non-zeolitic oxidic material comprising one or more of alumina, silica, zirconia and titania.

7. The system of claim 1, wherein the DOC component is arranged downstream of the gas heating component.

8. The system of claim 7, wherein the DOC component is comprised in
   (iii) a catalyst comprising
       (iii.1) a third substrate which comprises an inlet end, an outlet end, a substrate axial length extending from the inlet end to the outlet end of the third substrate, and a plurality of passages defined by internal walls of the third substrate extending therethrough;
       (iii.2) a first DOC coating disposed on the surface of the internal walls of the third substrate over at least 70% of the substrate axial length of the third substrate, the first DOC coating comprising a platinum group metal component and a non-zeolitic oxidic material comprising one or more of alumina, silica, zirconia and titania; and
       (iii.3) optionally a second DOC coating at least partially disposed on the first DOC coating and extending over at least 20% of the substrate axial length of the third substrate, the second DOC coating comprising a platinum group metal component and a non-zeolitic oxidic material comprising one or more of alumina, silica, zirconia and titania.

9. The system of claim 7, wherein
   (ii) the gas heating component comprises
       (ii.1) a second substrate comprising an inlet end, an outlet end, a substrate axial length extending from the inlet end to the outlet end of the second substrate, and a plurality of passages defined by internal walls of the second substrate extending therethrough;
   wherein the inlet end of the second substrate according to (ii.1) and the outlet end of the first substrate according to (i.1) are coupled to allow gas exiting from the passages of the first substrate according to (i.1) to enter the passages of the second substrate according to (ii.1);
   wherein the inlet end of the third substrate according to (iii.1) and the outlet end of the second substrate according to (ii.1) are coupled to allow gas exiting from the passages of the second substrate to enter the passages of the third substrate according to (iii.1);
   wherein the internal walls of the second substrate according to (ii.1) are thermally conductive to allow heating thereof for heating of exhaust gas flowing through the passages of the second substrate.

10. The system of claim 9, wherein the gas heating component according to (ii) further comprises
    (ii.2) a first DOC coating disposed on the surface of the internal walls of the second substrate according to (ii.1) over at least 50% of the substrate axial length of the second substrate according to (ii.1), the first DOC coating comprising a platinum group metal component and a non-zeolitic oxidic material comprising one or more of alumina, silica, zirconia and titania;
    (ii.3) optionally a second DOC coating at least partially disposed on the first DOC coating according to (ii.2) and extending over at least 50% of the substrate axial length of the second substrate according to (ii.1), the second DOC coating comprising a platinum group metal component and a non-zeolitic oxidic material comprising one or more of alumina, silica, zirconia and titania.

11. The system of claim 8, wherein the SCR component is comprised in
    (iv) a selective catalytic reduction (SCR) catalyst comprising
        (iv.1) a fourth substrate comprising an inlet end, an outlet end, and a substrate axial length extending from the inlet end to the outlet end of the fourth substrate;
        (iv.2) a selective catalytic reduction (SCR) coating disposed on the fourth substrate according to (iv.1);
    wherein the inlet end of the fourth substrate according to (iv.1) and either:
        a) the outlet end of the second substrate, where the second substrate comprises an inlet end, an outlet end, a substrate axial length extending from the inlet end to the outlet end of the second substrate, and a plurality of passages defined by internal walls of the second substrate extending therethrough; wherein the inlet end of the second substrate and the outlet end of the first substrate are coupled to allow exhaust gas exiting from the passages of the first substrate to enter the passages of the second substrate; wherein the internal walls of the second substrate are thermally conductive to allow heating thereof for heating of exhaust gas flowing through the passages of the second substrate, or
        b) the outlet end of the third substrate;
    are coupled to allow exhaust gas exiting from the passages of the second substrate or exiting from the passages of the third substrate to enter the fourth substrate.

12. A process for preparing a system for the treatment of an exhaust gas of a diesel combustion engine, comprising
    (1) providing an NOx adsorber component, a diesel oxidation catalyst (DOC) component, a selective catalytic reduction (SCR) component, a gas heating component, and a reductant injector,
    wherein the NOx adsorber component is comprised in
    (i) a catalyst which comprises
        (i.1) a first substrate comprising an inlet end, an outlet end, a substrate axial length extending from the inlet end to the outlet end of the first substrate, and a plurality of passages defined by internal walls of the first substrate extending therethrough;
        (i.2) an NOx adsorber coating being said NOx adsorber component, said coating being disposed on the surface of the internal walls of the first substrate over at least 50% of the substrate axial length of the first substrate, the NOx adsorber coating comprising a platinum group metal component and a 10-membered ring pore zeolitic material having a framework type selected from the group consisting of FER, TON, MTT, SZR, MWW, AEL, HEU, AFO, a mixture of two or more thereof and a mixed type of two or more thereof;
    (2) arranging the NOx adsorber component upstream of the gas heating component;
    (3) arranging the reductant injector upstream of the SCR component;
    (4) arranging the gas heating component upstream of the reductant injector;
    (5) arranging the DOC component upstream of the reductant injector;
    (6) arranging the DOC component and the gas heating component in directly consecutive order.

13. A system for the treatment of an exhaust gas of a diesel combustion engine obtainable or obtained by a process according to claim 12.

14. A method for the treatment of an exhaust gas of a diesel combustion engine, comprising providing an exhaust gas from a diesel combustion engine and passing said exhaust gas through a system according to claim 1.

* * * * *